US012609254B2

(12) United States Patent
DeHorn et al.

(10) Patent No.: US 12,609,254 B2
(45) Date of Patent: Apr. 21, 2026

(54) BATTERY MASTER DISCONNECT SWITCH WITH INTEGRATED VOLTAGE INDICATOR

(71) Applicant: Littelfuse, Inc., Chicago, IL (US)

(72) Inventors: David P. DeHorn, Glenview, IL (US);
Sean McDonnell, Plainville, CT (US);
Brian Stuckman, Plainville, CT (US)

(73) Assignee: Littelfuse, Inc., Chicago, IL (US)

( * ) Notice: Subject to any disclaimer, the term of this
patent is extended or adjusted under 35
U.S.C. 154(b) by 490 days.

(21) Appl. No.: 18/112,032

(22) Filed: Feb. 21, 2023

(65) Prior Publication Data

US 2023/0268147 A1      Aug. 24, 2023

Related U.S. Application Data

(60) Provisional application No. 63/313,485, filed on Feb.
24, 2022, provisional application No. 63/314,708,
filed on Feb. 28, 2022.

(51) Int. Cl.
| | |
|---|---|
| *H01H 19/14* | (2006.01) |
| *H01M 10/42* | (2006.01) |
| *H01M 10/48* | (2006.01) |

(52) U.S. Cl.
CPC .......... *H01H 19/14* (2013.01); *H01M 10/425*
(2013.01); *H01M 10/488* (2013.01)

(58) Field of Classification Search
CPC ..... H01H 19/14; H01H 19/52; H01M 10/425;
H01M 10/488; H02J 7/0013; H02J
7/0042
See application file for complete search history.

(56) References Cited

U.S. PATENT DOCUMENTS

| | | | | |
|---|---|---|---|---|
| 5,923,008 | A | 7/1999 | Williams, Jr. | |
| 6,815,931 | B1 * | 11/2004 | Wells | H02J 7/1423 |
| | | | | 320/155 |
| 10,475,603 | B2 * | 11/2019 | Wilkins | H01H 19/14 |
| 2009/0261838 | A1 | 10/2009 | Shull | |
| 2017/0352505 | A1 * | 12/2017 | Wang | H01H 19/14 |
| 2018/0262131 | A1 * | 9/2018 | Russick | B63B 13/00 |

FOREIGN PATENT DOCUMENTS

| | | | | |
|---|---|---|---|---|
| JP | 2004359189 A | * 12/2004 | ........... | B63B 35/731 |

OTHER PUBLICATIONS

English translation of JP-2004359189-A (Year: 2004).*
Extended European Search Report for related EP Application No.
24172722.1, dated Sep. 24, 2024, 7 pages.
European Search Report for EP Application No. 23158252.9, dated
Oct. 4, 2023, 8 pages.

* cited by examiner

*Primary Examiner* — Huy Q Phan
*Assistant Examiner* — Haidong Zhang
(74) *Attorney, Agent, or Firm* — KDW Firm PLLC

(57) ABSTRACT

A battery master disconnect switch includes a front panel
and a back panel. The front panel has a selector knob for
selecting between multiple positions. The back panel has a
primary terminal, a secondary terminal, and an auxiliary
terminal. The primary terminal is for connection, using a
first cable, to a primary battery. The secondary terminal is
for connection, using a second cable, to a secondary battery.
The auxiliary terminal is for enabling a device. The device
receives power for any of the positions of the selector knob.
The battery master disconnect switch can present a voltage
for the primary, the secondary, or both the primary and
secondary batteries.

16 Claims, 51 Drawing Sheets

<u>600</u>

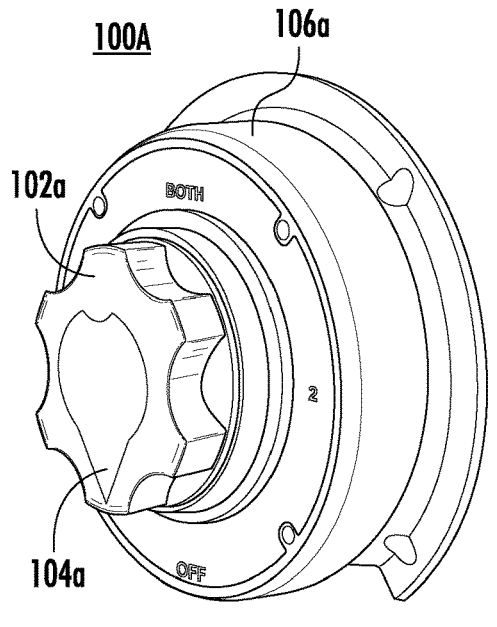
FIG. 2A
(PRIOR ART)
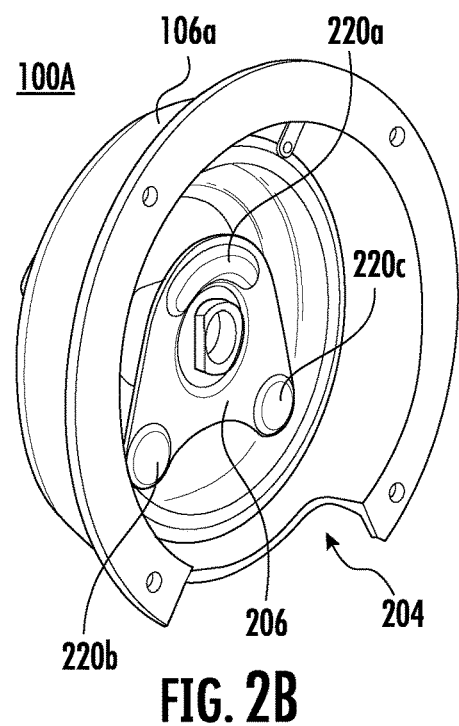
FIG. 2B
(PRIOR ART)
FIG. 2C
(PRIOR ART)
FIG. 2D
(PRIOR ART)

selection indicator 104a → OFF position 108A

300 selection indicator 104a → battery 1 ON position 110A

300

300 selection indicator 104a → battery 2 ON position 112A

FIG. 3C
(prior art)

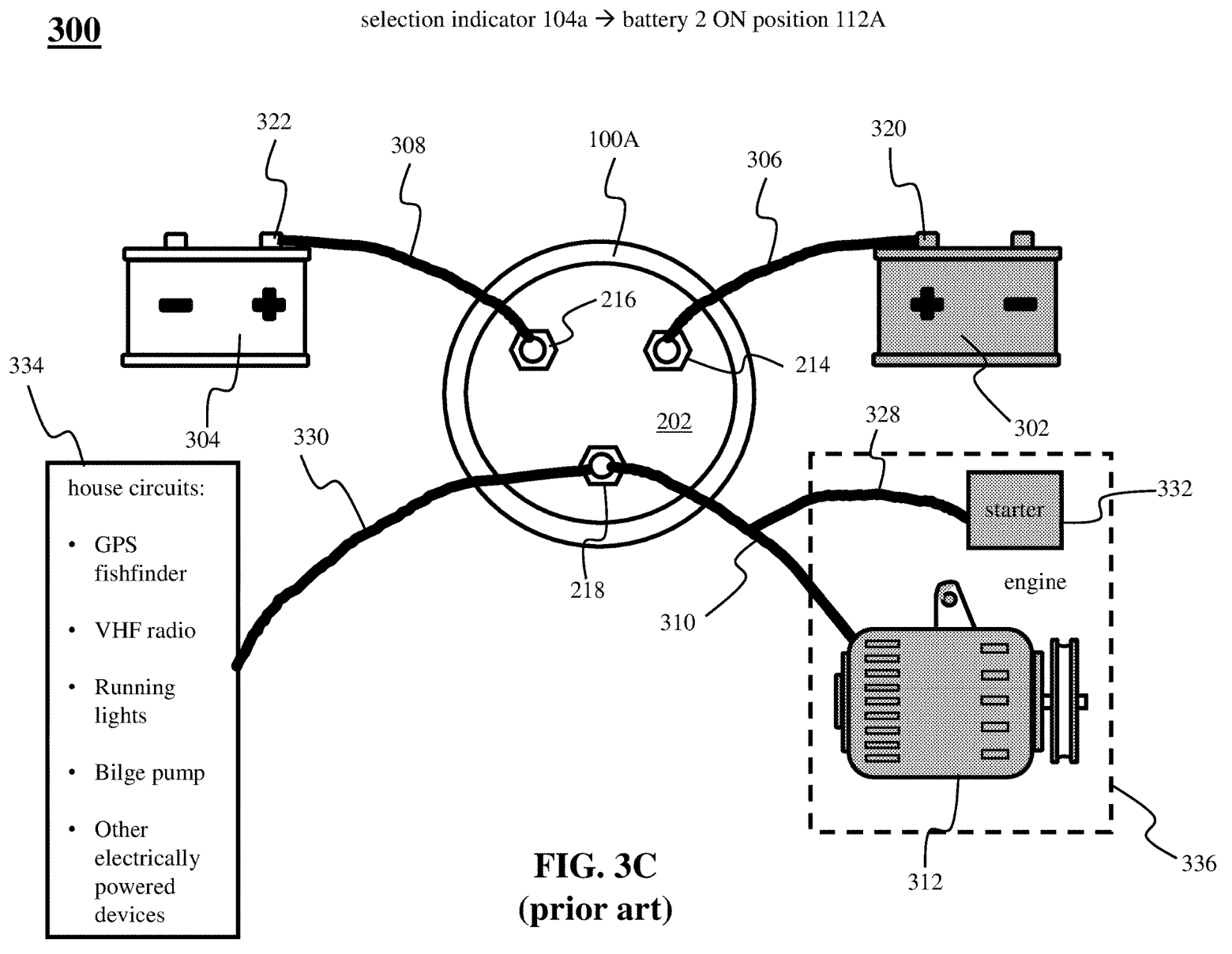

house circuits:

• GPS
  fishfinder

• VHF radio

• Running
  lights

• Bilge pump

• Other
  electrically
  powered
  devices starter engine selection indicator 104a → both ON position 114A

600

700

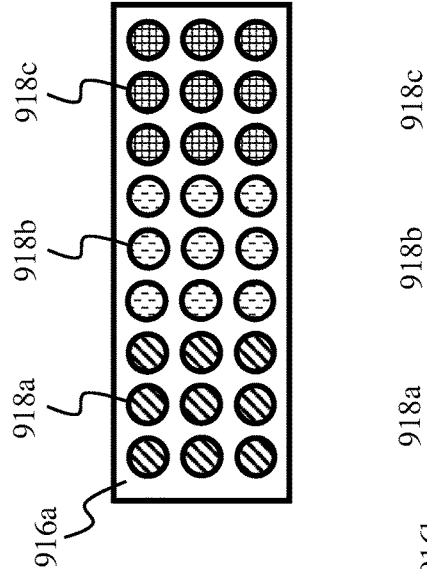
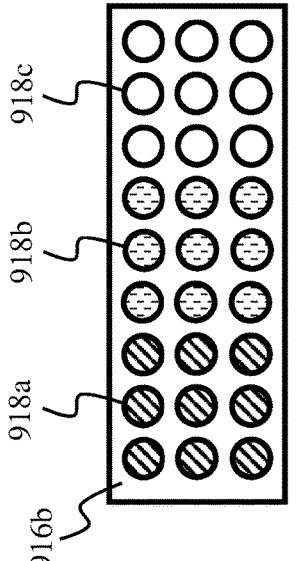
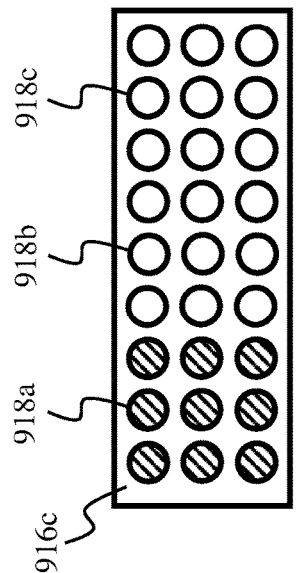
FIG. 9

1100 always on device (1122)

1106

1112

1124

1108

1114

1102 voltage display PCB (1106)

1116

1118

1120

1100 always on device (1122)

1106

1118

1112

1124

1108

1114 voltage display PCB (1104)

1116

1102

1120

1200

1206

1218

1212

1214

1208 voltage display PCB (1206)

1216

1202

1220

1200

1300

1500

1500 always on device (1522)

1506b

1518

1514

1508c

1508d

1524

1510

1508b

1512

1508a voltage display PCB (1504)

1516

1506a

1502

1520

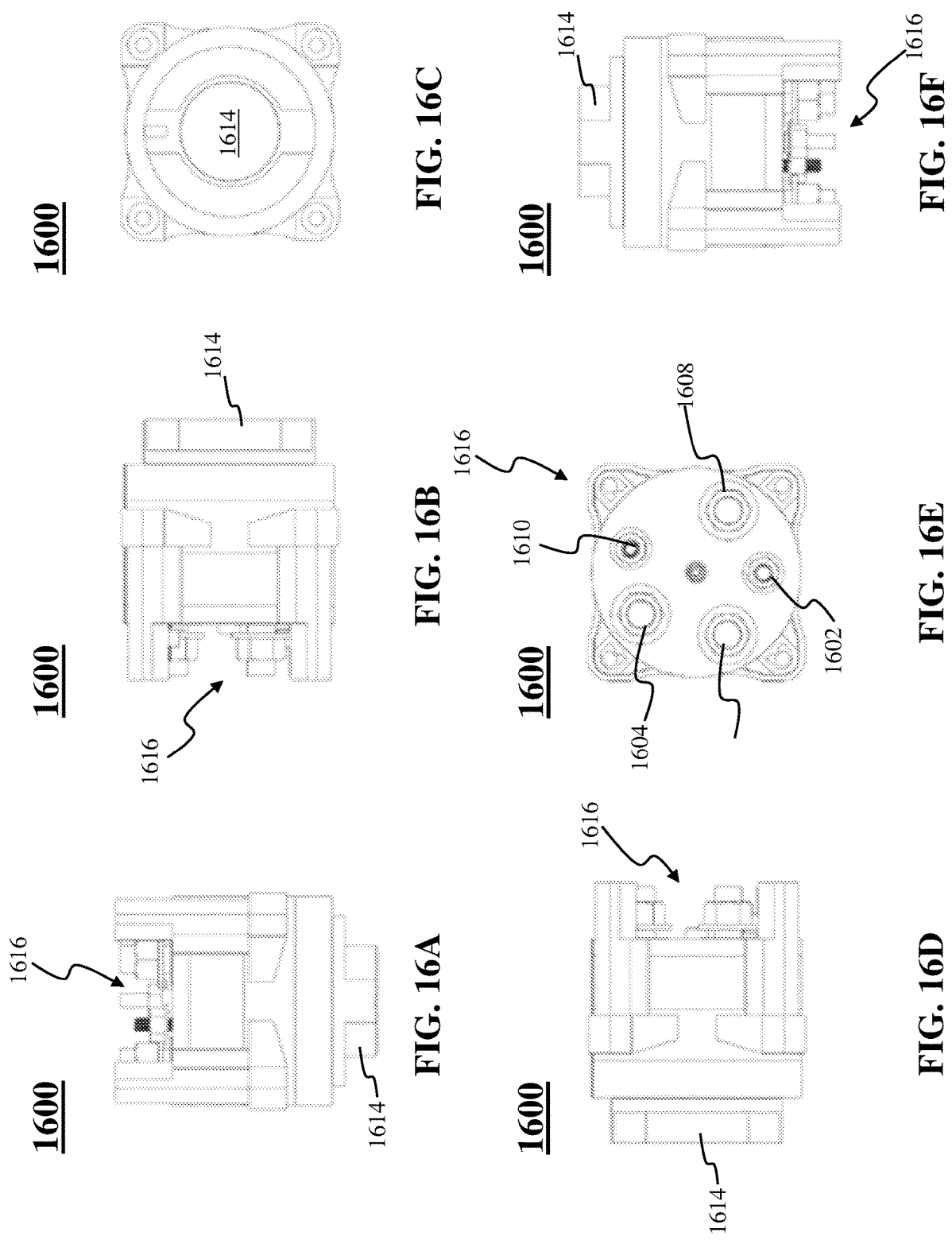

1600

1814

1812

1606

1608

1816

1604

1810

1600

1802

1614

BATTERY MASTER DISCONNECT SWITCH WITH INTEGRATED VOLTAGE INDICATOR

CROSS-REFERENCE TO RELATED APPLICATIONS

This application claims priority to U.S. Provisional Patent Application No. 63/313,485, filed on Feb. 24, 2022, entitled, BATTERY MASTER DISCONNECT SWITCH WITH INTEGRATED VOLTAGE INDICATOR, and to U.S. Provisional Patent Application No. 63/314,708, filed on Feb. 28, 2022, entitled, BATTERY MASTER DISCONNECT SWITCH WITH AUXILIARY STUD, both of which are incorporated by reference herein in their entirety.

FIELD OF THE DISCLOSURE

Embodiments of the present disclosure relate to battery master disconnect switches, and, more particularly, to their use in the marine environment.

BACKGROUND

Battery master disconnect switches, also known as battery selectors and master disconnects, are devices which are connected to batteries within vehicles, such as farm machinery, earth-moving equipment, marine craft, and the like. The battery master disconnect switch isolates the batteries and eliminates battery drain when the vehicle is stored overnight or for longer periods, electrically cuts off battery power for safety or when the vehicle is being serviced, and can be locked, thus preventing unauthorized access to the vehicle. The battery master disconnect switch can generally be mounted directly to the vehicle and may be made using plastic material that stands up to road splash and salt spray (IP67/IP69K ingress protection).

Battery master disconnect switches further can enable the control of multiple batteries within the vehicle. Marine craft, for example, have a primary battery that is dedicated to starting the vehicle, with a secondary battery, also known as the "house" battery, being available for ancillary functions of the vehicle, such as turning on lights. By simply turning a selector on the battery master disconnect switch, the primary battery, the secondary battery, and both batteries can be selectively enabled (turned ON) and disabled (turned OFF). Because marine craft is not typically used every day, the battery master disconnect switch provides a simple way for the boat owner to turn off the batteries before leaving the craft, as the owner may not return to the boat for an extended time period.

There is one ancillary function on a marine craft that should not be turned off, and that is the bilge pump. The bilge pump is activated by a float switch, which change position once water has entered the craft, such as during a rain while the boat is docked. The activated bilge pump sends water out of the craft, thus preventing the boat from sinking in the dock. Particularly because the marine craft may be left unattended for long periods of time, the bilge pump is an important feature that protects the valued asset.

Bilge pumps are typically connected directly to the secondary battery using a cable between the bilge pump and the battery terminal. When the secondary battery is removed from the watercraft for service or replacement, the bilge pump cable would be removed from the terminal, then reattached once the battery is returned to the watercraft. Over time, the removal and reattachment may cause the cable to become worn. Further, if the owner forgets to reattach the bilge pump cable to the battery, the watercraft will be without a functioning bilge pump, which could be disastrous for the life of the asset.

When returning to the vehicle, particularly after an extended period away, the state of each battery is unknown. The vehicle owner may only know that the primary battery is functioning by starting the vehicle. And the vehicle owner may only know that the secondary battery is functioning by invoking a house circuit. Even with this information, the vehicle owner will not know how long either battery may last. Particularly when the vehicle is a watercraft in which the vehicle owner may leave the dock for several hours, being uncertain about the health of either battery is risky.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of a battery master disconnect switch in accordance with the present disclosure may include a back panel and a front panel. The back panel includes a primary terminal to connect to a primary battery and a secondary terminal to connect to a secondary battery. The front panel includes a selector knob and a battery voltage indicator. The selector knob selects between a first position to enable the primary battery and a second position to enable the secondary battery. The battery voltage indicator visually presents a voltage based on a voltage measurement of the primary battery or the secondary battery.

Another exemplary embodiment of a battery master disconnect switch in accordance with the present disclosure may include a front panel and a back panel. The front panel has a selector knob for selecting between multiple positions. The back panel has a primary terminal, a secondary terminal, and an auxiliary terminal. The primary terminal is for connection, using a first cable, to a primary battery. The secondary terminal is for connection, using a second cable, to a secondary battery. The auxiliary terminal is for enabling an always-on device. The always-on device receives power for any of the positions of the selector knob.

BRIEF DESCRIPTION OF THE DRAWINGS

FIGS. 2A-2H are diagrams illustrating the components of the battery master disconnect switch of FIG. 1A, in accordance with the prior art;

FIGS. 3A-3D are diagrams illustrating a battery system including the battery master disconnect switch of FIG. 1A, in accordance with the prior art;

FIG. 9 is a diagram illustrating a voltage indicator system using a battery master disconnect switch, in accordance with exemplary embodiments;

FIGS. 16A-16F are diagrams illustrating a battery master disconnect switch, in accordance with exemplary embodiments;

DETAILED DESCRIPTION

A battery master disconnect switch is disclosed that enables an always-on device, such as a bilge pump, to have access to a power source even when access to other devices in a system is disabled. The battery master disconnect switch includes an auxiliary terminal to which the always-on device is connected, with the auxiliary terminal also being connected to one or more batteries in the system. Whatever the setting of the battery master disconnect switch, the always-on device will receive power from one or more batteries. The battery master disconnect switch is well-suited to marine craft which depend on an always operating bilge pump.

The battery master disconnect switch optionally also features voltage indication. The battery master disconnect switch provides voltage indicator for a primary battery, a secondary battery, or both batteries of a vehicle. The voltage indication may be using LED numerical displays, color-coded LED diodes, or may be presented in audible form.

For the sake of convenience and clarity, terms such as "top", "bottom", "upper", "lower", "vertical", "horizontal", "lateral", "transverse", "radial", "inner", "outer", "left", and "right" may be used herein to describe the relative placement and orientation of the features and components, each with respect to the geometry and orientation of other features and components appearing in the perspective, exploded perspective, and cross-sectional views provided herein. Said terminology is not intended to be limiting and includes the words specifically mentioned, derivatives therein, and words of similar import.

Figure 1B:
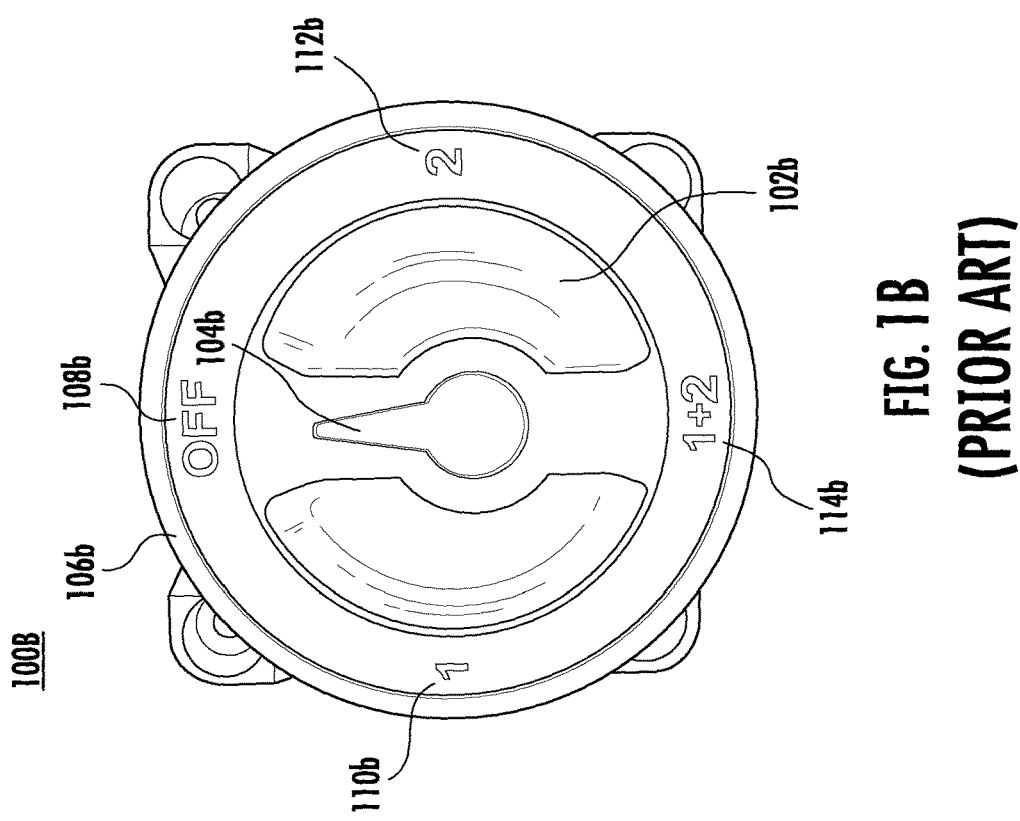
FIGS. 1A and 1B are diagrams illustrating a battery master disconnect switch, in accordance with the prior art.
Figure 1A:
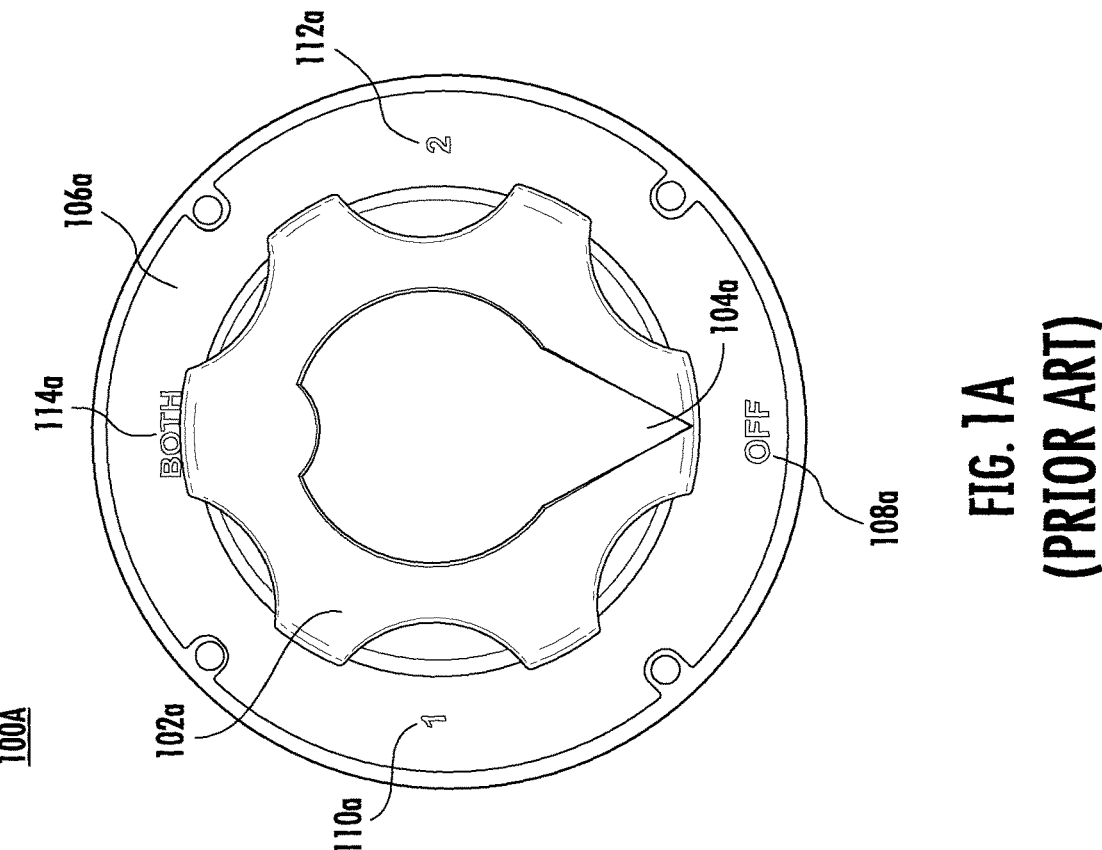

FIGS. 1A and 1B are representative images of battery master disconnect switches 100A and 100B (collectively, "battery master disconnect switch 100") for controlling batteries in a vehicle, according to the prior art. The two battery master disconnect switches 100A and 100B look somewhat different but function similarly. Each battery master disconnect switch 100 is connected to two batteries: a primary battery and a secondary battery.

Battery master disconnect switch 100A features a selector knob 102a with a selection indicator 104a disposed on a front panel 106a; battery master disconnect switch 100B features a selector knob 102b with a selection indicator 104b disposed on a front panel 106b (collectively, "selector knob 102", "selection indicator 104", and "front panel 106"). The selector knobs 102 are rotated to move respective selection indicators 104 to a desired position.

Each battery master disconnect switch 100 features four positions, denoted on respective front panels 106, which can be summarized as follows: OFF; primary battery ON; secondary battery ON; and both batteries ON. Respective selector knobs 102 are turned until selection indicators 104 choose one of the four positions of battery master disconnect switches 100. Selected OFF indicator 108a, disposed at the bottom of the front panel 106a of battery master disconnect switch 100A, and selected OFF indicator 108b, disposed at the top of the front panel 106b of battery master disconnect switch 100B (collectively "OFF indicator 108"), indicates both batteries are turned off. Selected "1" indicator 110a, disposed at the left side of the front panel 106a of battery master disconnect switch 100A, and selected "1" indicator 110b, disposed at the left side of the front panel 106b of battery master disconnect switch 100B (collectively ""1" indicator 110"), indicates the primary battery is turned on. Selected "2" indicator 112a, disposed at the right side of the front panel 106a of battery master disconnect switch 100A, and selected "2" indicator, disposed at the right side of the front panel 106b of battery master disconnect switch 100B (collectively ""2" indicator 112"), indicates the second battery is turned on. Finally, selected "both" indicator 114a, disposed at the top of the front panel 106a of battery master disconnect switch 100A, and selected "1+2" indicator disposed at the bottom of the front panel 106b of battery master disconnect switch 100B, indicates both batteries are turned on.

The two battery master disconnect switches 100 thus enable an operator of a vehicle to: 1) turn on a primary battery; 2) turn on a secondary battery; 3) turn on both the primary and the secondary batteries; and 4) turn off the primary and secondary batteries. When used with the primary and secondary batteries of a watercraft, such as a boat, the battery master disconnect switches 100 thus enable an operator to turn off both batteries before leaving the watercraft in dock. Optionally, the battery master disconnect switches 100 include locking mechanisms, which prevent tampering of the unattended watercraft by unauthorized users.

Figures 2E, 2F:
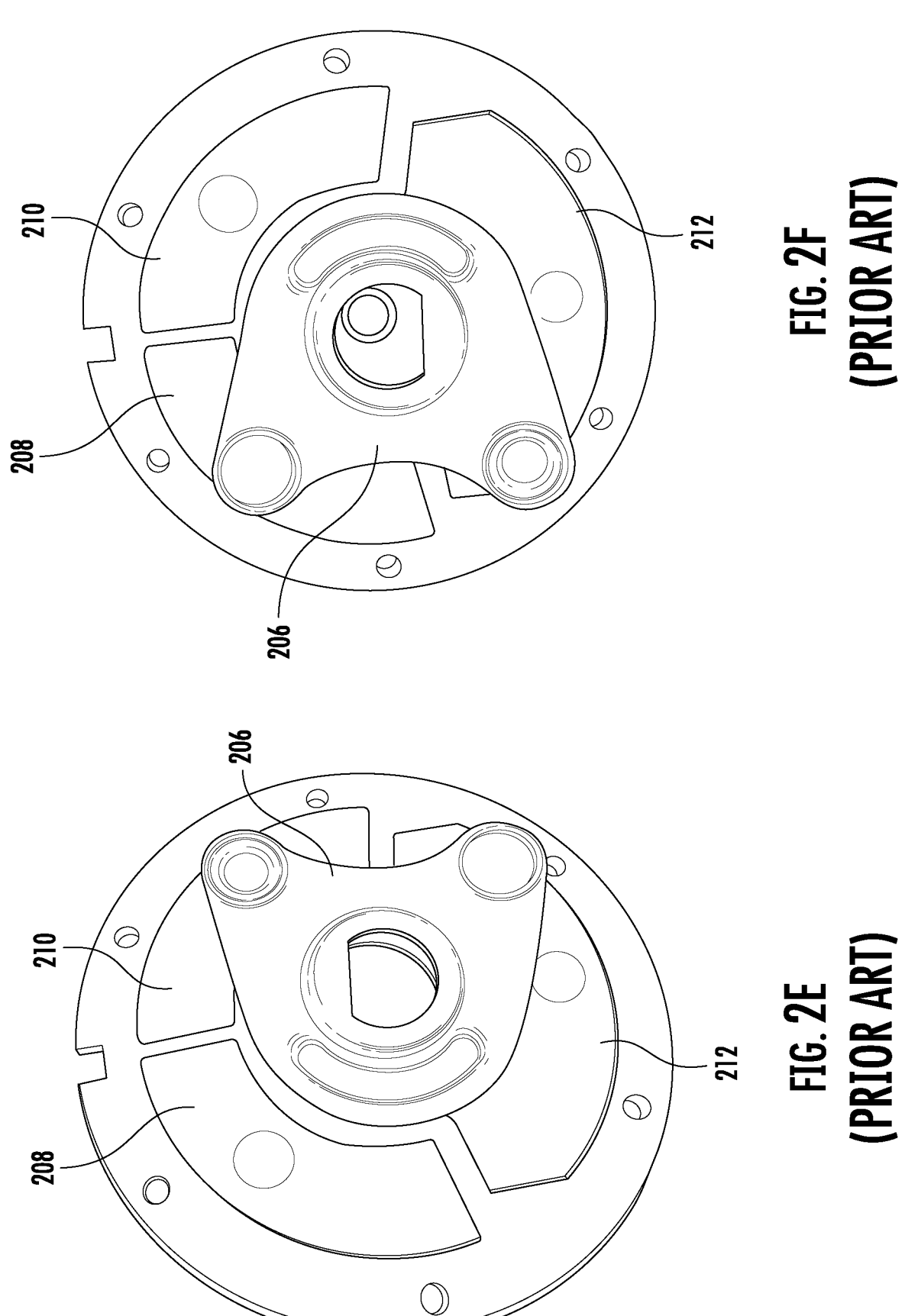

FIGS. 2A-2H are representative drawings of the battery master disconnect switch 100A of FIG. 1A, according to the prior art. FIG. 2A is a perspective view of the front panel of the battery master disconnect switch 100A; FIG. 2B is a perspective view of the inside of the front panel; FIG. 2C is a perspective view of the inside of a back panel 202 of the battery master disconnect switch 100A; FIG. 2D is a perspective view of the back panel; and FIGS. 2E-2H show connection information of the battery master disconnect switch 100A in four possible states. The front panel 106a, which features the selector knob 102a and selection indicator 104a introduced in FIG. 1A, are also shown in FIG. 2A. In FIG. 2B, the inside of the front panel 106a is shown, including an interior portion 204, in which is housed a conducting selector plate 206. The conducting selector plate 206 is made of an electrically conductive material, such as copper, designed to make contact or not contact other electrically conductive pieces, as shown in FIG. 2C. When the selector knob 102a is rotated, the conducting selector plate 206 also rotates.

FIGS. 2C and 2D show a back panel 202 of the battery master disconnect switch 100A, with the inside of the back panel shown in FIG. 2C and the outside of the back panel shown in FIG. 2D. The inside of the back panel 202 features a primary battery conductor plate 208, a secondary battery conductor plate 210, and a common conductor plate 212. The outside of the back panel 202 includes a primary terminal 214, a secondary terminal 216, and a common terminal 218. Like the conducting selector plate 206, the primary battery, secondary battery, and common conductor plates 208/210/212, as well as the primary, secondary, and common terminals 214/216/218 are made of an electrically conductive material, such as copper. The primary battery conductor plate 208 is connected to and establishes an electrical connection to the primary terminal 214; the secondary battery conductor plate 210 is connected to and establishes an electrical connection to the secondary terminal 216; and the common conductor plate 212 is connected to and establishes an electrical connection to the common terminal 218. Screws 222a, 222b, and 222c enable the battery master disconnect switch 100A to be permanently secured to a surface.

Unlike the conducting selector plate 206, the primary battery, secondary battery, and common conductor plates 208/210/212 are stationary and do not rotate. The back panel 202 is designed to fit into the interior portion 204 of the front panel 106a, such that one or more of the primary battery, secondary battery, and common conductor plates 208/210/212 are able to mate with the conducting selector plate 206, depending on the position of the selection indicator 104a of the selector knob 102a.

To that end, the conducting selector plate 206 includes protrusions 220a-c (collectively, "protrusions 220") that facilitate proximity, and thus electrical contact, between the conducting selector plate and one or more of the primary battery conductor plate 208, the secondary battery conductor plate 210, and the common conductor plate 212. Where the conducting selector plate 206 is positioned as shown in FIG. 2B, the protrusion 220a establishes contact between the primary battery conductor plate 208 and the secondary battery conductor plate 210 while the protrusions 220b and

220c establish contact with the common conductor plate 212, which means the battery master disconnect switch is at position "both", meaning that both the primary battery and the secondary battery are turned on.

Figure 2H:
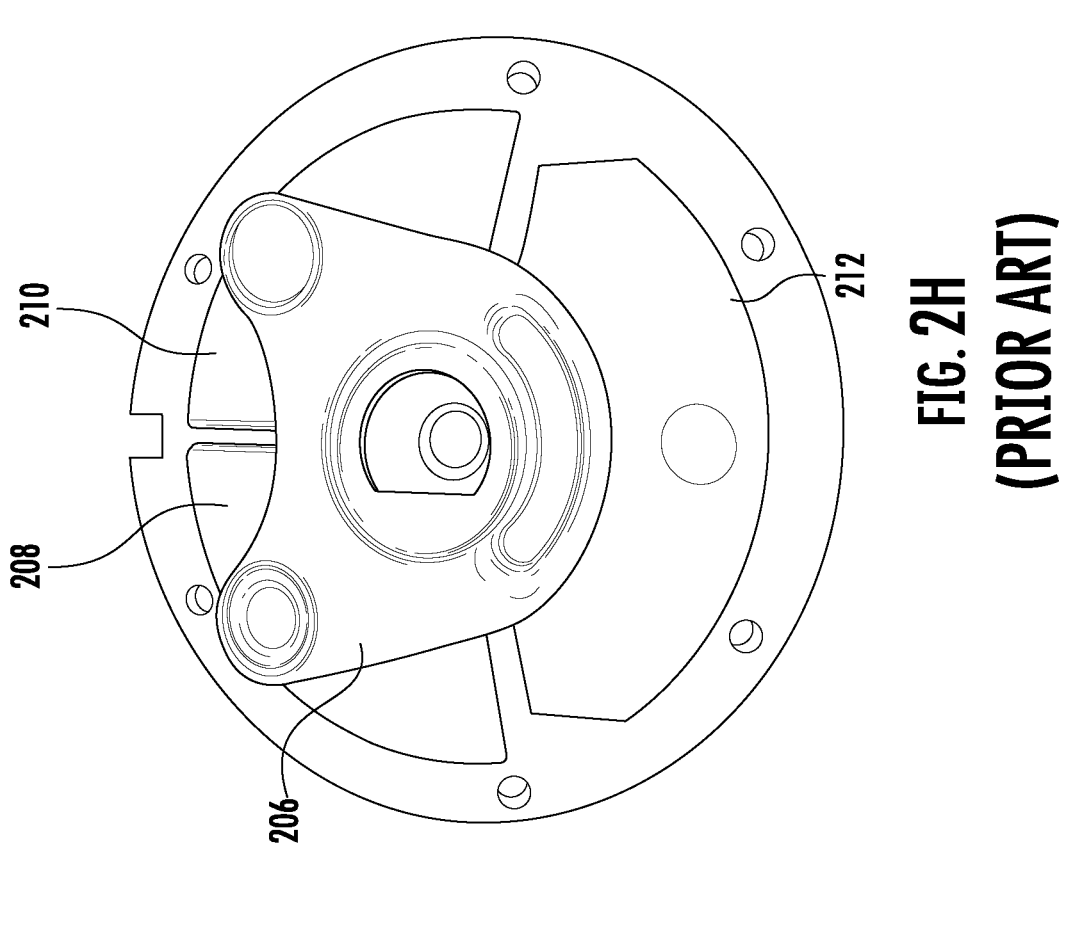
Figure 2G:
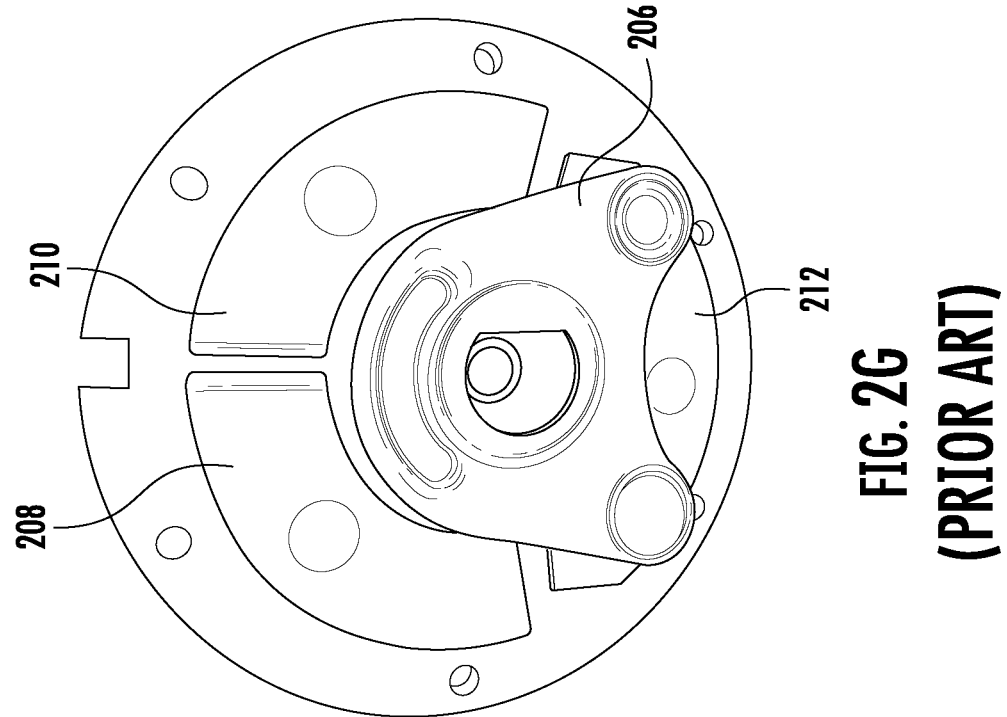

Ultimately, there are four different positions of the conducting selector plate 206, in which the following connections are established: 1) no connection to conductive surfaces 208 or 210 (both batteries are turned OFF). This position is illustrated in FIG. 2G, in which the conducting selector plate 206 is in contact with the common conductor plate 212 but not the primary battery conductor plate 208 or the secondary battery conductor plate 210. 2) connection between primary battery conductor plate 208 and common conductor plate 212 (primary battery is turned ON). This position is illustrated in FIG. 2F, in which the conducting selector plate 206 is in contact with the primary battery conductor plate 208 and the common conductor plate 212. 3) connection between secondary battery conductor plate 210 and common conductor plate 212 (secondary battery is turned ON). This position is illustrated in FIG. 2E, in which the conducting selector plate 206 is in contact with the secondary battery conductor plate 210 and the common conductor plate 212. 4) connection between primary battery conductor plate 208, secondary battery conductor plate 210, and common conductor plate 212 (primary and secondary batteries are turned ON). This position is illustrated in FIG. 2H, in which the conducting selector plate 206 is in contact with all three of the primary battery conductor plate 208, the secondary battery conductor plate 210, and the common conductor plate 212. In this manner, the battery master disconnect switch 100A controls access to the primary and secondary batteries.

FIGS. 3A-3D are representative drawings of a battery system 300 employing the battery master disconnect switch 100A of FIGS. 1A and 2A-2D, according to the prior art. Each figure shows the effect of the position of selection indicator 104a (FIG. 1A): in FIG. 3A, both batteries are OFF; in FIG. 3B, the primary battery is ON; in FIG. 3C, the secondary battery is ON; and in FIG. 3D, both batteries are ON. The battery system 300 is utilized in a marine craft such as a boat or other watercraft employing a primary battery 302 and a secondary battery 304 (also known as the "house" battery). The back panel 202 of battery master disconnect switch 100A, including primary terminal 214, secondary terminal 216, and common terminal 218, are shown as before. The primary battery 302 is connected at its positive terminal 320 to the primary terminal 214 of the battery master disconnect switch 100A using cable 306; the secondary battery 304 is connected at its positive terminal 322 to the secondary terminal 216 of the battery master disconnect switch using cable 308; and an alternator 312 of an engine 336 is connected to the common terminal 218 of the battery master disconnect switch 100A using cable 310. The alternator 312 may be thought of as a charging device, since it is able to charge the primary 302 and/or secondary 304 batteries while the engine 336 is running.

Alternatively, a starter 332 of the engine 336 may be connected to the common terminal 218 using cable 328. The house circuits 334 (e.g., a distribution panel of the house circuits) of the marine craft are also connected to the common terminal 218 using cable 330. The cables may include ring terminals for connection to the battery terminals, then secured with a nut, for example. The house circuits 334 may include a GPS fish finder, a VHF radio, running lights, a bilge pump, and other electrically powered devices that are used on the watercraft. The primary battery 302 is typically a short term, high amperage battery that is sufficient to engage the starter 332 of the engine 336. The secondary battery 304 is typically a lower amperage, long term battery that can supply power to the house circuits of the watercraft.

Once the starter 332 is engaged, the rotor shaft of the alternator 312 can charge a battery. Thus, once the engine has engaged, if the battery master disconnect switch 100A is set to "both" 114 (FIG. 1A), the alternator 312 will charge both the primary battery 302 and the secondary battery 304 while the engine is running. Once the watercraft is returned to dock, the battery master disconnect switch 100A makes it easy to turn off both the primary battery 302 and the secondary battery 304 before leaving the craft. An optional lock attached to the battery master disconnect switch 100A prevents changes to the battery master disconnect switch 100A, and thus unauthorized use of the watercraft when the owner is not present.

Figure 3A:
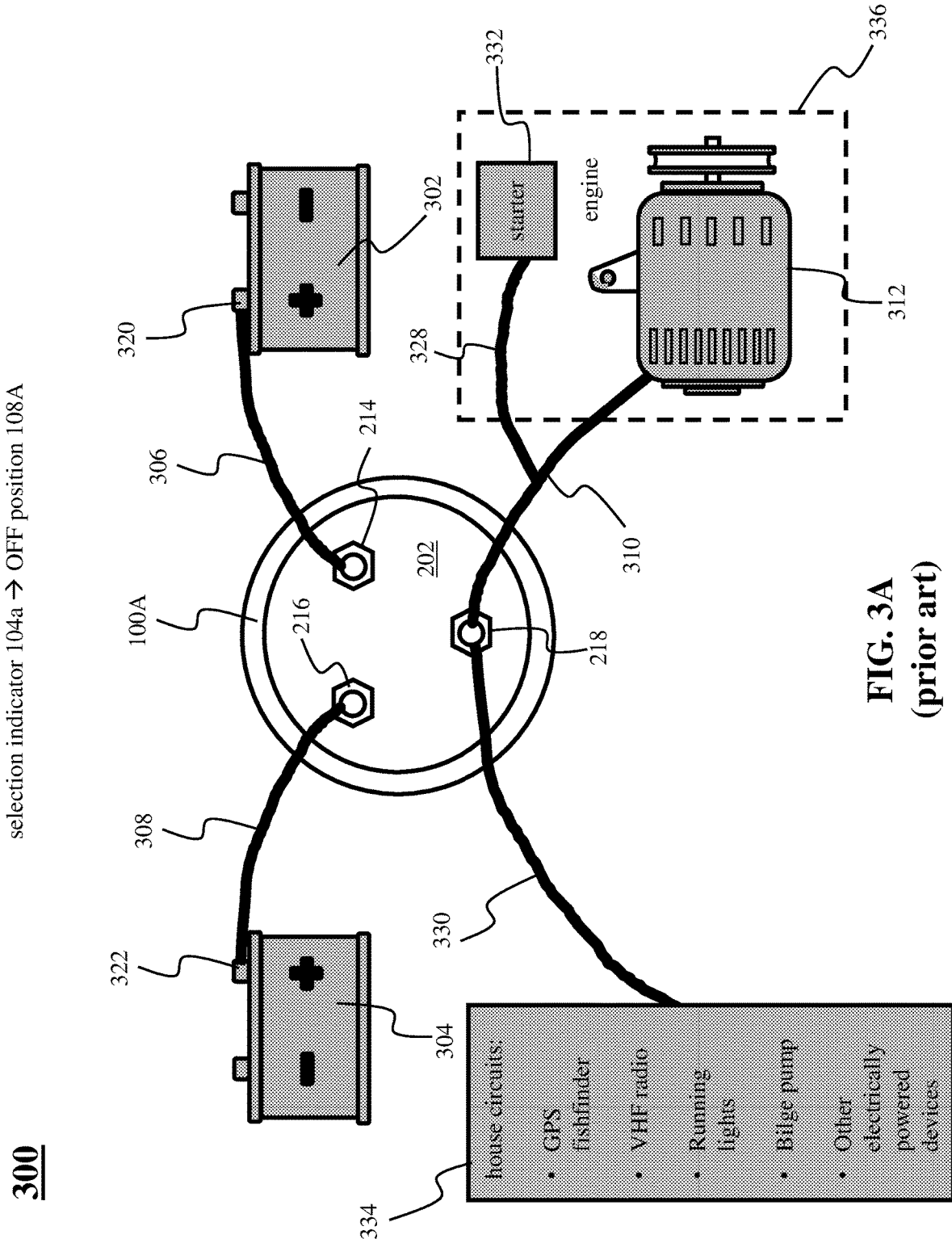
Figure 3B:
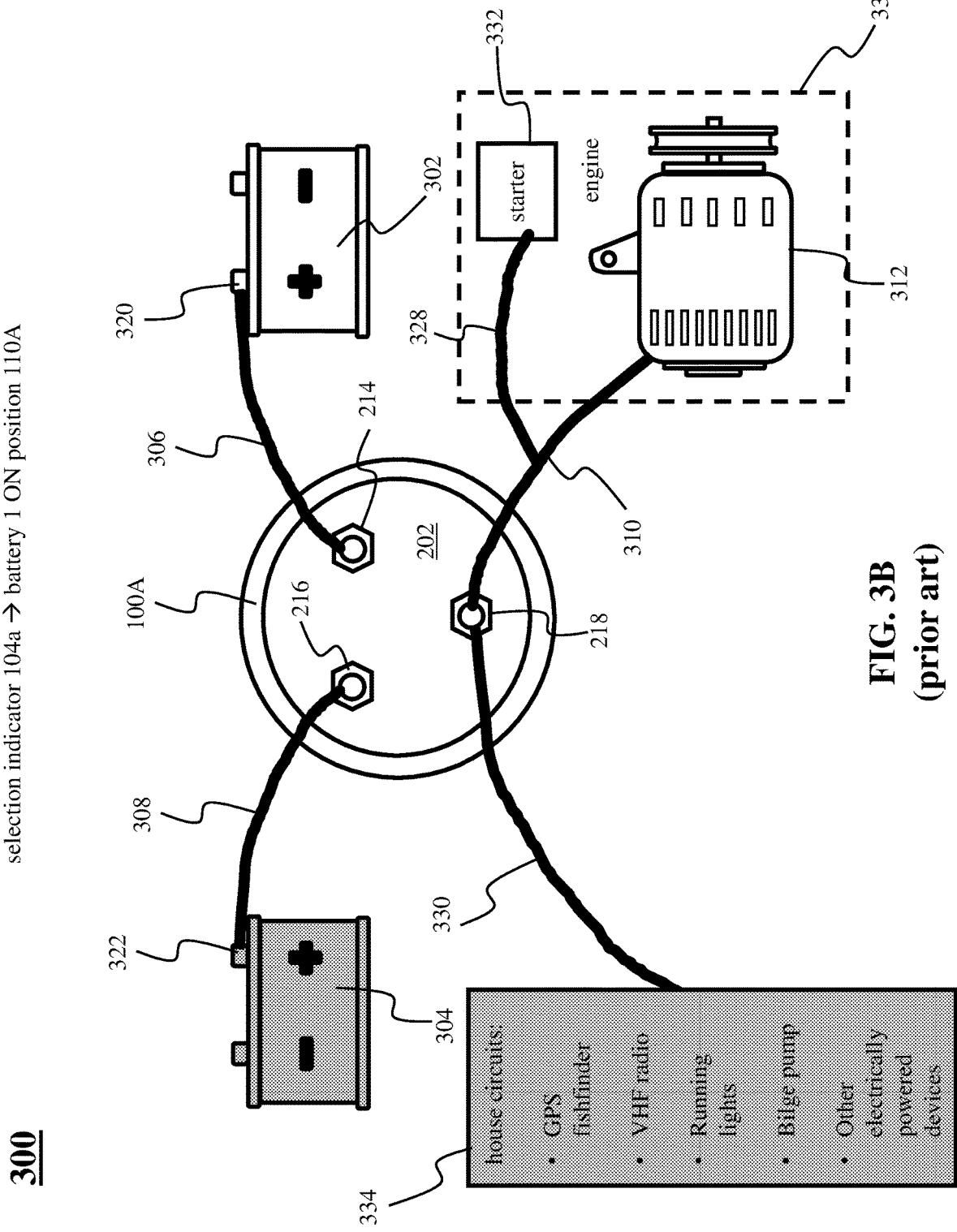

In FIGS. 3A-3D, the components are indicated in gray when they are not operable. In FIG. 3A, the selection indicator 104a (FIG. 1A) is set to the OFF 108a position. Therefore, both the primary battery 302 and the secondary battery 304 are turned off, which means the starter 332 and the alternator 312 of the engine 336 are inoperable and the house circuits 334 are inoperable. In FIG. 3B, the selection indicator 104a is set to the "1" position 110A, meaning that the primary battery 302 is turned on. The selection also causes a connection 338 between the primary terminal 214 and the common terminal 218 to be established. The connection 338 is established by the coupling of conductor plates inside the battery master disconnect switch 100A (see FIGS. 2B-2C). The starter 332 of the engine 336 can thus be engaged.

Figure 3D:
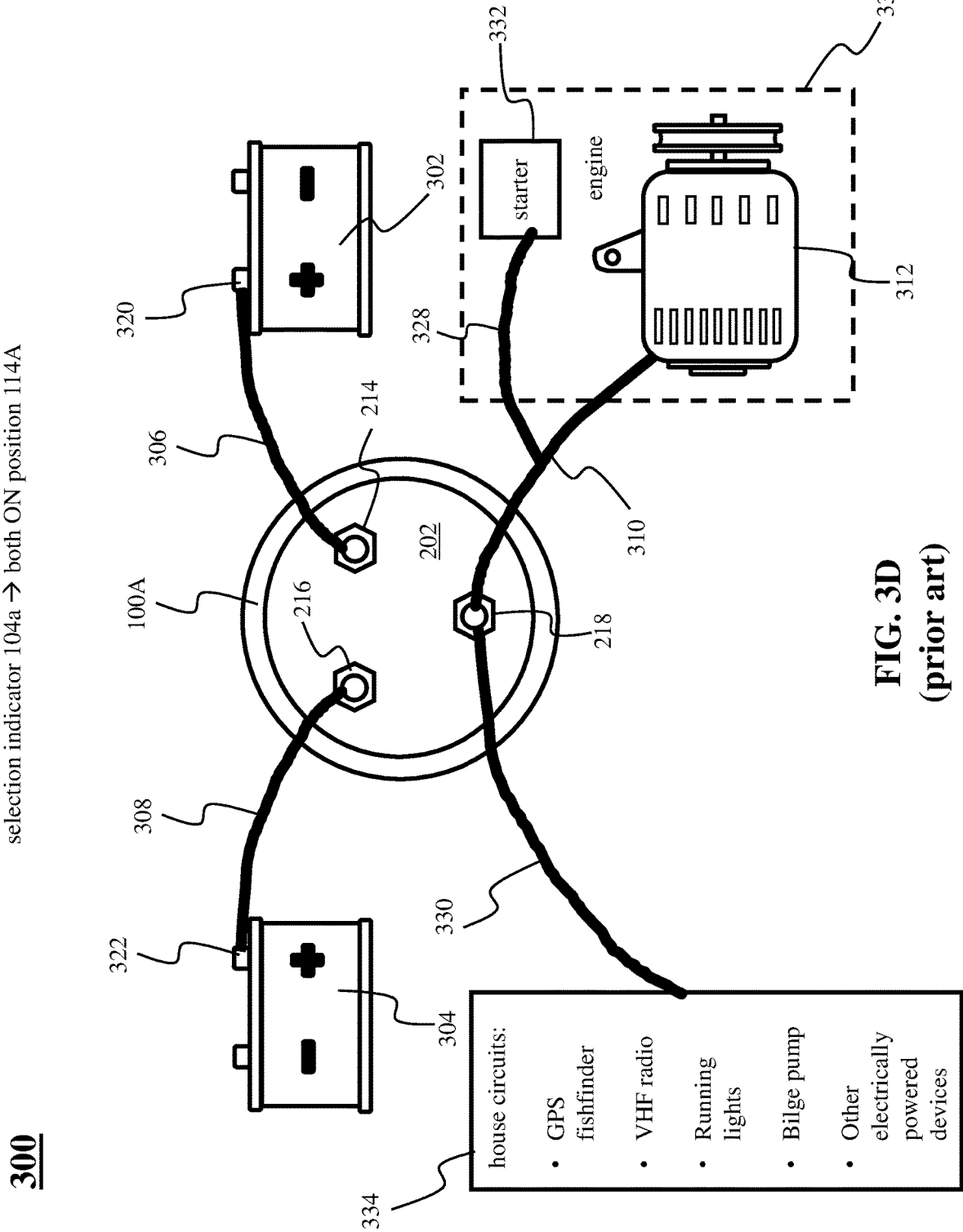

In FIG. 3C, the selection indicator 104a is set to the "2" position 112A, meaning that the secondary battery 304 is turned on. The selection also causes a connection 340 between the secondary terminal 216 and the common terminal 218 to be established. The house circuits 334 can thus be enabled. In FIG. 3D, the selection indicator 104a is set to BOTH 114A, meaning that both the primary battery 302 and the secondary battery 304 are turned on. The selection also causes the connections 338 and 340 to be established. Both the starter 332 and the house circuits 334 can be enabled.

As shown in the illustrations, the bilge pump is part of the house circuits of the watercraft. Thus, before leaving the dock, by turning off the battery master disconnect switch 100A, both batteries are disabled, meaning the bilge pump will not operate. The watercraft may be left unattended in dock for perhaps several days or weeks, as many owners use their boats for short periods of time. Thus, there is a risk that the watercraft will take on water, such as during rainstorms during the unattended period.

Further, although a single cable 330 is shown connecting the house circuits to the secondary battery 304, there may be multiple cables, one for each house circuit, connected to the battery. During maintenance, the secondary battery 304, like the primary battery 302, may be replaced or removed. Over time, the cable 330 may become worn due to repeatedly being removed from and reattached to the secondary battery 304. Further, the owner may forget to reattach one or more of the house circuits. If the forgotten house circuit is the bilge pump, the watercraft will be left in dock without the benefit of being able to remove water that may accumulate.

Figures 4A, 4B:
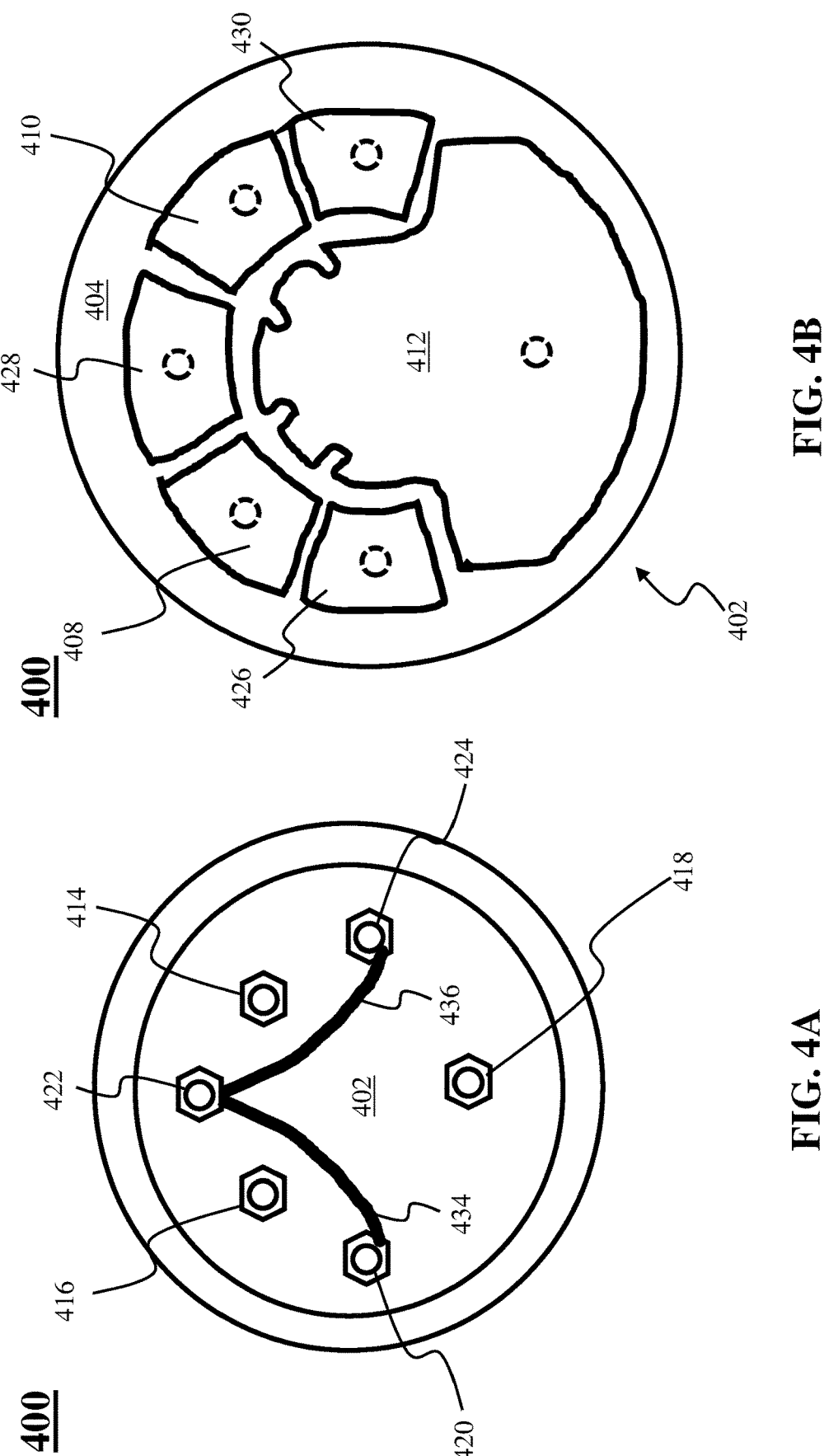
FIGS. 4A-4F are diagrams illustrating a battery master disconnect switch, in accordance with exemplary embodiments.

FIGS. 4A-4F are representative drawings of a battery master disconnect switch 400, according to exemplary embodiments of the present disclosure. FIG. 4A shows the outside of a back panel 402 of the battery master disconnect switch 400; FIG. 4B shows the inside of the back panel;

FIGS. 4C-4F show the four possible configurations of the battery master disconnect switch 400. The front panel may be substantially identical to that of the battery master disconnect switch 100A (FIGS. 1A and 2A) or 100B (FIG. 1B) described above. As with the legacy battery master disconnect switches 100A and 100B, the battery master disconnect switch 400 features a primary terminal 414 (for connection to a primary battery), a secondary terminal 416 (for connection to a secondary battery), and a common terminal 418, as illustrated in FIG. 4A. Additionally, according to exemplary embodiments, the battery master disconnect switch 400 includes auxiliary terminal 420, auxiliary terminal 422, and auxiliary terminal 424. The auxiliary terminals 420, 422, and 424 are for any device that is to be connected to a battery even when the battery master disconnect switch is set to the OFF position (such as OFF 108a in FIG. 1A). In exemplary embodiments, one of the auxiliary terminals 420, 422, and 424 is connected to the bilge pump of the watercraft. In this manner, the bilge pump is operable even after the battery master disconnect switch 400 is set to the OFF position (e.g., OFF 108a in FIG. 1A). In FIG. 4A, the auxiliary terminal 420 is shown at a "9 o'clock" position of the back panel 402, the auxiliary terminal 422 is shown at a "12 o'clock" position of the back panel, and the auxiliary terminal 424 is shown at a "3 o'clock" position of the back panel, though these locations are not meant to be limiting.

FIG. 4B shows an inside surface 404 of the back panel 402. Like the legacy battery master disconnect switch 100 shown in FIG. 2C, the battery master disconnect switch 400 features a primary battery conductor plate 408, a secondary battery conductor plate 410, and a common conductor plate 412. The primary battery conductor plate 408 is smaller than the primary battery conductor plate 208 and the secondary battery conductor plate 410 is smaller than the secondary battery conductor plate 210 (FIG. 2C). Additionally, in exemplary embodiments, the inside surface 404 includes three additional electrically conductive plates: a first auxiliary conductor plate 426, a second auxiliary conductor plate 428, and a third auxiliary conductor plate 430. The five conductor plates 408, 410, 426, 428, and 430 do not touch one another, nor do any of them touch the common conductor plate.

Primary terminal 414 thus corresponds to primary battery conductor plate 408; secondary terminal 416 corresponds to secondary battery conductor plate 410; auxiliary terminal 420 corresponds to auxiliary conductor plate 430; auxiliary terminal 422 corresponds to auxiliary conductor plate 428; and auxiliary terminal 424 corresponds to auxiliary conductor plate 426. Dashed circles in FIG. 4B show where the terminals are connected to respective conductor plates.

In exemplary embodiments, the auxiliary terminals 420, 422, and 424 are electrically connected, such as by cables 434 and 436 (FIG. 4A). Thus, the auxiliary conductor plates 426, 428, and 430 are also electrically connected. In some embodiments, the battery master disconnect switch 400 has a single auxiliary terminal (420, 422, or 424), which is electrically connected to all three auxiliary conductor plates 426, 428, and 430. In other embodiments, the three auxiliary conductor plates 426, 428, and 430 are interconnected (but not visible in FIG. 4B) and thus are electrically connected to one another.

FIGS. 4C-4F show the inside surface 404 of the back panel 402, this time with a conducting selector plate 432. The conducting selector plate 432 is used to establish connections between two or more of the conductor plates, as did the conducting selector plate 206 for the legacy battery master disconnect switch 100 (FIGS. 2E-2H). However, the conducting selector plate 432 is shaped differently from the legacy conducting selector plate 206, and features two additional arms 438 and 440, to facilitate connection to the appropriate conductor plates. Additionally, although not shown in the figures, the conducting selector plate 432 may include protrusions such as the protrusions 220*a-c* (FIG. 2B), also to facilitate connection to the conductor plates.

Figures 4C, 4D:
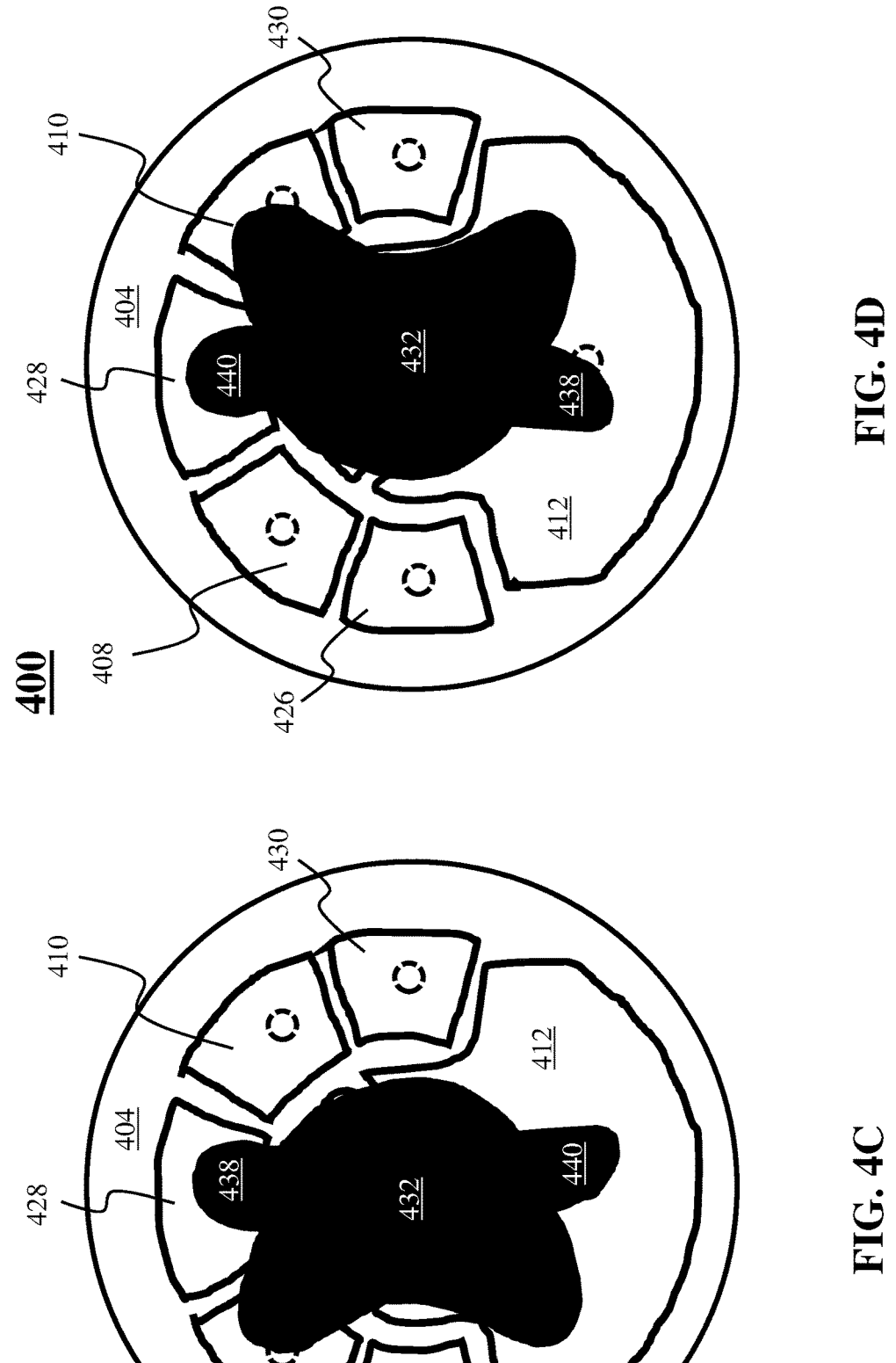

In FIG. 4C, the conducting selector plate 432 is positioned to connect with both the primary battery conductor plate 408 and the common conductor plate 412. An electrical connection is thus established between the primary battery conductor plate 408 and the common conductor plate 412, the primary battery ON position. However, the arm 438 of the conducting selector plate 432 also connect with the auxiliary conductor plate 428. Thus, an electrical connection is established between the auxiliary conductor plate 428 and the common conductor plate 412, meaning that whatever is connected to the auxiliary terminal 422 can be powered by the primary battery, in exemplary embodiments.

In FIG. 4D, the conducting selector plate 432 is positioned to connect with both the secondary battery conductor plate 410 and the common conductor plate 412. An electrical connection is thus established between the secondary battery conductor plate 410 and the common conductor plate 412, the secondary battery ON position. However, the arm 440 of the conducting selector plate 432 also connects with the auxiliary conductor plate 428. Thus, an electrical connection is established between the auxiliary conductor plate 428 and the common conductor plate 412, meaning that whatever is connected to the auxiliary terminal 422 can be powered by the secondary battery, in exemplary embodiments.

Figures 4E, 4F:
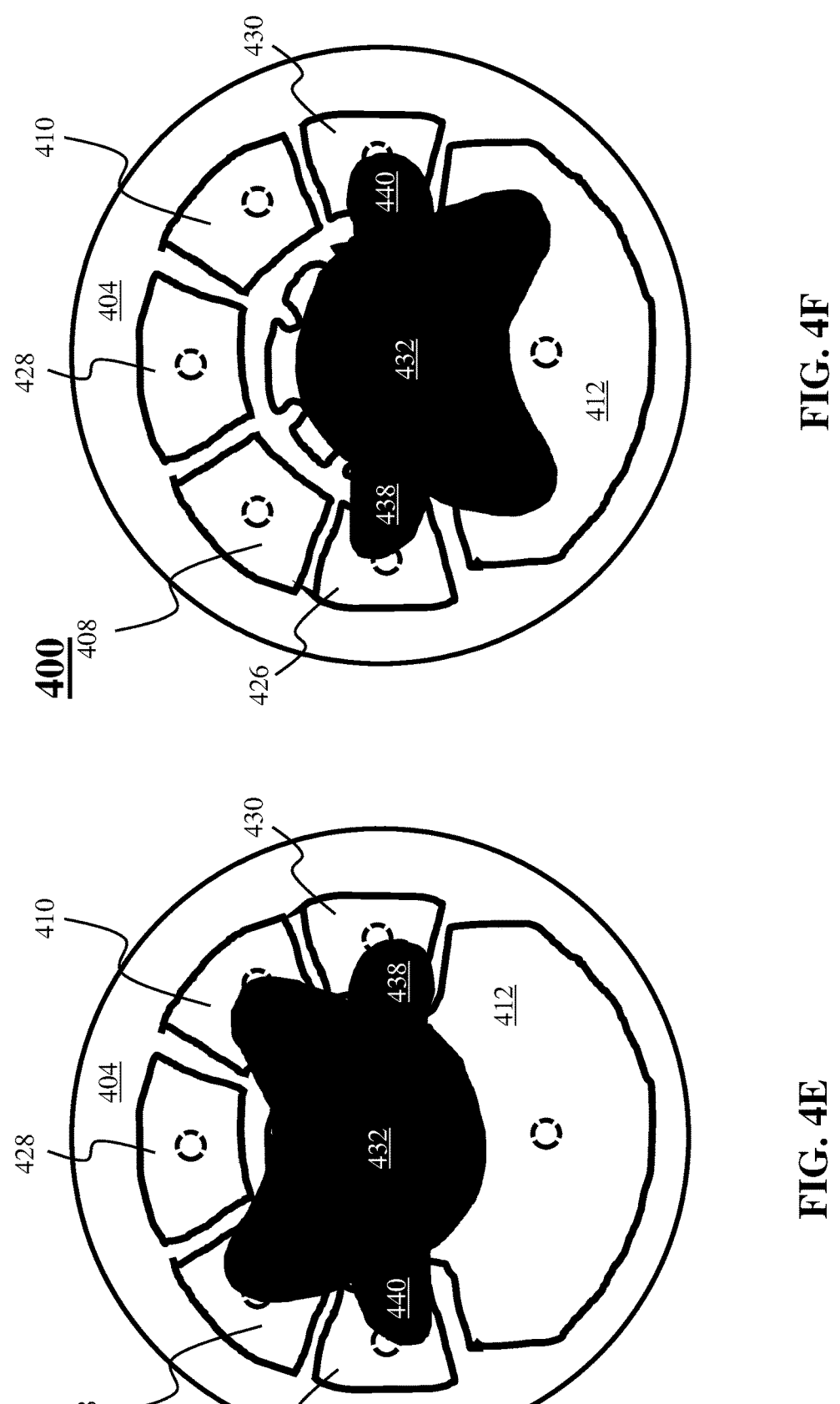

In FIG. 4E, the conducting selector plate 432 is positioned to connect with both the primary battery conductor plate 408, the secondary battery conductor plate 410, and the common conductor plate 412. An electrical connection is thus established between the primary battery conductor plate 408 and the common conductor plate 412, and further an electrical connection is established between the secondary battery conductor plate 410 and the common conductor plate 412, so this is the primary and secondary batteries ON position. However, the arm 440 of the conducting selector plate 432 also connects with the auxiliary conductor plate 426 and the arm 438 connects with the auxiliary conductor plate 430. Thus, an electrical connection is established between the auxiliary conductor plate 426 and the common conductor plate 412 and an electrical connection is established between the auxiliary conductor plate 430 and the common conductor plate 412, meaning that whatever is connected to the auxiliary terminals 420 or 424 can be powered by the primary or secondary batteries, in exemplary embodiments.

In FIG. 4F, the conducting selector plate 432 is positioned to connect with neither the primary battery conductor plate 408 nor the secondary battery conductor plate 410. No electrical connection is established between the primary battery conductor plate 408 and the common conductor plate 412, and no electrical connection is established between the secondary battery conductor plate 410 and the common conductor plate 412, so this is the primary and secondary batteries OFF position. However, the arm 438 of the conducting selector plate 432 connects with the auxiliary conductor plate 426 and the arm 440 contacts the auxiliary conductor plate 430. Thus, an electrical connection is established between the auxiliary conductor plate 426 and the common conductor plate 412 and an electrical connection is established between the auxiliary conductor plate 430 and the common conductor plate 412, meaning that whatever is connected to the auxiliary terminals 420 or 424 can be powered by the primary or secondary batteries, in exemplary embodiments.

Figure 5:
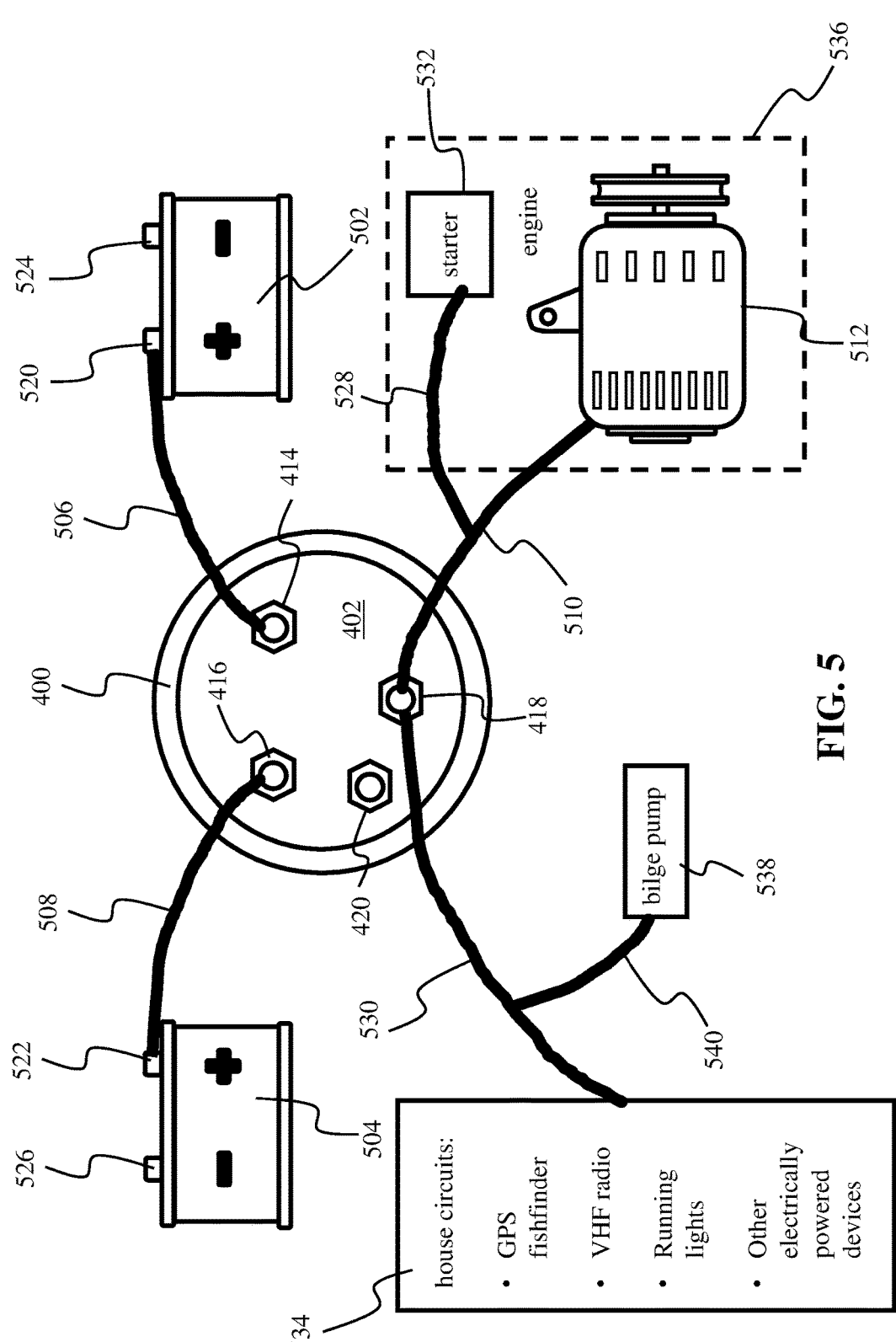
FIG. 5 is a diagram illustrating a battery system including the battery master disconnect switch of FIGS. 4A-4F, in accordance with exemplary embodiments.

FIG. 5 is a representative drawing of a novel battery system 500 which utilizes the battery master disconnect switch 400, according to exemplary embodiments. The back panel 402 of the novel battery master disconnect switch 400 is shown, including the primary terminal 414, the secondary terminal 416, the common terminal 418, and one of the auxiliary terminals 420. In exemplary embodiments, the auxiliary terminal 420 connects with the three auxiliary conductor plates 426, 428, and 430 (FIG. 4B) and thus enables electrical connections between these components. The system 500 is a marine craft such as a boat or other watercraft employing a primary battery 502 and a secondary (house) battery 504. The primary battery 502 is connected at its positive terminal 520 to the primary terminal 414 of the battery master disconnect switch 400 using cable 506; the secondary battery 504 is connected at its positive terminal 522 to the secondary terminal 416 of the battery master disconnect switch using cable 508; and an alternator 512 of an engine 536 is connected to the common terminal 418 of the battery master disconnect switch 400 using cable 510. Alternatively, a starter 532 of the engine 536 may be connected to the common terminal 418 using cable 528. The house circuits 534 (e.g., a DC distribution panel of the house circuits) of the marine craft are also connected to the common terminal 418 using connector 530. The house circuits 534 may include a GPS fish finder, a VHF radio, running lights, and other electrically powered devices that are used on the watercraft.

The negative terminal 524 of the primary battery 502 and the negative terminal 526 of the secondary battery are grounded to the engine 536 or to a negative engine bus of the vehicle. In exemplary embodiments, the primary battery 302 is a short term, high amperage battery that is sufficient to engage the starter 532 of the engine 536, while the secondary battery 504 is a lower amperage, long term battery that supplies power to the house circuits of the watercraft.

Once the starter 532 is engaged, the rotor shaft of the alternator 512 charges a battery. Thus, once the engine has engaged, if the battery master disconnect switch 400 is set to "both" 114 (FIG. 1A), the alternator 512 will charge both the primary battery 502 and the secondary battery 504 while the engine is running. Once the watercraft is returned to dock, the battery master disconnect switch 400 makes it easy to turn off the primary battery 502 and disengage the secondary battery 504 from the house circuits 534 before leaving the craft. However, in contrast to the legacy battery system 300 (FIGS. 3A-3D), the primary battery 502, the secondary battery 504, or both the primary and secondary batteries are available to operate a bilge pump 538 in exemplary embodiments, despite the battery master disconnect switch 400 being in the OFF position (FIG. 4F).

In contrast to the prior art battery system 300, the bilge pump 538 is not included as part of the house circuits 534 of the watercraft. Instead, the bilge pump 538 is connected to the common terminal 418 using cable 540. The conducting selector plate 432 (FIG. 4F) connects the auxiliary conductor plates 426 and 430 to the common conductor plate 412.

Thus, before leaving the dock, despite turning off the battery master disconnect switch 400 to disable both the primary battery 502 and the secondary battery 504, there is still an electrical connection between the bilge pump 538 and one or both batteries. Thus, even though the starter 532 cannot be engaged and the house circuits 534 cannot be enabled, the bilge pump 538 will operate, in exemplary embodiments. Alternatively, the positive terminal 520 may be connected to a different always on device besides the bilge pump 538. Because many owners use their boats for short periods of time, such as over a weekend, the watercraft may be left unattended in dock for perhaps several days or weeks. Despite there being a risk that the watercraft will take on water, such as during rainstorms during the unattended period, the bilge pump 538 is able to operate. Thus, as used herein, the reference to an "always on device" may be any device of a system or application in which the device has power no matter the setting of the battery master disconnect switch.

Table 1 is a state table indicating the effect of the auxiliary terminal 420 of the battery master disconnect switch 400, according to exemplary embodiments. Table 1 shows that, no matter the setting of the battery master disconnect switch 400, the bilge pump will receive power from one of the batteries and will thus always be operational.

TABLE 1

Device state using battery master disconnect switch 400

| battery master disconnect switch setting | battery 1 | battery 2 | bilge pump |
|---|---|---|---|
| OFF | OFF | OFF | ON |
| 1 | ON | OFF | ON |
| 2 | OFF | ON | ON |
| 1 + 2 | ON | ON | ON |

In exemplary embodiments, even when the secondary battery 504 is turned off by the battery master disconnect switch 400, the bilge pump 538 will continue to operate. If the auxiliary terminal 420 is connected instead to the primary battery 502, then, once the battery master disconnect switch 400 turns off the primary battery, the bilge pump 538 will continue to operate.

Figure 6A:
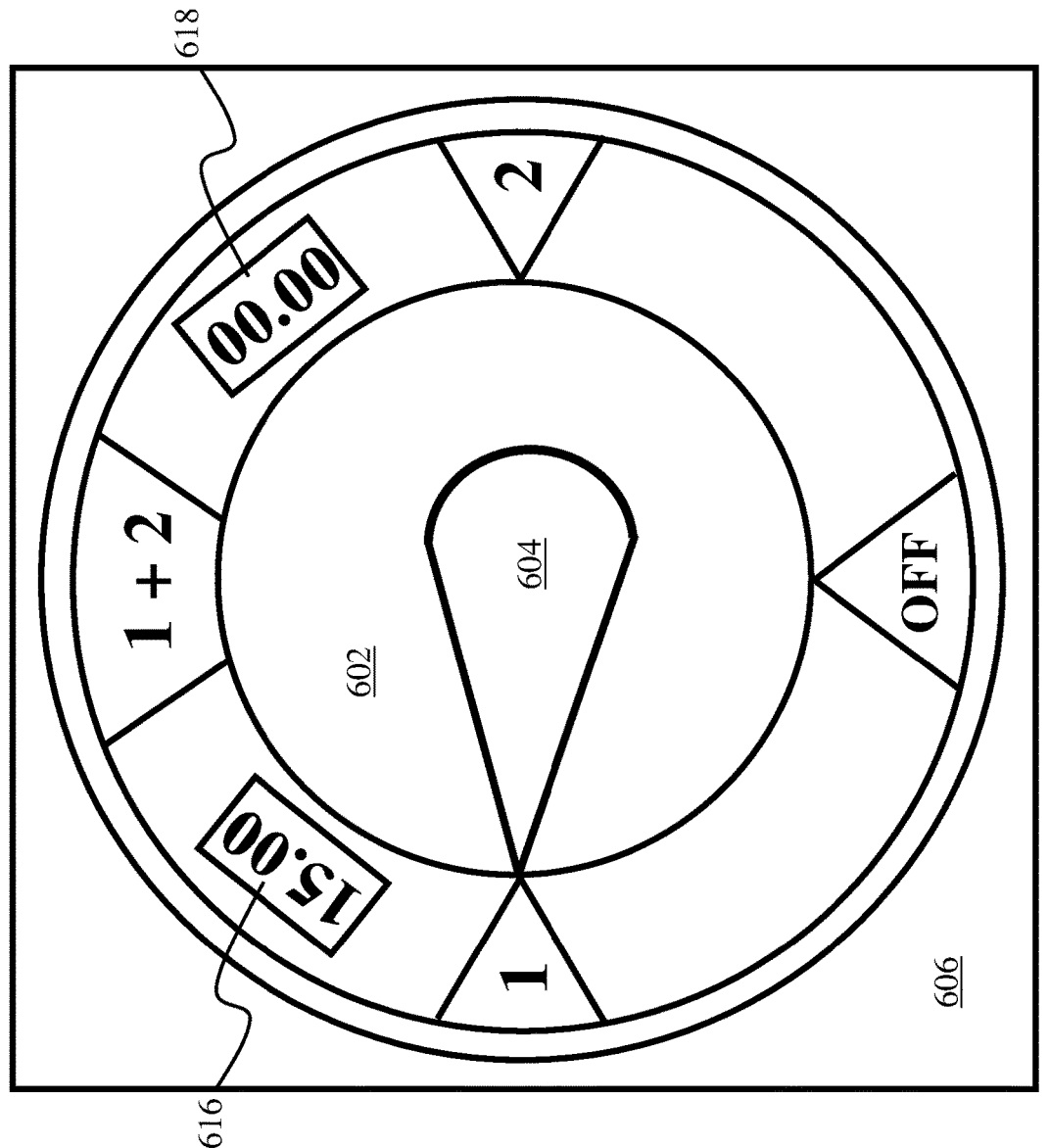
FIGS. 6A-6D are diagrams illustrating a battery master disconnect switch, in accordance with exemplary embodiments.

FIGS. 6A-6D are representative drawings of a battery master disconnect switch including integrated voltage indicators, according to exemplary embodiments. A front panel 606 of the battery master disconnect switch 600 includes a selector knob 602 with a selection indicator 604. In FIG. 6A, the selection indicator 604 points to a "1", indicating selection of the primary battery; in FIG. 6B, the selection indicator points to a "2", indicating selection of the secondary battery; in FIG. 6C, the selection indicator points to a "1+2", indicating selection of both the primary and secondary batteries; and in FIG. 6D, the selection indicator points to OFF, indicating both batteries are turned off.

In exemplary embodiments, the battery master disconnect switch features a primary battery voltage indicator 616 and a secondary battery voltage indicator 618. The primary and secondary battery voltage indicators 616, 618 include numeric indicators of the voltage of respective batteries. In exemplary embodiments, the primary and secondary battery voltage indicators 616, 618 feature light emitting diode (LED) indicators to visually present numbers to indicate voltages, based on voltage measurements taken of respective primary and secondary batteries. In exemplary embodiments, the numbers displayed represent voltages, in volts (V), for primary and secondary batteries.

In FIG. 6A, the selection indicator 604 specifies the primary battery; thus, the primary battery is enabled (and the secondary battery is disabled). The primary battery voltage indicator 616 provides a reading of 15.00V and the secondary battery voltage indicator 618 provides a reading of 00.00V. As an alternative to the LED indicators, the primary and secondary battery voltage indicators 616,618 may utilize other means, such as an analog indicator, for conveying voltage information.

Figure 6B:
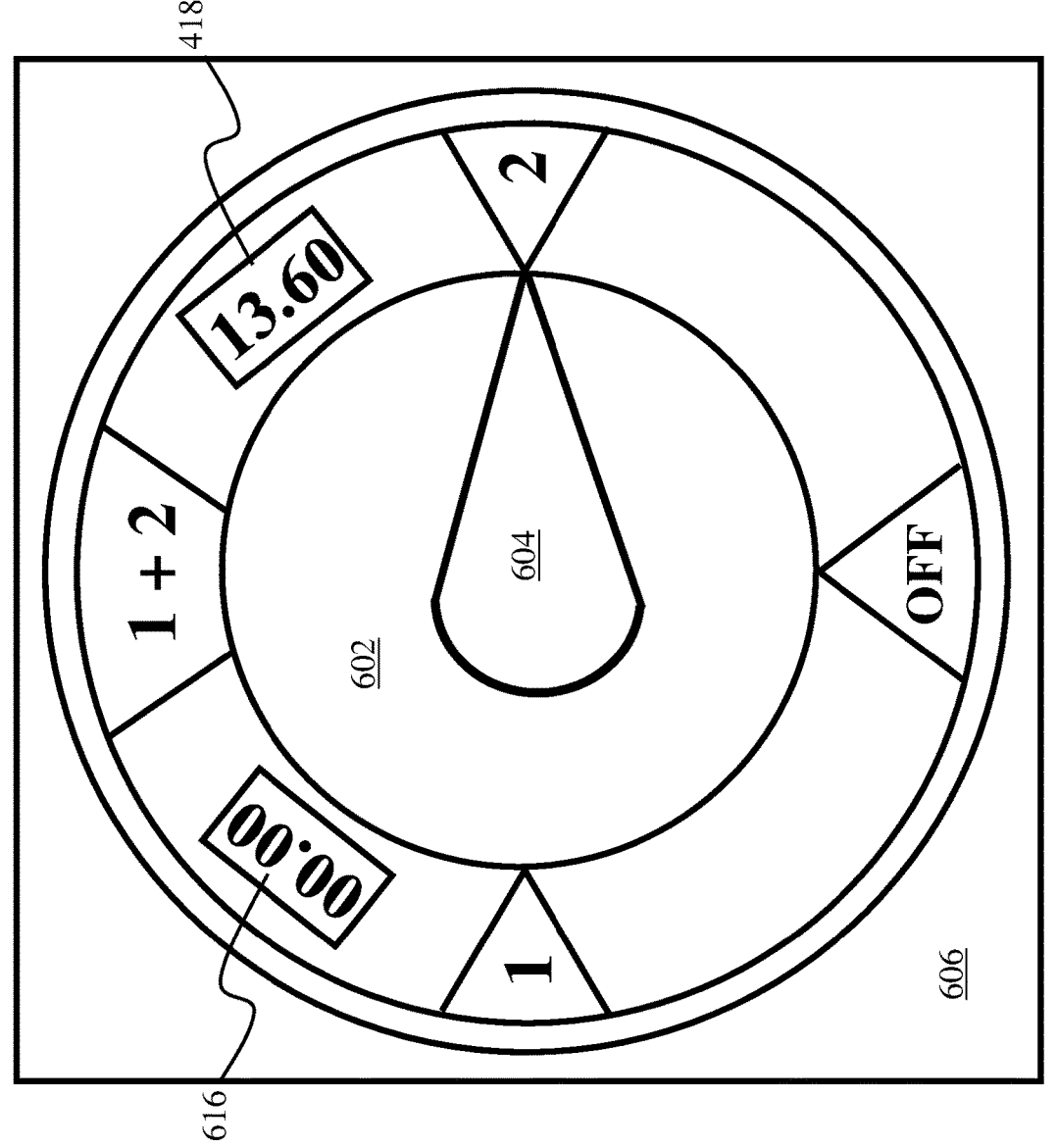
Figure 6C:
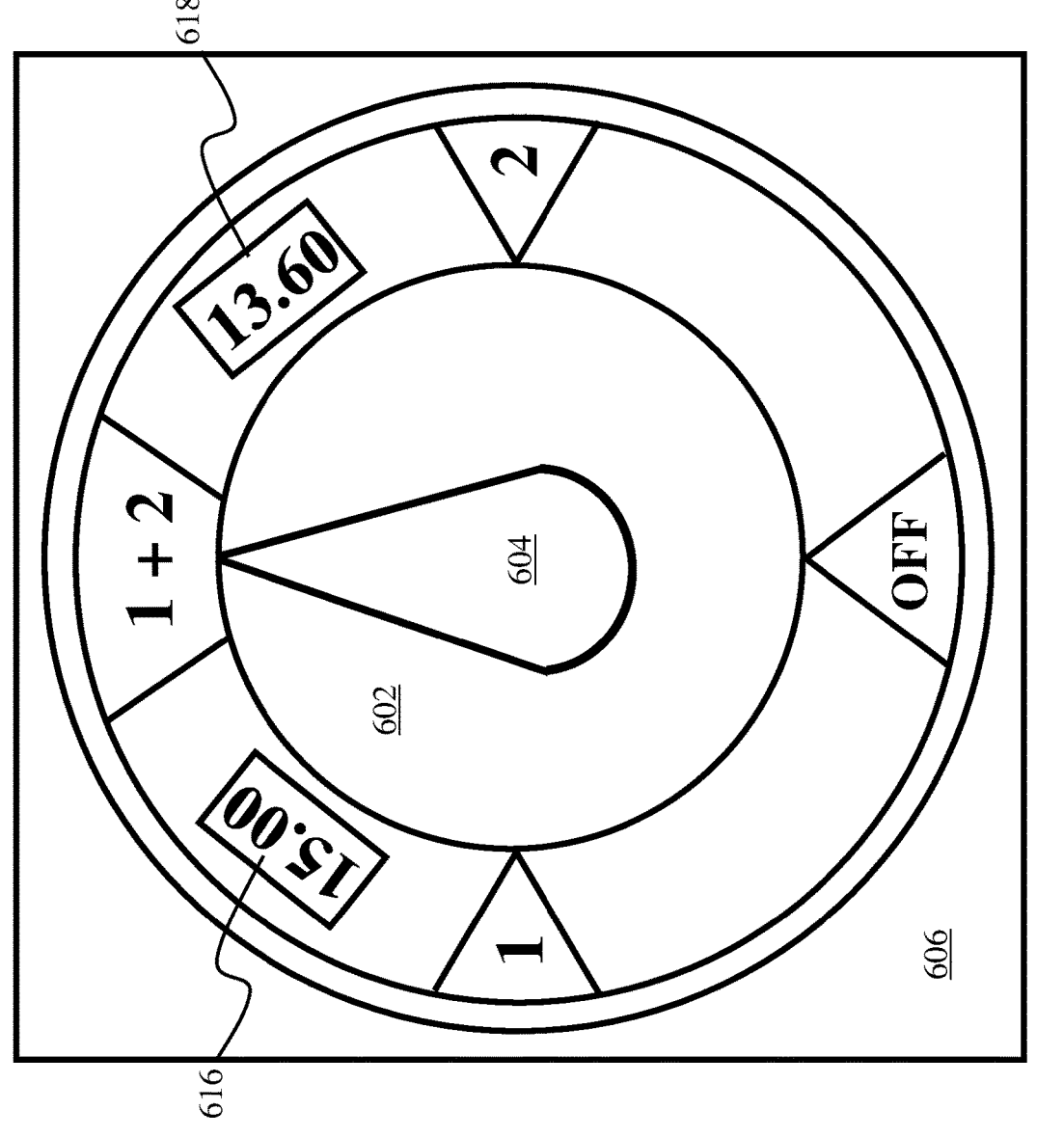
Figure 6D:
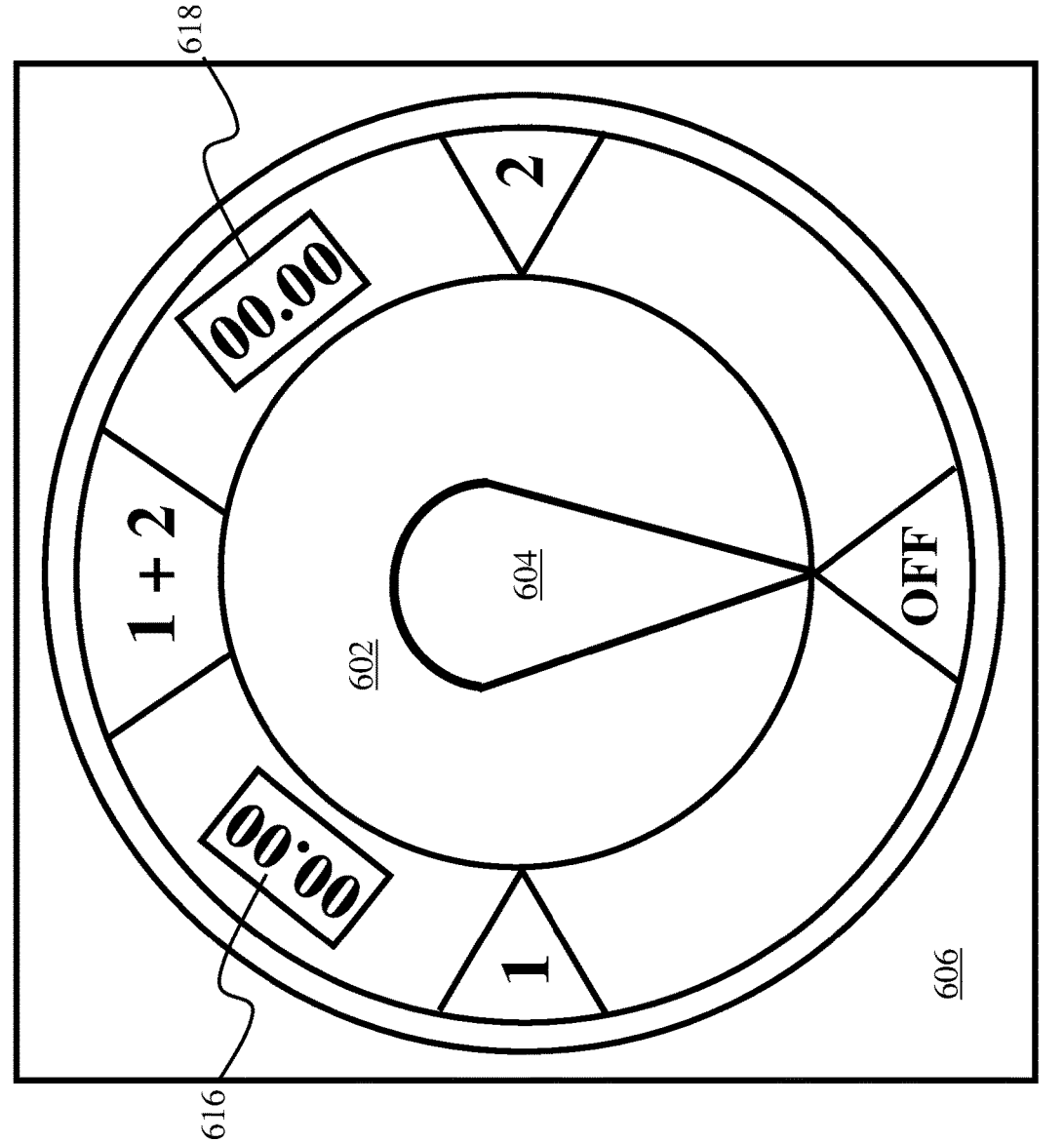

In FIG. 6B, the selection indicator 604 specifies the secondary battery; thus, the secondary battery is enabled (and the primary battery is disabled). The primary battery voltage indicator 616 provides a reading of 00.00V and the secondary battery voltage indicator 618 provides a reading of 13.60V. In FIG. 6C, the selection indicator 604 specifies both the primary and secondary batteries; thus, the primary and secondary batteries are enabled. The primary battery voltage indicator 616 provides a reading of 15.00V and the secondary battery voltage indicator 618 provides a reading of 13.60V. In FIG. 6D, the selection indicator 604 specifies neither battery; thus, both the primary and secondary batteries are disabled. The primary battery voltage indicator 416 provides a reading of 00.00V and the secondary battery voltage indicator 618 provides a reading of 00.00V.

Thus, in exemplary embodiments, the primary battery voltage indicator 616 provides a reading when the primary battery is enabled and does not provide a reading when the primary battery is disabled. Similarly, in exemplary embodiments, the secondary battery voltage indicator 618 provides a reading when the secondary battery is enabled and does not provide a reading when the secondary battery is disabled. When both batteries are enabled, the primary and secondary battery voltage indicators 616, 618 will provide readings for their respective batteries. Alternatively, the primary and secondary battery voltage indicators 616, 618 will provide no readings for the respective batteries at this setting, and instead will provide voltage information when one of the batteries is enabled but not when both batteries are enabled. When both batteries are disabled, neither the primary nor the secondary battery voltage indicator 616, 618 will provide readings.

Figure 7A:
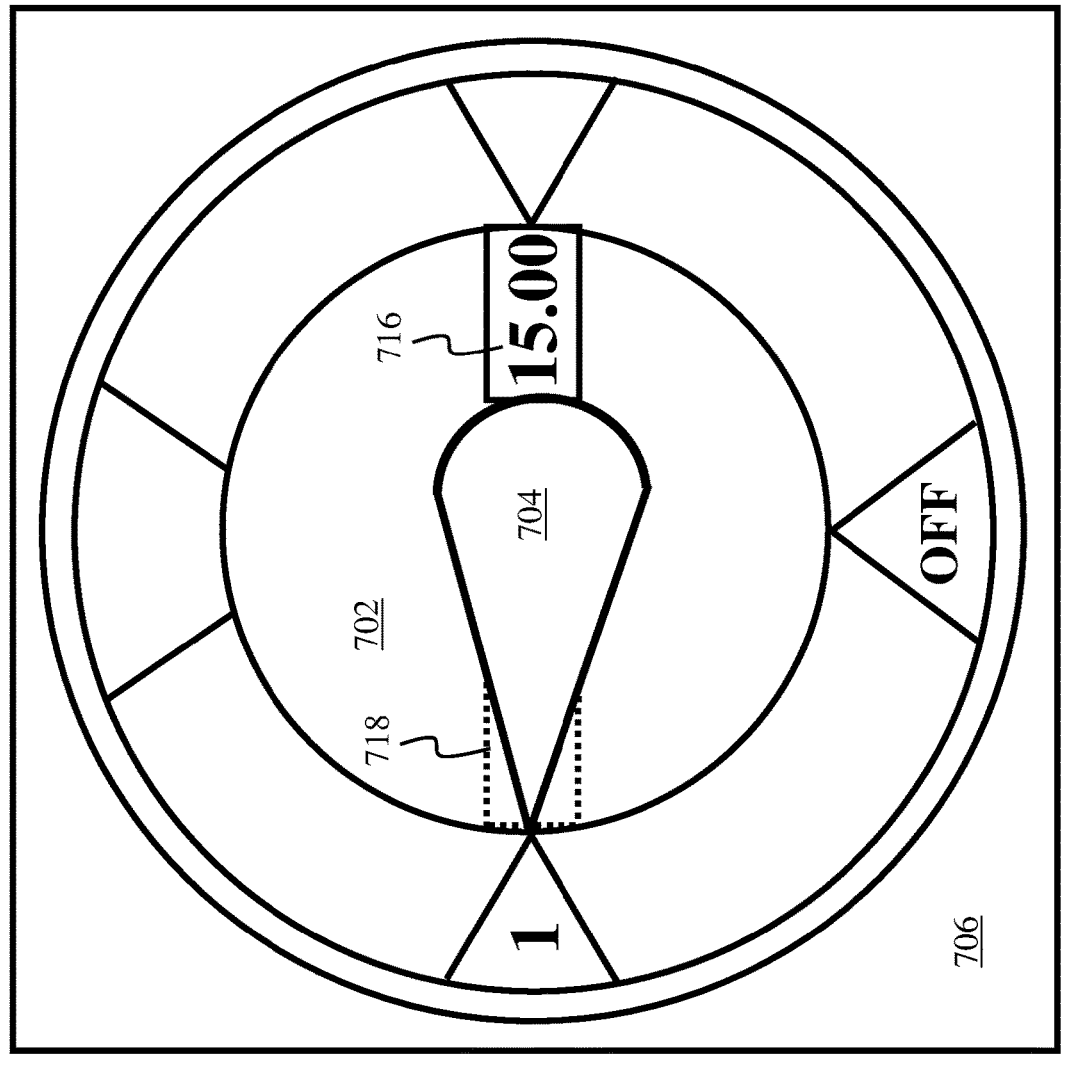
FIGS. 7A-7D are diagrams illustrating a battery master disconnect switch, in accordance with exemplary embodiments.

FIGS. 7A-7D are representative drawings of a battery master disconnect switch including integrated voltage indicators, according to exemplary embodiments. A front panel 706 of the battery master disconnect switch 700 includes a selector knob 702 with a selection indicator 704. In FIG. 7A, the selection indicator 704 points to a "1", indicating selection of the primary battery; in FIG. 7B, the selection indicator points to a "2", indicating selection of the secondary battery; in FIG. 7C, the selection indicator points to a "1+2", indicating selection of both the primary and secondary batteries; and in FIG. 7D, the selection indicator points to "OFF", indicating both batteries are turned off.

In exemplary embodiments, the battery master disconnect switch features a primary battery voltage indicator 716 and a secondary battery voltage indicator 718. The primary and secondary battery voltage indicators 716, 718 include numeric indicators of the voltage of respective batteries. In exemplary embodiments, the primary and secondary battery voltage indicators 716, 718 are light emitting diode (LED) indicators that visually present numerical values that represent voltages, in volts (V), for primary and secondary batteries. In exemplary embodiments and in contrast to the battery master disconnect switch 600 (FIGS. 6A-6D), the primary and secondary battery voltage indicators 716, 718 are presented in the alternative when a single battery is enabled, with one battery voltage indicator being at least partially obscured by the selection indicator 704.

In FIG. 7A, the selection indicator 704 specifies the primary battery; thus, the primary battery is enabled (and the secondary battery is disabled). The primary battery voltage indicator 716 provides a reading of 15.00V and the secondary battery voltage indicator 718 is not visible due to being at least partially obscured by the selection indicator 704.

Figure 7B:
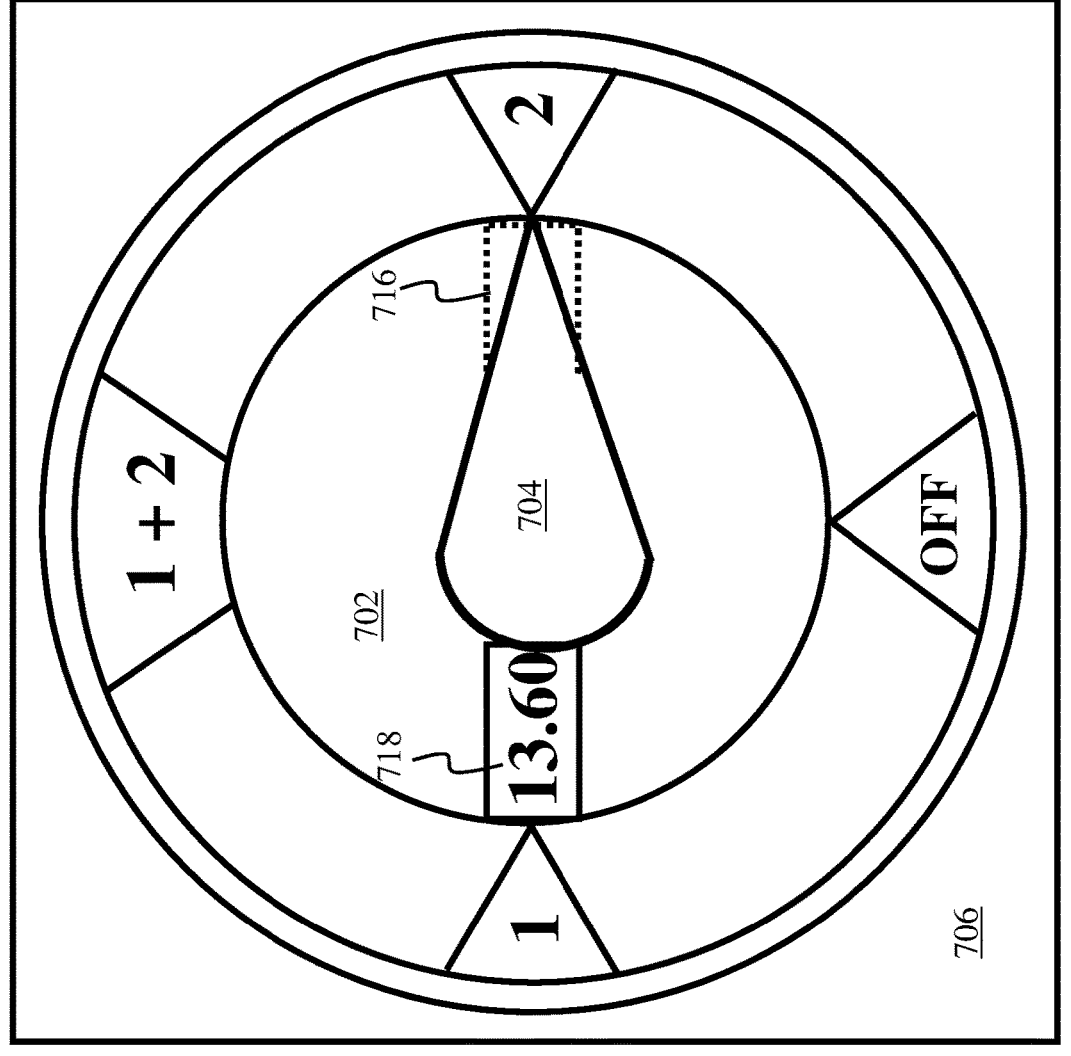
Figure 7C:
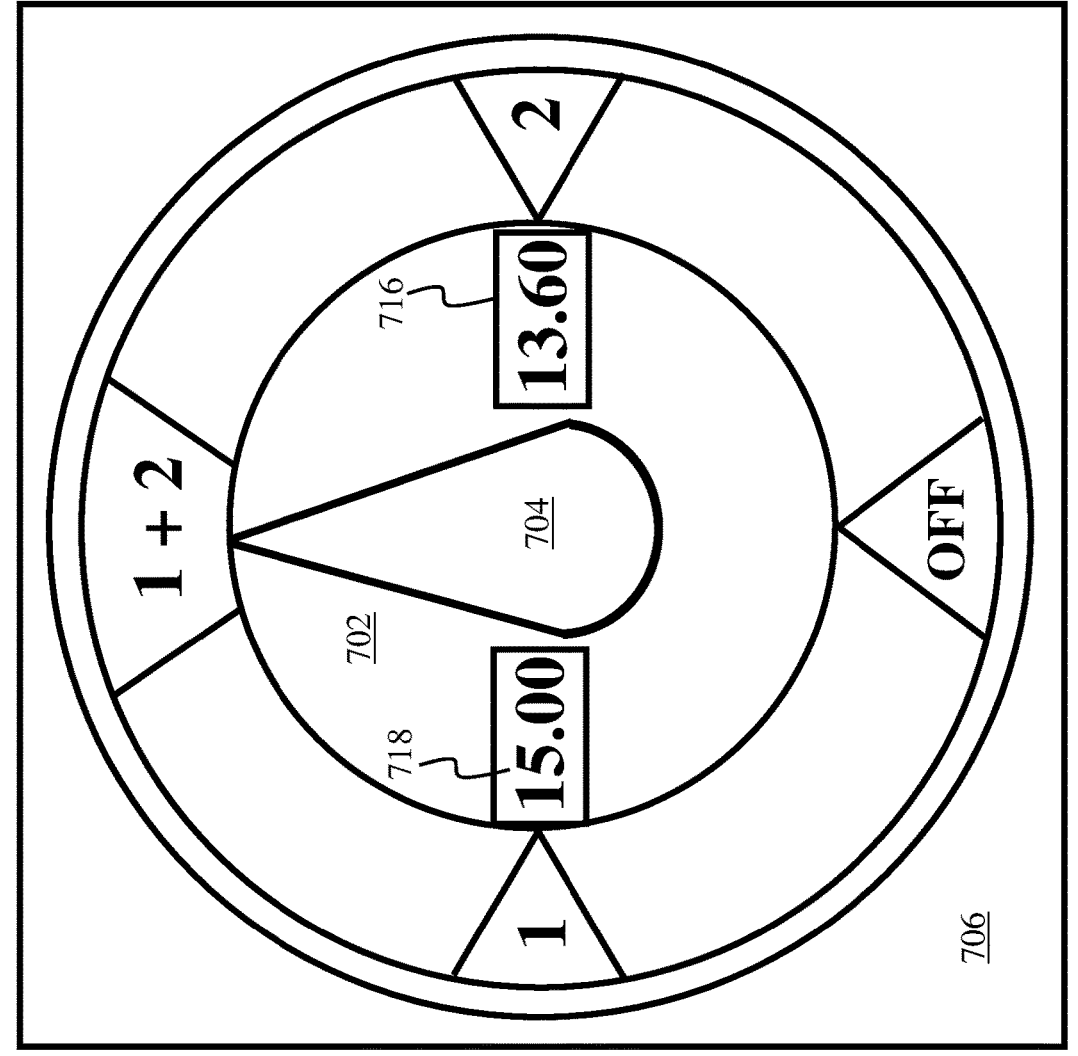
Figure 7D:
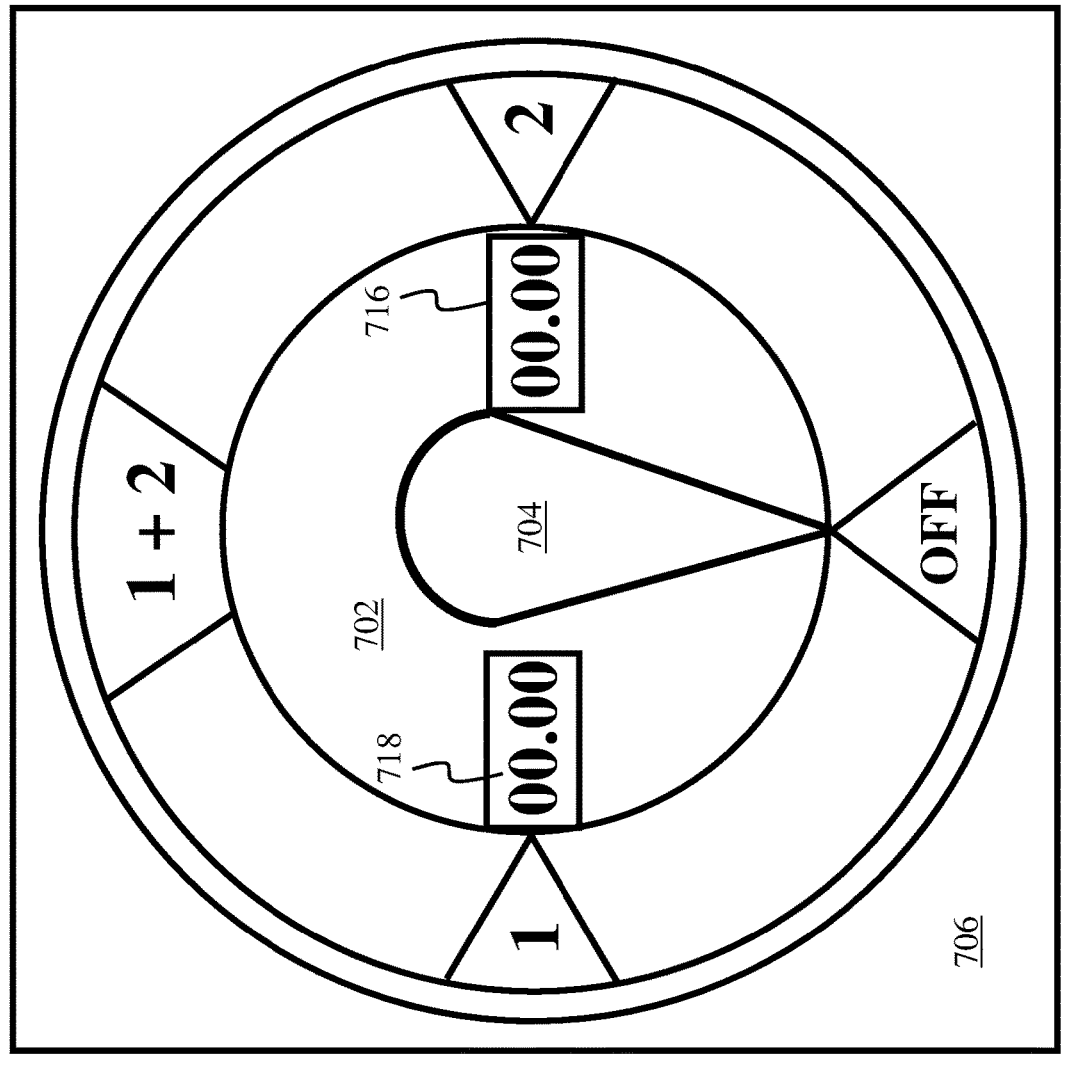

In FIG. 7B, the selection indicator 704 specifies the secondary battery; thus, the secondary battery is enabled (and the primary battery is disabled). The primary battery voltage indicator 716 is not visible due to being at least partially obscured by the selection indicator 704 and the secondary battery voltage indicator 718 provides a reading of 13.60V. In FIG. 7C, the selection indicator 704 specifies both the primary and secondary batteries; thus, the primary and secondary batteries are enabled. Neither battery voltage indicator is obscured in this configuration and thus the secondary battery voltage indicator 718 visually presents a reading of 15.00V and the primary battery voltage indicator 716 provides a reading of 13.60V. In FIG. 7D, the selection indicator 704 specifies neither battery; thus, the primary and secondary batteries are disabled. Thus, even though neither battery voltage indicator is obscured, the primary battery voltage indicator 716 visually presents a reading of 00.00V and the secondary battery voltage indicator 718 visually presents a reading of 00.00V, since both batteries are disabled.

In alternative embodiments, the battery master disconnect switch 700 provides audible indicators of battery voltage. The battery voltage indicator(s) may include a speaker that issues a first audible sound for a high-voltage battery, a second audible sound for a medium-voltage battery, and a third audible sound for a low-voltage battery. Alternatively, the battery voltage indicator(s) speaker may issue an audible sound for a first time period for a high-voltage battery, an audible sound for a second time period for a medium-voltage battery, and an audible sound for a third time period for a low-voltage battery. Or the battery voltage indicator(s) speaker may verbally issue the voltage of the battery or batteries. Designers of ordinary skill in the art will recognize different ways in which an audible presentation can be made which represents the voltage information, and thus health of the vehicle batteries.

Thus, in exemplary embodiments, the primary battery voltage indicator 716 provides a reading when the primary battery is enabled and is at least partially obscured and thus not readable when the secondary battery is enabled. Similarly, in exemplary embodiments, the secondary battery voltage indicator 718 provides a reading when the secondary battery alone is enabled and is at least partially obscured and thus not readable when the primary battery alone is enabled. When both batteries are enabled, the primary and secondary battery voltage indicators 716, 718 will provide readings for their respective batteries. When both batteries are disabled, the primary nor the secondary battery voltage indicator 716, 718 will not provide readings.

Figure 8A:
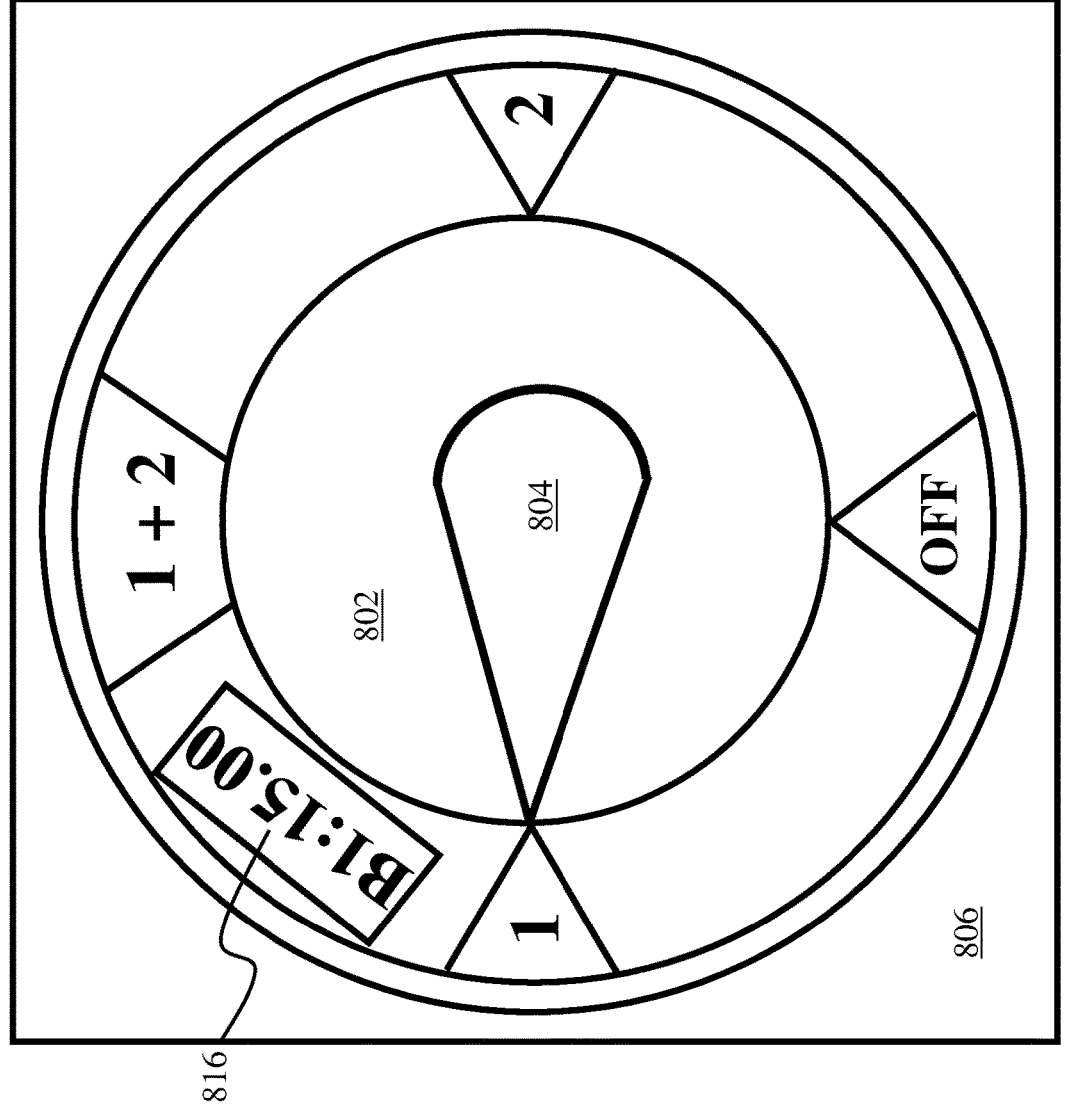
FIGS. 8A-8B are diagrams illustrating a battery master disconnect switch, in accordance with exemplary embodiments.
Figure 8B:
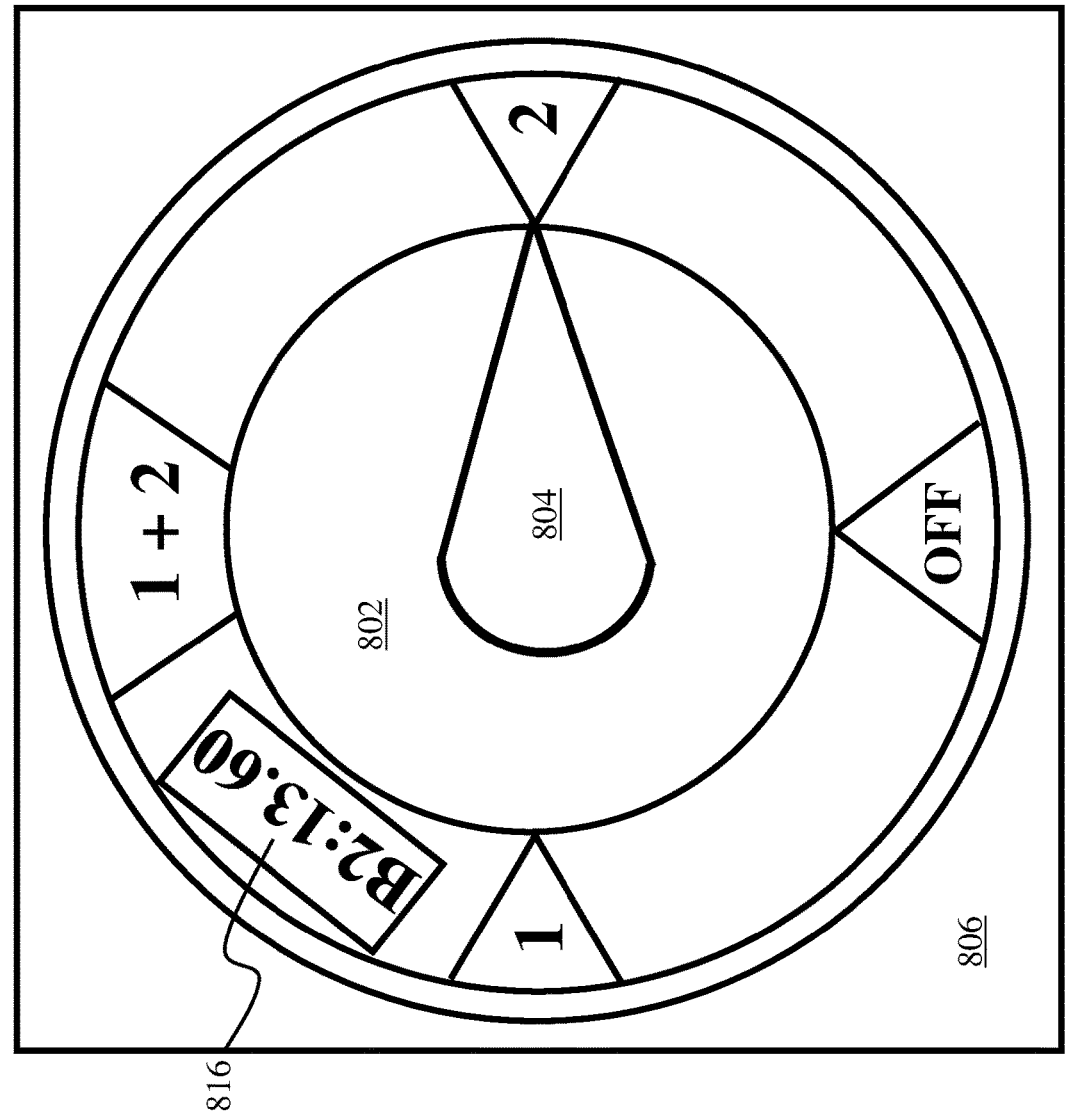

FIGS. 8A-8B are representative drawings of a battery master disconnect switch including a single, shared integrated voltage indicator, according to exemplary embodiments. A front panel 806 of the battery master disconnect switch 800 includes a selector knob 802 with a selection indicator 804. In FIG. 8A, the selection indicator 804 points to a "1", indicating selection of the primary battery; and in FIG. 8B, the selection indicator points to a "2", indicating selection of the secondary battery.

In exemplary embodiments, the battery master disconnect switch features a single battery voltage indicator 816. The battery voltage indicator 816 includes numeric indicators of the voltage of respective batteries. In exemplary embodiments, the battery voltage indicator 816 is a light emitting diode (LED) indicator that provide voltage values, in volts (V), for the primary and secondary batteries. In contrast to battery master disconnect switches 600 (FIGS. 6A-6D) and 700 (FIGS. 7A-7D), the battery voltage indicator 816 includes numerical placeholders for voltage readings but also includes one or more additional placeholders to indicate whether the primary battery voltage is displayed or the secondary battery voltage is displayed. In some embodiments, the additional placeholders are "B1" to indicate the primary battery and "B2" to indicate the secondary battery. Other indicators can be used to distinguish whether the primary battery's voltage is being displayed or the secondary battery's voltage is being displayed.

Thus, in exemplary embodiments and in contrast to the battery master disconnect switches 600 and 700, the battery voltage indicator 816 presents the voltages for the primary and secondary batteries in the alternative. In FIG. 8A, the selection indicator 804 specifies the primary battery; thus, the primary battery is enabled (and the secondary battery is disabled). The battery voltage indicator 816 displays "B1: 15.00" to indicate that the primary battery has a voltage of 15.00V.

In FIG. 8B, the selection indicator 804 specifies the secondary battery; thus, the secondary battery is enabled (and the primary battery is disabled). The battery voltage indicator 816 displays "B2: 13.60" to indicate that the secondary battery has a voltage of 13.60V. Where the selection indicator 804 specifies both the primary and secondary batteries ("1+2"), in exemplary embodiments, the battery voltage indicator 816 provides the voltage indication for each battery in the alternative. Thus, a display of "B1:15.00" on the battery voltage indicator 816, indicating a voltage of 15.00V for the primary battery, then, after the predetermined time period has expired, a display of "B1: 13.60" indicates a voltage of 13.60V for the secondary battery.

In exemplary embodiments, the predetermined time period is a time that is sufficient to allow each battery voltage to be read. In some embodiments, the predetermined time period is five seconds. Thus, "B1:15.00" would be displayed by the battery voltage indicator 816. After five seconds, "B2:13.60" would be displayed by the battery voltage indicator 816. In exemplary embodiments, the alternative display of the two voltages continues indefinitely. In other embodiments, the alternative display of the two voltages ends after a second predetermined time periods, such as after ten minutes.

If the selection indicator 804 is set to "1+2", indicating that both the primary and secondary batteries are turned on, and the engine has been started such that the alternator is charging both batteries (FIG. 3D), the novel battery master disconnect switches 600, 700, and 800 enable the operator of the vehicle to monitor the charging of the primary and secondary batteries. For an operator of a watercraft who may be away from land for a period of time, the availability of voltage information for each battery provides an additional safety feature.

Because battery master disconnect switches are utilized in harsh environments, they are often constructed to provide ingress protection, such as IP67 and IP69K, against dust, particulates, and liquids such as road splash and salt spray. To continue such protection, the battery voltage indicator 816 would include a rubber or plastic washer disposed around the LED display. Similarly, the primary battery voltage indicators 616, 716 and the secondary battery voltage indicators 618, 718 would each be fitted with a rubber or plastic washer. The addition of a single battery voltage indicator 816 rather than two voltage indicators (616/618 and 716/718) may be preferred to keep the cost of the battery master disconnect switch.

FIG. 9 is a representative drawing of a battery master disconnect switch including an LED diode integrated voltage indicator, according to exemplary embodiments. A front panel 906 of the battery master disconnect switch 900 includes a selector knob 902 with a selection indicator 904. In the illustration, the selection indicator 904 points to a "1", indicating selection of the primary battery. Although a single integrated voltage indicator 916 is shown, the battery master disconnect switch 900 may also have two indicators, one for the primary battery and one for the secondary battery.

In contrast to the numerical LED indicators of the previous embodiments, the integrated battery voltage indicator 916 includes a plurality of LED diodes that individually display one or more colors. To the right of the battery master disconnect switch 900 are three views of the integrated battery voltage indicator, denoted 916a, 916b, and 916c. The LED diodes 918 are divided into three different sections, with individual LED diodes being patterned to represent different colors. Thus, LED diodes 918a have a first pattern (right diagonal), the LED diodes 918b have a second pattern (vertical dashed), and the LED diodes 918c have a third pattern (checkerboard). The different patterns represent different colors displayed by the LED diodes 918, such as red, yellow, and green.

The LED diodes 918a, 918b, and 918c of the battery voltage indicator 916a (top right of FIG. 9) are all lit, indicating a fully charged battery. The LED diodes 918a and 918b of the battery voltage indicator 916b (center right of FIG. 9) are lit, but the LED diodes 918c are not lit, indicating a partially charged battery. The LED diodes 918a of the battery voltage indicator 916c (bottom right of FIG. 9) are lit, but the LED diodes 918b and 918c are not lit, indicating a poorly charged battery. Whether color-coded or not, more lit LED diodes 918 indicate a higher voltage battery, in exemplary embodiments. In this manner, the health of the battery is indicated.

Figure 10:
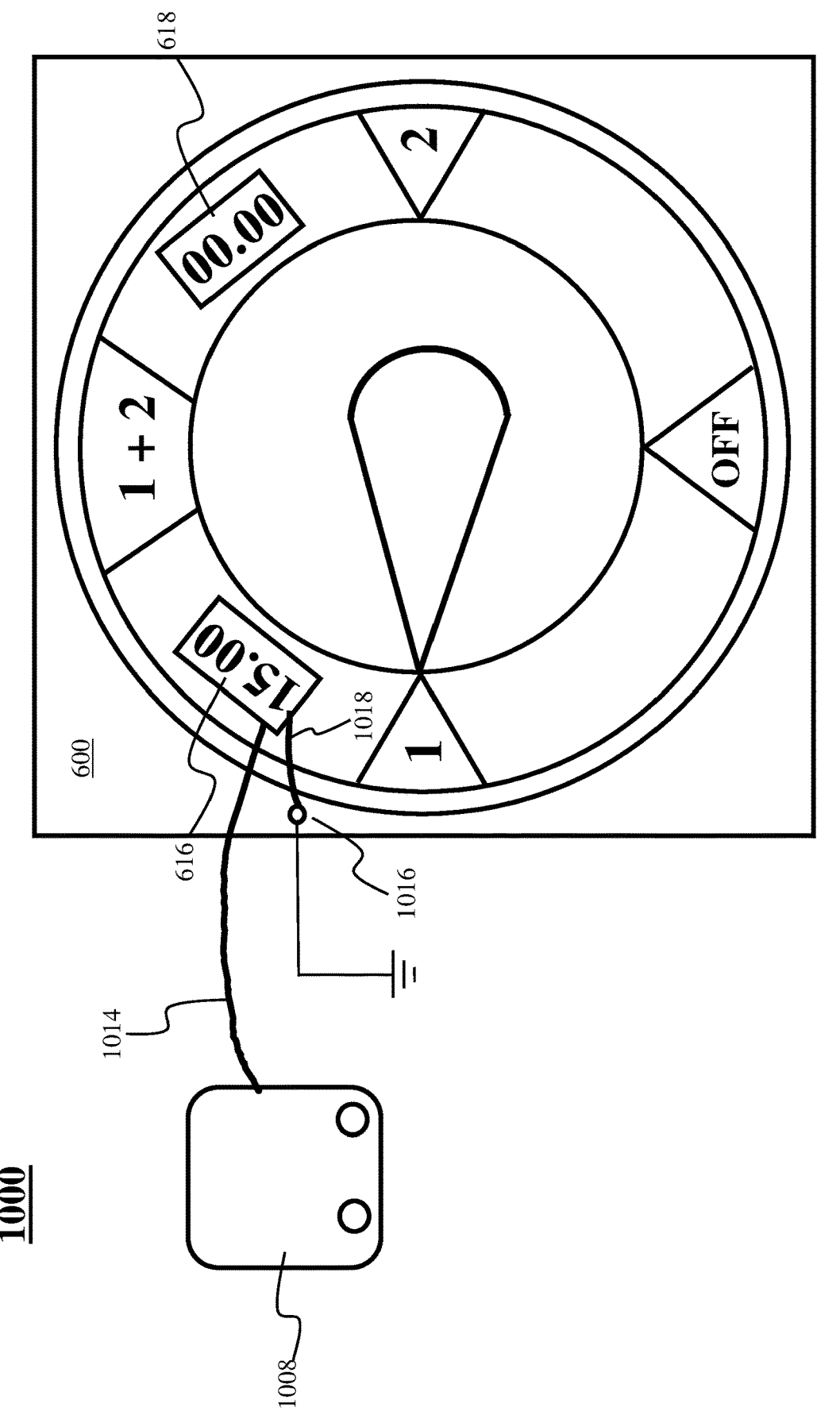
FIG. 10 is a diagram illustrating a battery master disconnect switch, in accordance with exemplary embodiments.

FIG. 10 is a representative drawing of a system 1000 utilizing a novel battery master disconnect switch, according to exemplary embodiments. The battery master disconnect switch 600 of FIG. 6A is shown, with the primary battery voltage indicator 616 being connected to a voltage detection circuit 1008 by a display probe 1014. Alternatively, the battery master disconnect switches 700, 800, or 900 could be part of the system 1000. The voltage detection circuit 1008, which may be a voltmeter without a display, includes a positive probe 1010. The primary battery and secondary battery are connected to the battery master disconnect switch as before (FIGS. 3A-3D). The voltage detection circuit 1008 is in parallel with the primary battery and can measure the voltage of the primary battery, then present the measured value to the primary battery voltage indicator 616. Although not shown in FIG. 10, the secondary battery voltage indicator 618 may be similarly configured with a voltage detection circuit to measure the voltage of the secondary battery.

In exemplary embodiments, the battery master disconnect switch 600 includes a post 1016 for a negative lead 1018. To be grounded, the primary battery voltage indicator 616 is connected, by the negative lead 1018, to the post 1016, which is grounded somewhere on the vehicle.

Master Disconnect Switch with Voltage Display and Supporting Always on Device

Figure 11A:
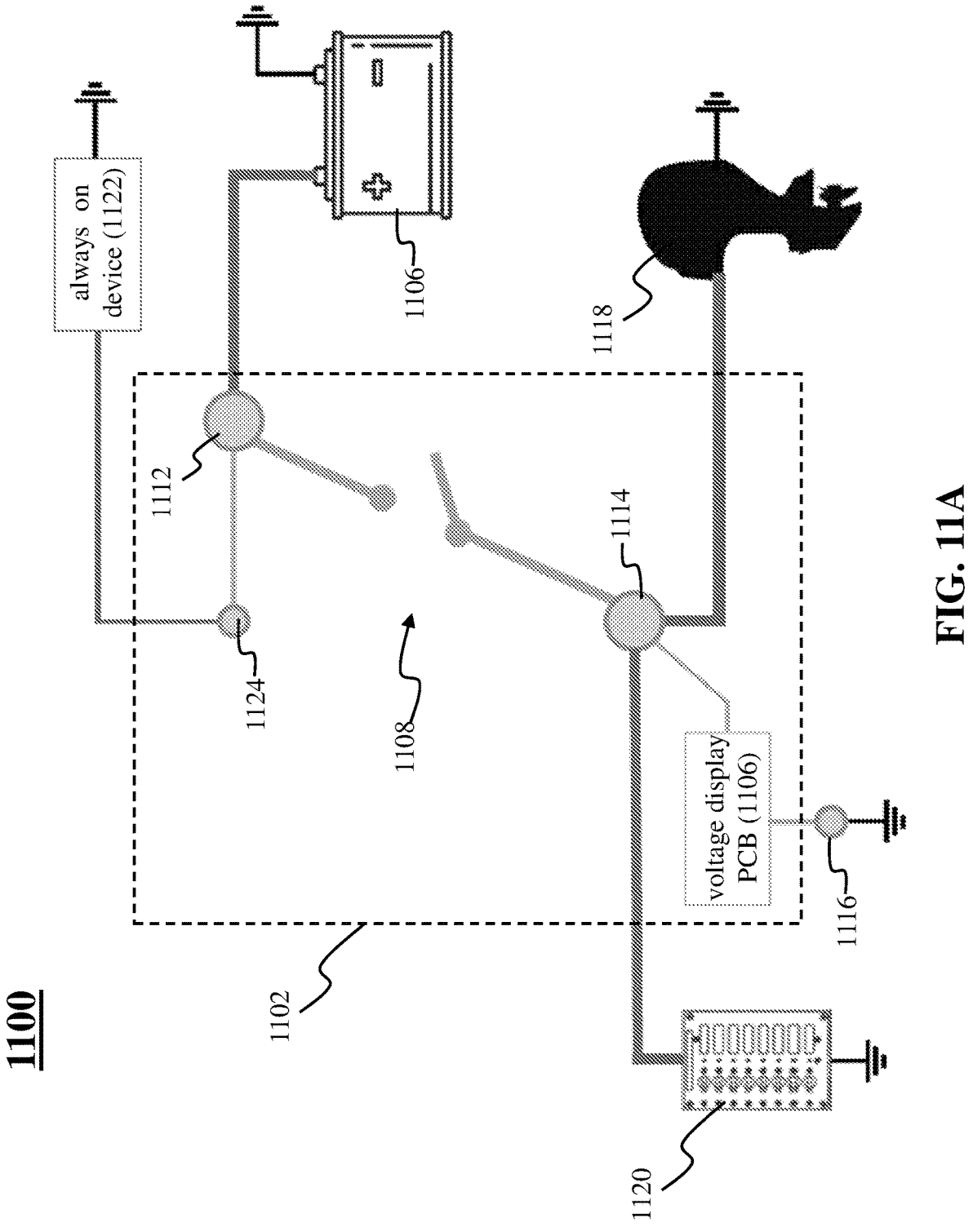
FIGS. 11A-11B are diagrams illustrating a battery system including a battery master disconnect switch with a voltage display and supporting an always on device, in accordance with exemplary embodiments.
Figure 11B:
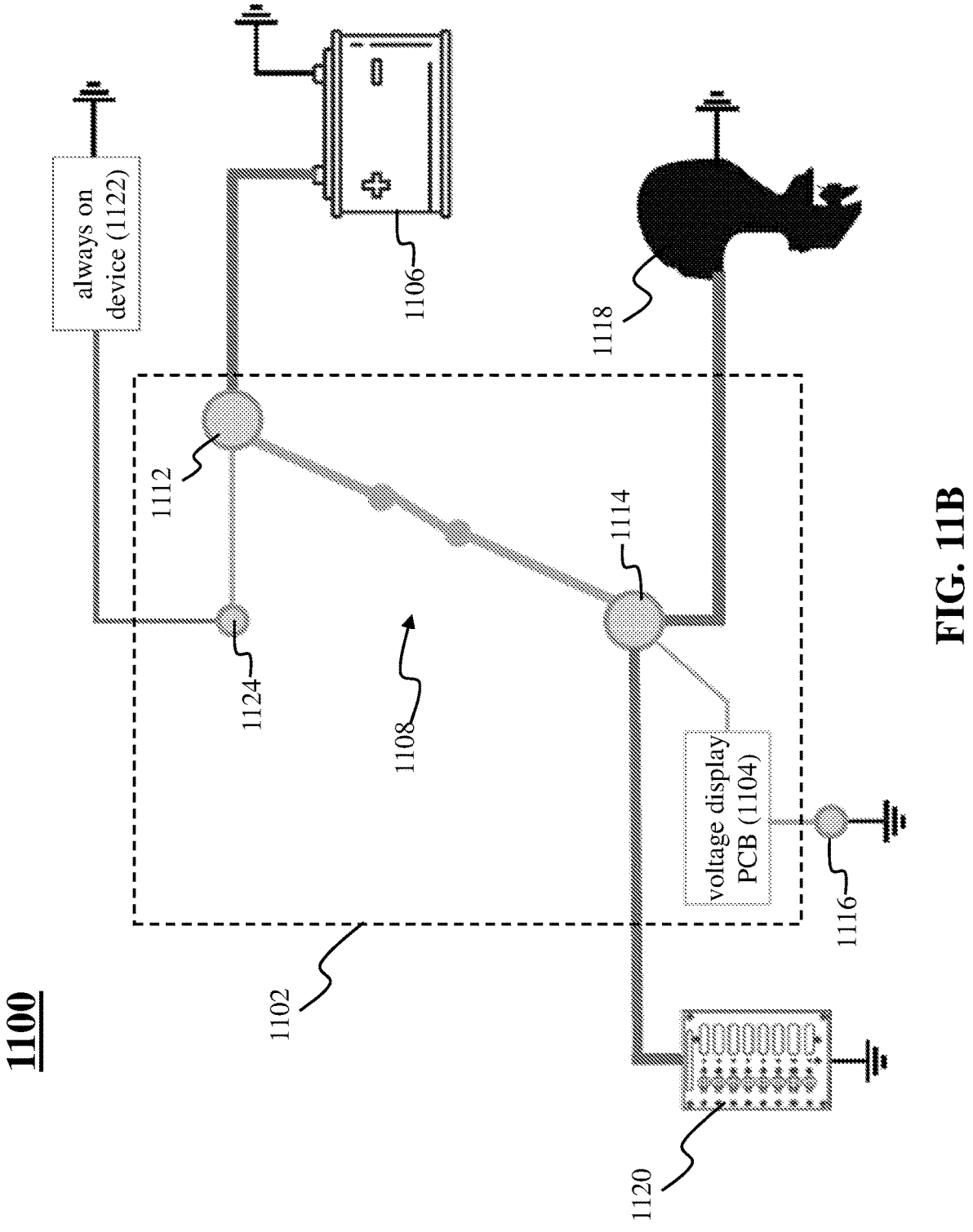

FIGS. 11A-11B are representative drawings of a battery system 1100 utilizing a master disconnect switch (MDS) 1102, according to exemplary embodiments. FIG. 11A shows the battery system 1100 in a first switch state and FIG. 11B shows the battery system in a second switch state. In exemplary embodiments, the MDS 1102 includes a voltage display PCB 1104 and supports an always on device 1122.

The battery system 1100 features the battery master disconnect switch 1102 (dashed rectangle) containing a terminal stud 1112, and a terminal stud 1114, with a switch 908 disposed therebetween, as well as an always on terminal stud 1124, and the voltage display PCB 1104. Outside the battery master disconnect switch 1102 is a ground terminal stud 1116 connected to ground. The battery system 1100 also features a single battery 1106, an engine 1118, such as for a boat, a panel of house circuits 1120, and the always on device 1122, such as a bilge pump.

In FIG. 11A, the switch 1108 is opened and in FIG. 11B, the switch 1108 is closed. The battery system 1100 is thus a two-state system. The voltage display PCB 1106 is connected between the ground terminal stud 1116, which connects to ground, and the terminal stud 1114, which is also connected to the switch 1108. The switch 1108 is also connected to the terminal stud 1112, which is connected, at one end, to the battery 1106, and at the other end, to the always on terminal stud 1124. The always on terminal stud 1124 is connected to the always on device 1122. The engine 1118 and the house circuits 1120 are connected to the terminal stud 1114.

When the switch 1108 is opened (FIG. 11A), there is no battery power supplied by the battery 1106 to the engine 1118 or the house circuits 1120. Thus, the engine 1118 and the house circuits 1120 are turned OFF. In exemplary embodiments, the voltage display PCB 1104 would not display a voltage of the battery 1106 in this state. However, in exemplary embodiments, the battery 1106 does supply power to the terminal stud 1112 and the always on terminal stud 1124. Thus, power is supplied to the always on device 1122, despite the switch 1108 being opened.

When the switch 1108 is closed (FIG. 11B), the battery supplies power (current) to the terminal stud 1112 and the terminal stud 1114. Thus, the voltage display PCB 1104, the engine 1118, and the house circuits 1120 are all powered by the battery 1106. In exemplary embodiments, the voltage of the battery is visible on the voltage display PCB 1104. Further, in exemplary embodiments, the battery 1106 supplies power to the terminal stud 1112 and the always on terminal stud 1124. Thus, power is supplied to the always on device 1122 when the switch 1108 is closed. Thus, whether the switch 1108 is opened or closed, power is supplied to the always on device 1122.

Master Disconnect Switch with Voltage Display

Figure 12A:
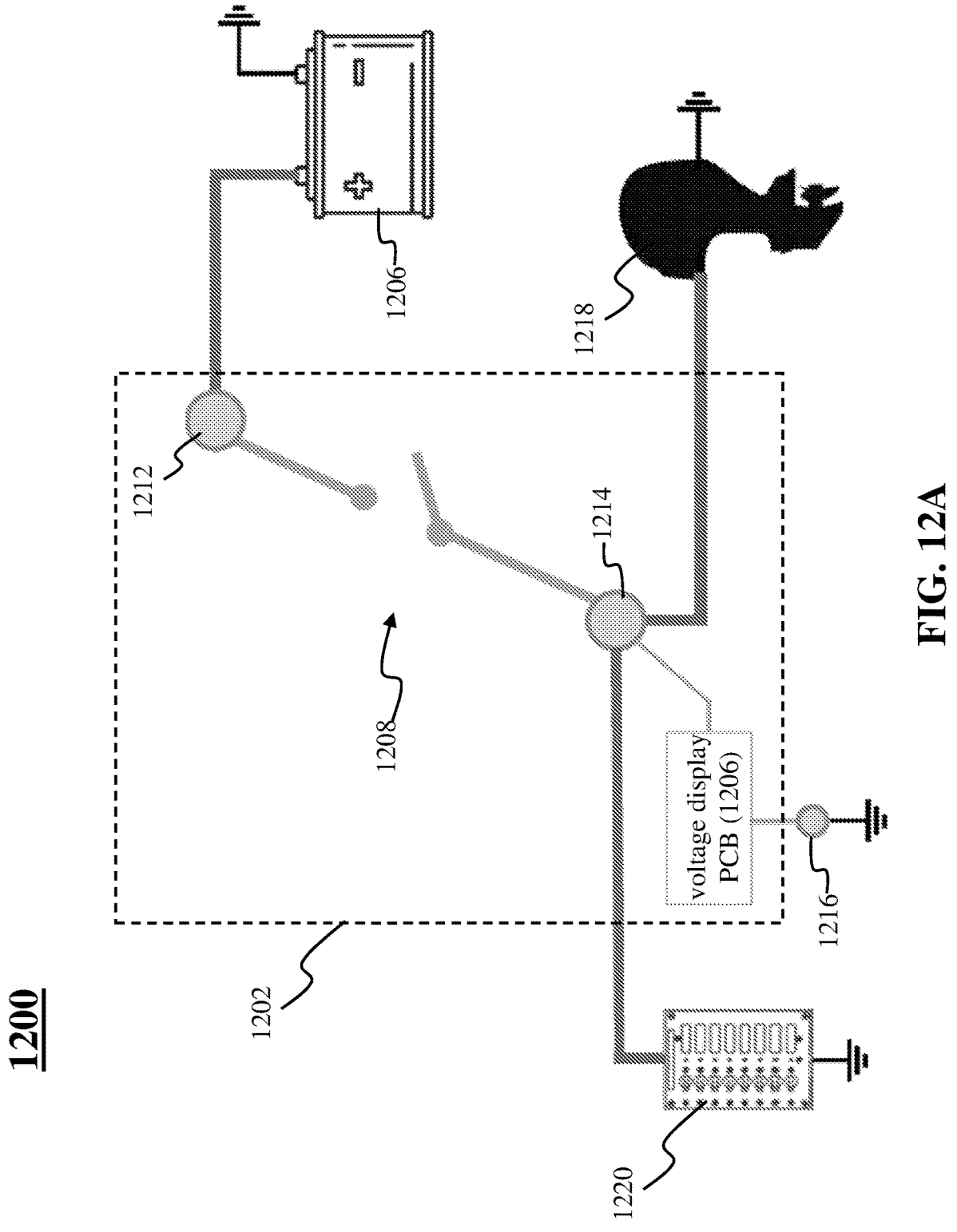
FIGS. 12A-12B are diagrams illustrating a battery system including a battery master disconnect switch with a voltage display, in accordance with exemplary embodiments.
Figure 12B:
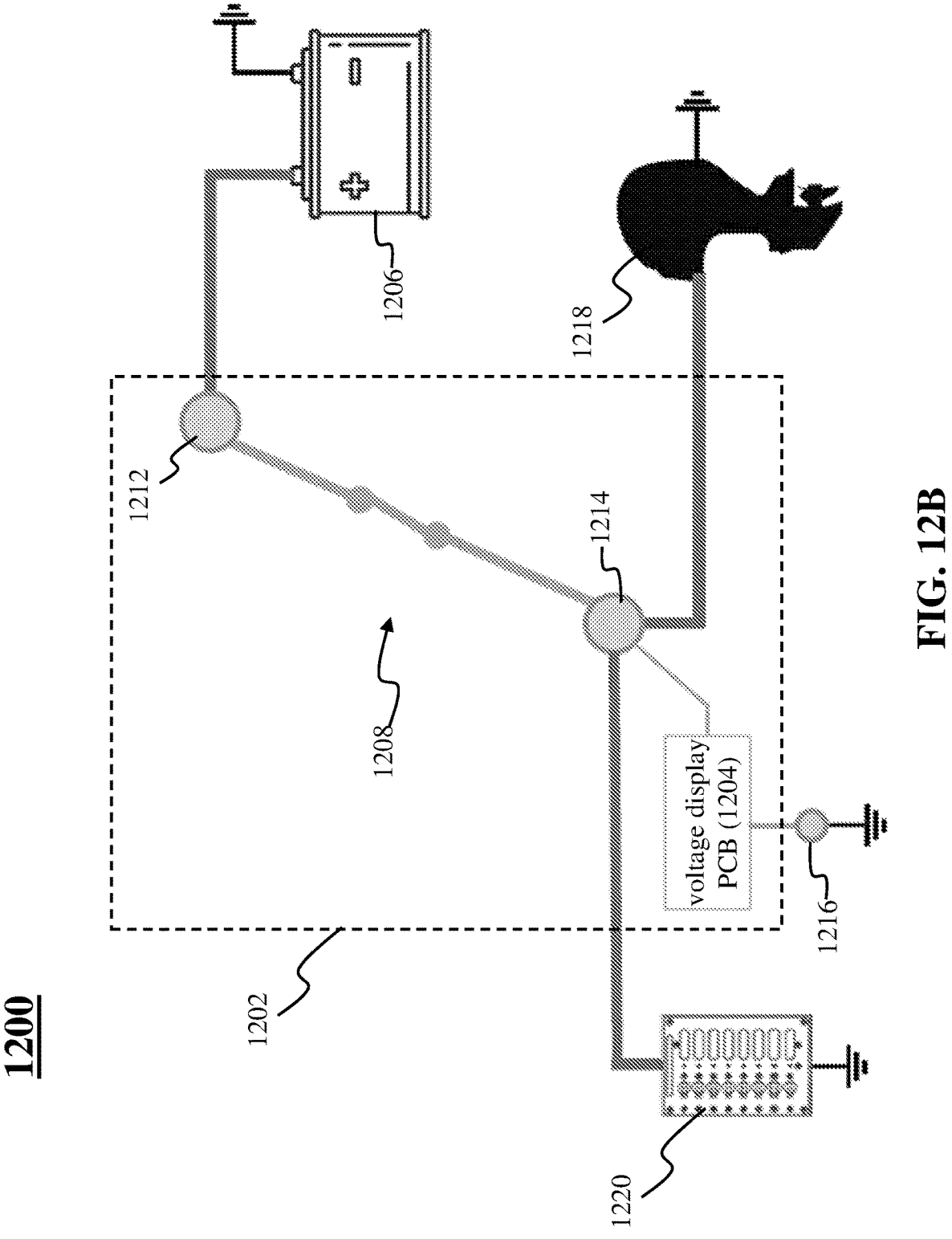

FIGS. 12A-12B are representative drawings of a battery system 1200 utilizing a battery master disconnect switch, according to exemplary embodiments. FIG. 12A shows the battery system 1200 in a first switch state and FIG. 12B shows the battery system in a second switch state. The battery system 1200 features a battery master disconnect switch 1202 (dashed rectangle) containing a terminal stud 1212 and a terminal stud 1214, with a switch 1208 disposed therebetween, as well as a voltage display PCB 1204. Outside the battery master disconnect switch 1202 is a ground terminal stud 1216 connected to ground. The battery system 1200 also features a single battery 1206, an engine 1218, such as for a boat, and a panel of house circuits 1220.

In FIG. 12A, the switch 1208 is opened and in FIG. 12B, the switch 1208 is closed. The battery system 1200 is thus a two-state system. The voltage display PCB 1206 is connected between the ground terminal stud 1216, which connects to ground, and the terminal stud 1214, which is also connected to the switch 1208. The switch 1208 is also connected to the terminal stud 1212, which is connected to the battery 1206. The engine 1218 and the house circuits 1220 are connected to the terminal stud 1214.

When the switch 1208 is opened (FIG. 12A), there is no battery power supplied by the battery 1206 to the engine 1218 or the house circuits 1220. Thus, the engine 1218 and the house circuits 1220 are turned OFF. In exemplary embodiments, the voltage display PCB 1204 would not display a voltage of the battery 1206 in this state.

When the switch 1208 is closed (FIG. 12B), the battery supplies power (current) to the terminal stud 1212 and the terminal stud 1214. Thus, the voltage display PCB 1204, the engine 1218, and the house circuits 1220 are all powered by the battery 1206. In exemplary embodiments, the voltage of the battery is visible on the voltage display PCB 1204.

Master Disconnect Switch Supporting Always on Device

Figure 13A:
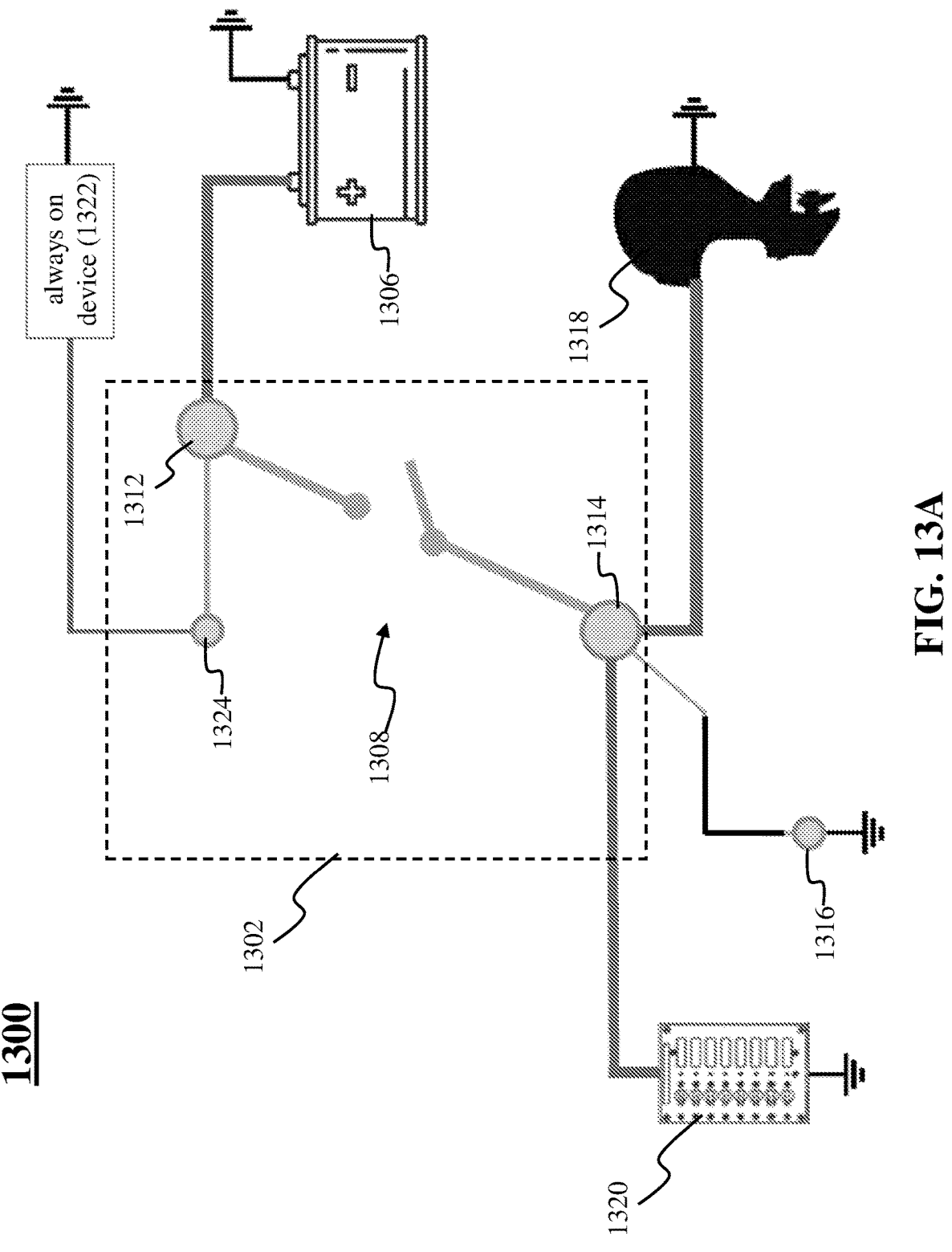
FIGS. 13A-13B are diagrams illustrating a battery system including a battery master disconnect switch supporting an always on device, in accordance with exemplary embodiments.
Figure 13B:
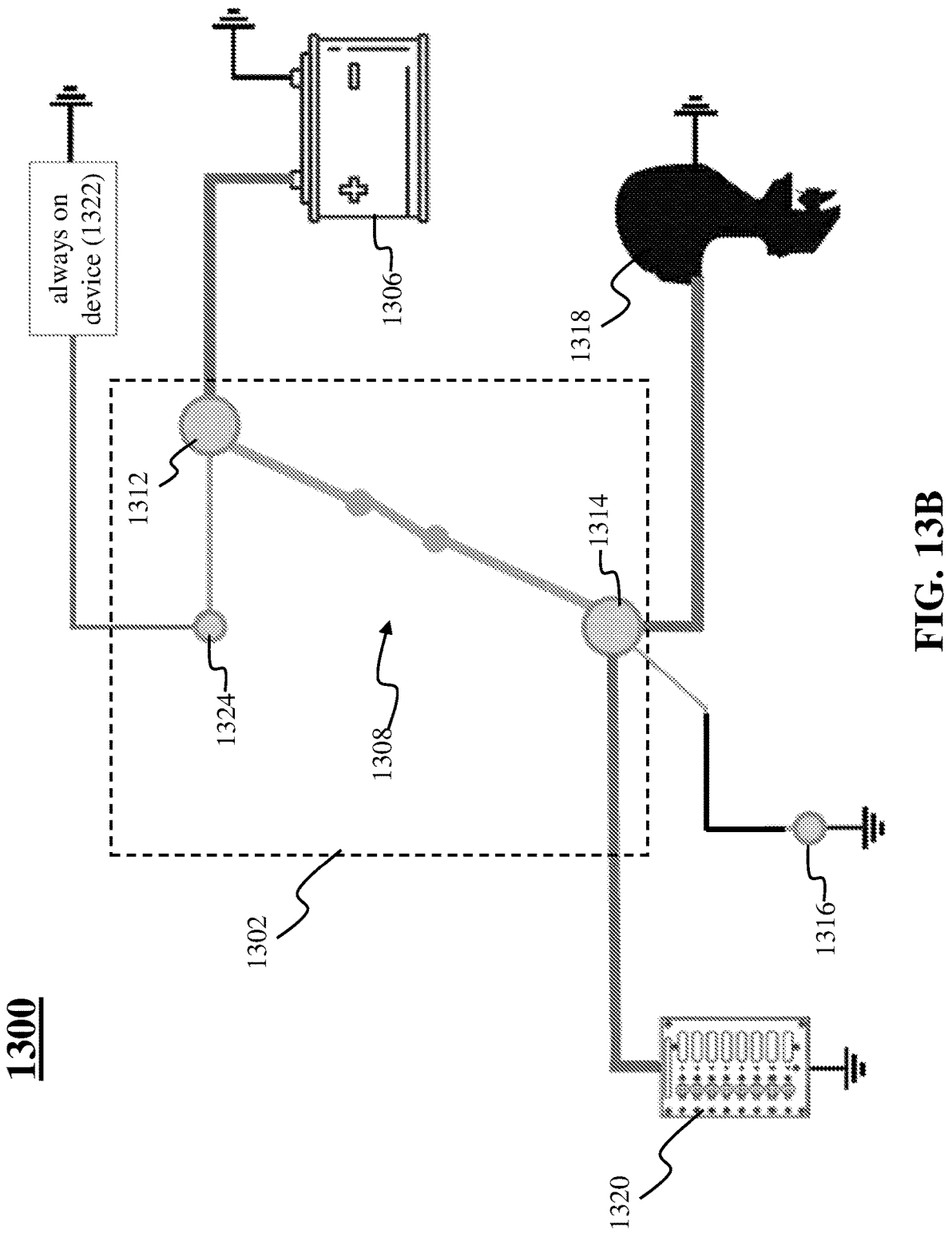
Figure 13:
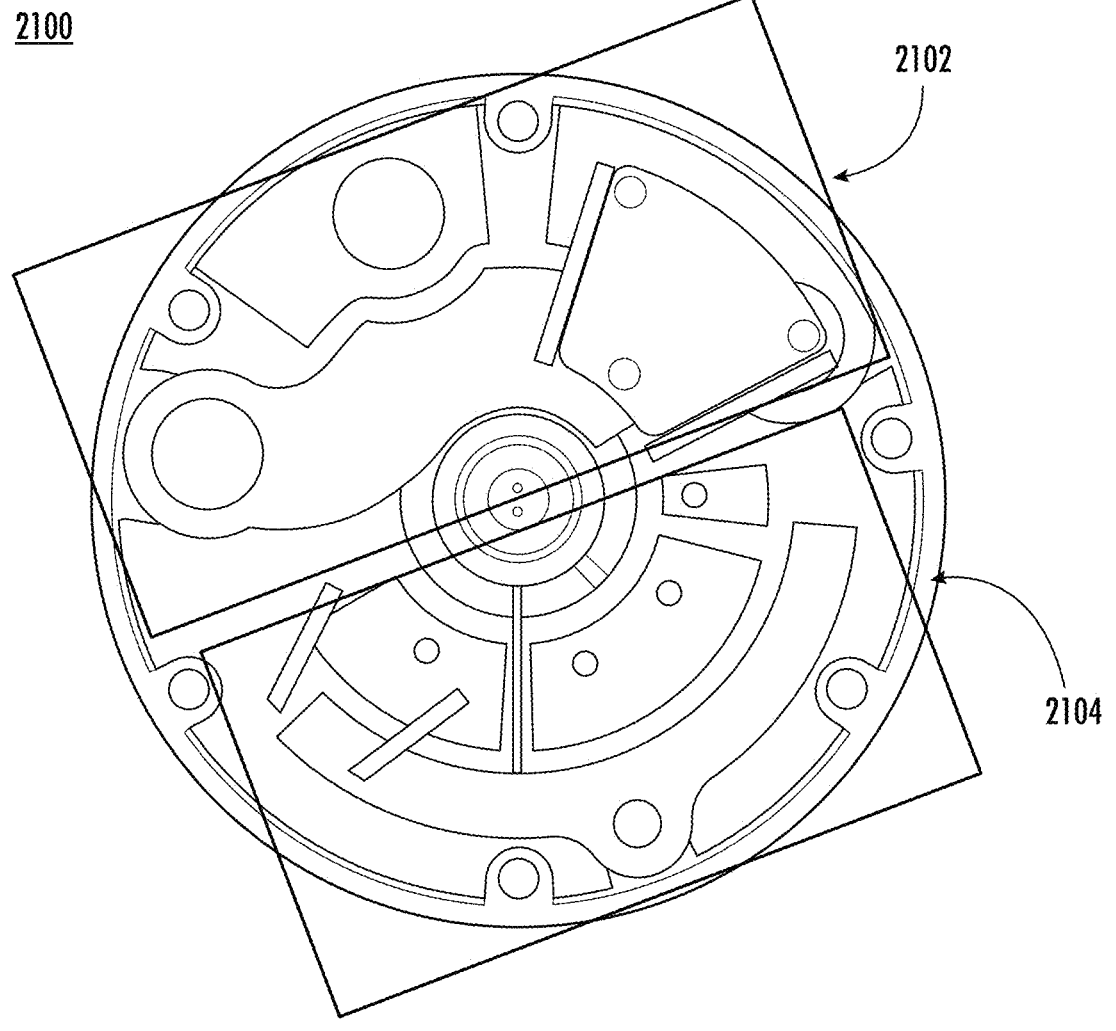

FIGS. 13A-13B are representative drawings of a battery system 1300 utilizing a battery master disconnect switch, according to exemplary embodiments. FIG. 13A shows the battery system 1300 in a first switch state and FIG. 13B shows the battery system in a second switch state. The battery system 1300 features a battery master disconnect switch 1302 (dashed rectangle) containing a small always on terminal stud 1324 and two larger terminal studs, a terminal stud 1312 and a terminal stud 1314, with a switch 1308 disposed therebetween. Outside the battery master disconnect switch 1302 is a ground terminal stud 1316 connected to ground. The battery system 1300 also features an always on device 1322 such as a bilge pump, a battery 1306, an engine 1318, such as for a boat, and a panel of house circuits 1320.

In FIG. 13A, the switch 1308 is opened and in FIG. 13B, the switch 1308 is closed. The battery system 1300 is thus a two-state system. The always on device 1322 is connected to the always on terminal stud 1324, which is connected to the terminal stud 1312, which is connected to the battery 1306. The engine 1318 and the house circuits 1320 are connected to the terminal stud 1314, which connects to a small ground terminal stud 1316, which connects to ground. Optionally, the terminal stud 1314 may be directly connected to ground.

When the switch 1308 is opened (FIG. 13A), there is no battery power supplied by the battery 1306 to the engine 1318 or the house circuits 1320. Thus, the engine 1318 and the house circuits 1320 are turned OFF. Meanwhile, the battery still supplies power to the terminal stud 1312 and the always on terminal stud 1310. Thus, the always on device 1322 is powered (ON) despite the switch 1308 being opened.

When the switch 1308 is closed (FIG. 13B), the battery supplies power (current) to both the terminal stud 1312 (which is connected to the always on terminal stud 1324) and the terminal stud 1314. Thus, the bilge pump 1304, the engine 1318, and the house circuits 1320 are all powered by the battery 1306. In exemplary embodiments, whether the switch 1308 is opened or closed, the bilge pump 1304 receives power from the battery 1306.

Master Disconnect Switch with Voltage Display

Figures 14A, 14B:
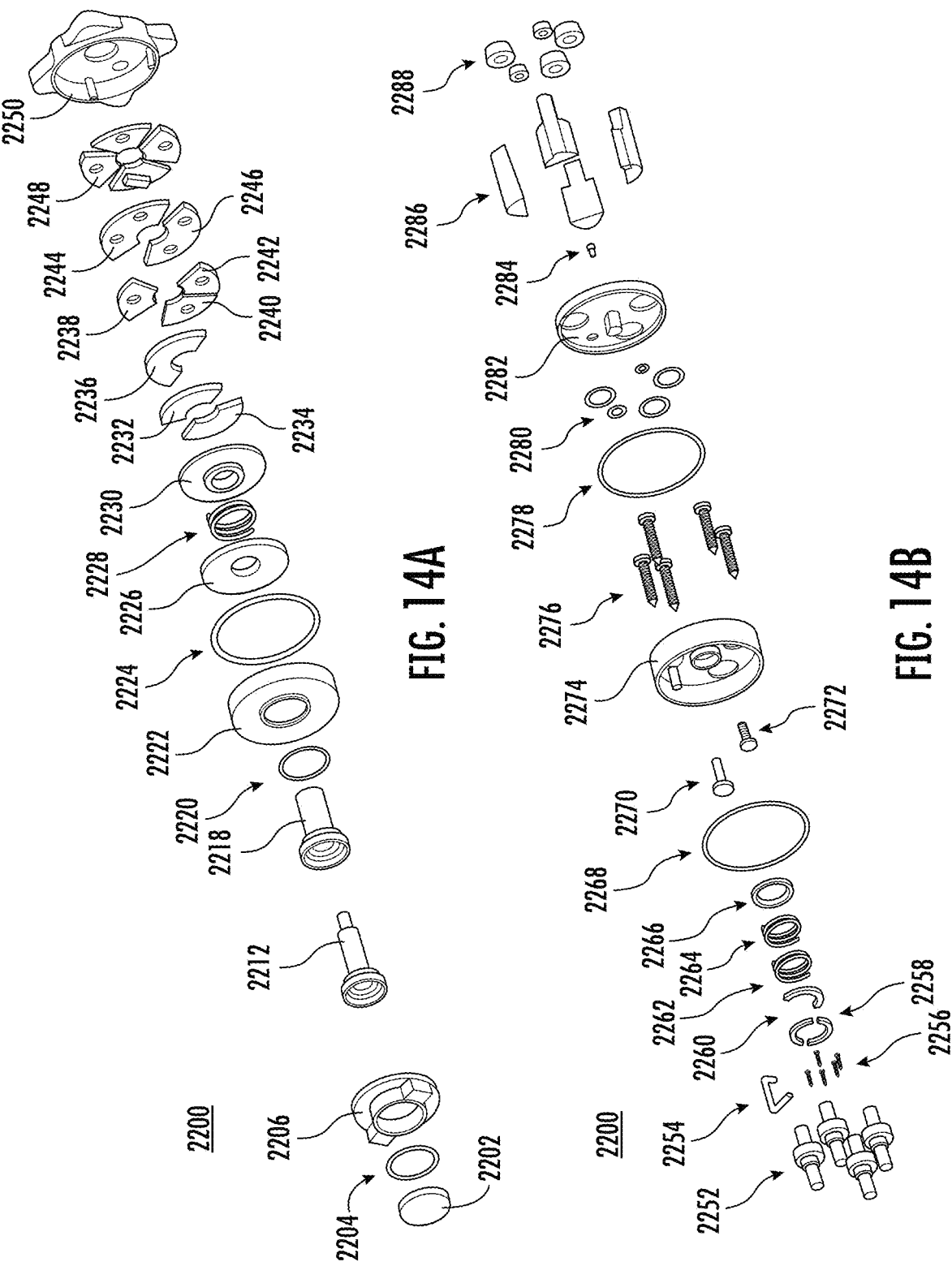
FIGS. 14A-14C are diagrams illustrating a battery system including a battery master disconnect switch with a voltage display, in accordance with exemplary embodiments.
Figure 14C:
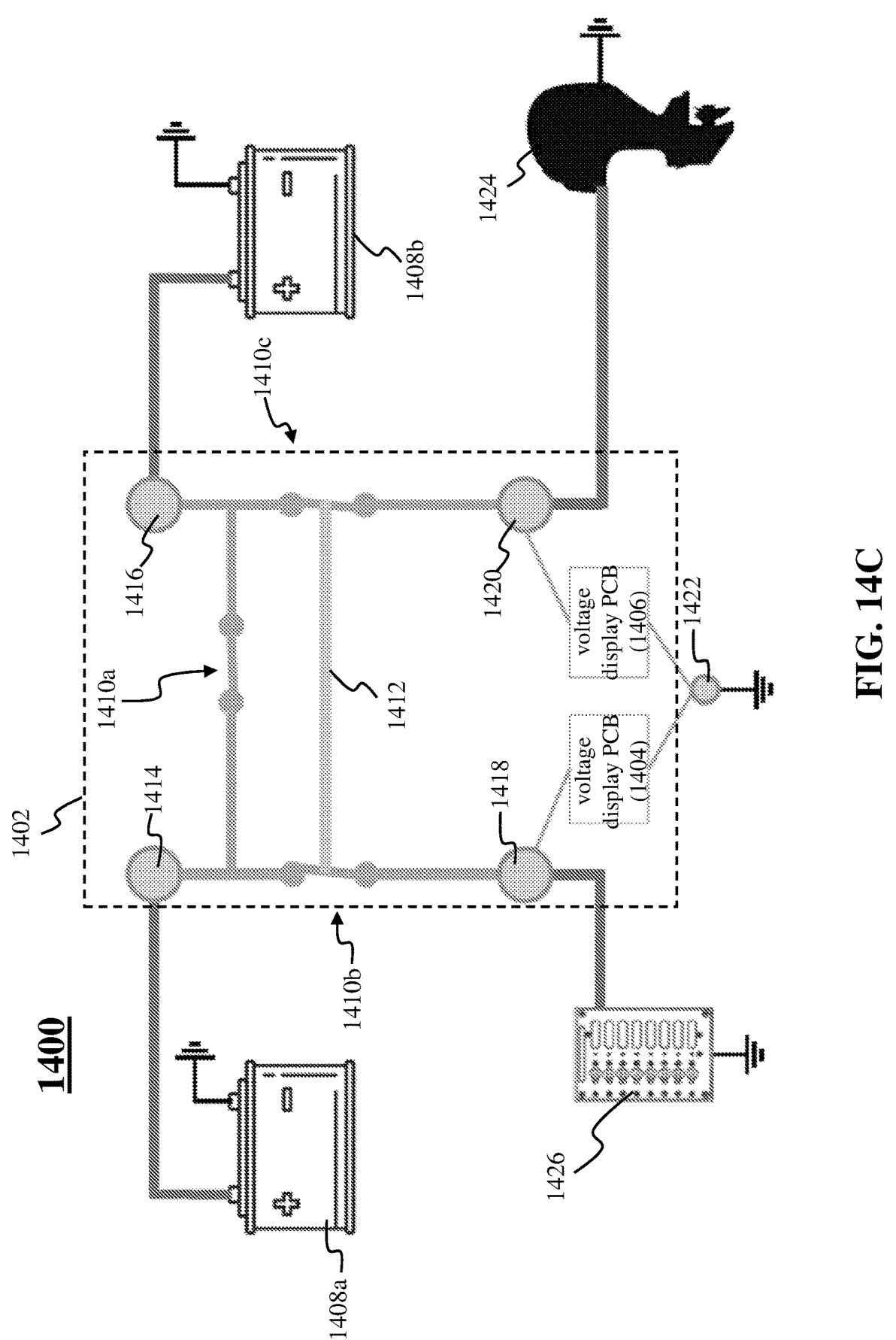

FIGS. 14A-14C are representative drawings of a battery system 1400 utilizing a battery master disconnect switch, according to exemplary embodiments. FIG. 14A shows the battery system 1400 in a first switch state, FIG. 14B shows the battery system in a second switch state, and FIG. 14C shows the battery system in a third switch state. The battery system 1400 features a battery master disconnect switch 1402 (dashed rectangle) containing terminal studs 1414,

1416, 1418, and 1420, with a switch 1410a disposed between terminal studs 1414 and 1416, a switch 1410b disposed between terminal studs 1414 and 1418, and a switch 1410c disposed between terminal studs 1416 and 1420 (collectively, "switches 1410"), as well as two voltage display PCBs 1404 and 1406. A switch bar 1412 is connected between switches 1410b and 1410c and serves to coordinate their behavior (if switch 1410b is opened, switch 1410c is opened and if switch 1410b is closed, switch 1410c is closed). In exemplary embodiments, the switch bar 1412 is not an electrically conductive element and thus current does not pass therethrough. Instead, the switch bar 1412 is a mechanical device used to ensure that the two switches 1410b and 1410c mirror one another. Outside the battery master disconnect switch 1402 is a ground terminal stud 1422 connected to ground. The battery system 1400 also features two batteries 1408a and 1408b (collectively, "batteries 1408"), an engine 1424, such as for a boat, and a panel of house circuits 1426.

In FIG. 14A, all three switches 1410 are opened. Thus, neither battery 1408a or battery 1408b supplies power to the engine 1424 or the house circuit 1426. In FIG. 14B, the switch 1410a is opened while the switches 1410b and 1410c are closed. In this configuration, the battery 1408a supplies power to the house circuit 1426 and the battery 1408b supplies power to the engine 1424. The voltage display PCB 1404 displays the voltage of the battery 1408a and the voltage display PCB 1406 displays the voltage of the battery 1408b.

In FIG. 14C, the three switches 1410 are closed. The house circuit 1426 may receive power from either battery 1408a or 1408b. Likewise, the engine 1424 may receive power from either battery 1408a or 1408b. The voltage display PCB 1404 displays the voltage of the battery 1408a and the voltage display PCB 1406 displays the voltage of the battery 1408b.

Master Disconnect Switch with Voltage Display and Supporting Always on Device

Figure 15A:
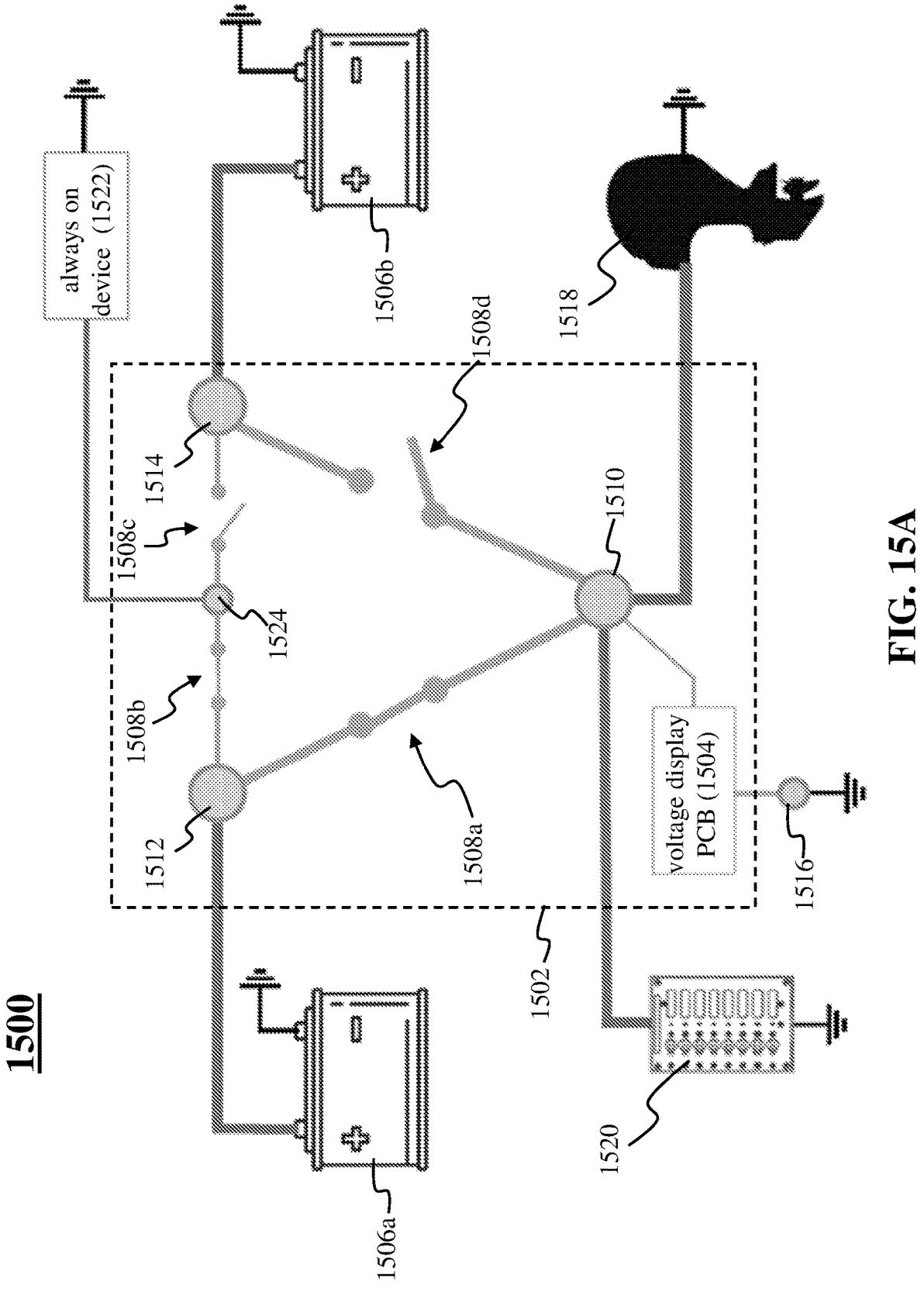
FIGS. 15A-15D are diagrams illustrating a battery system including a battery master disconnect switch with a voltage display and supporting an always on device, in accordance with exemplary embodiments.
Figure 15B:
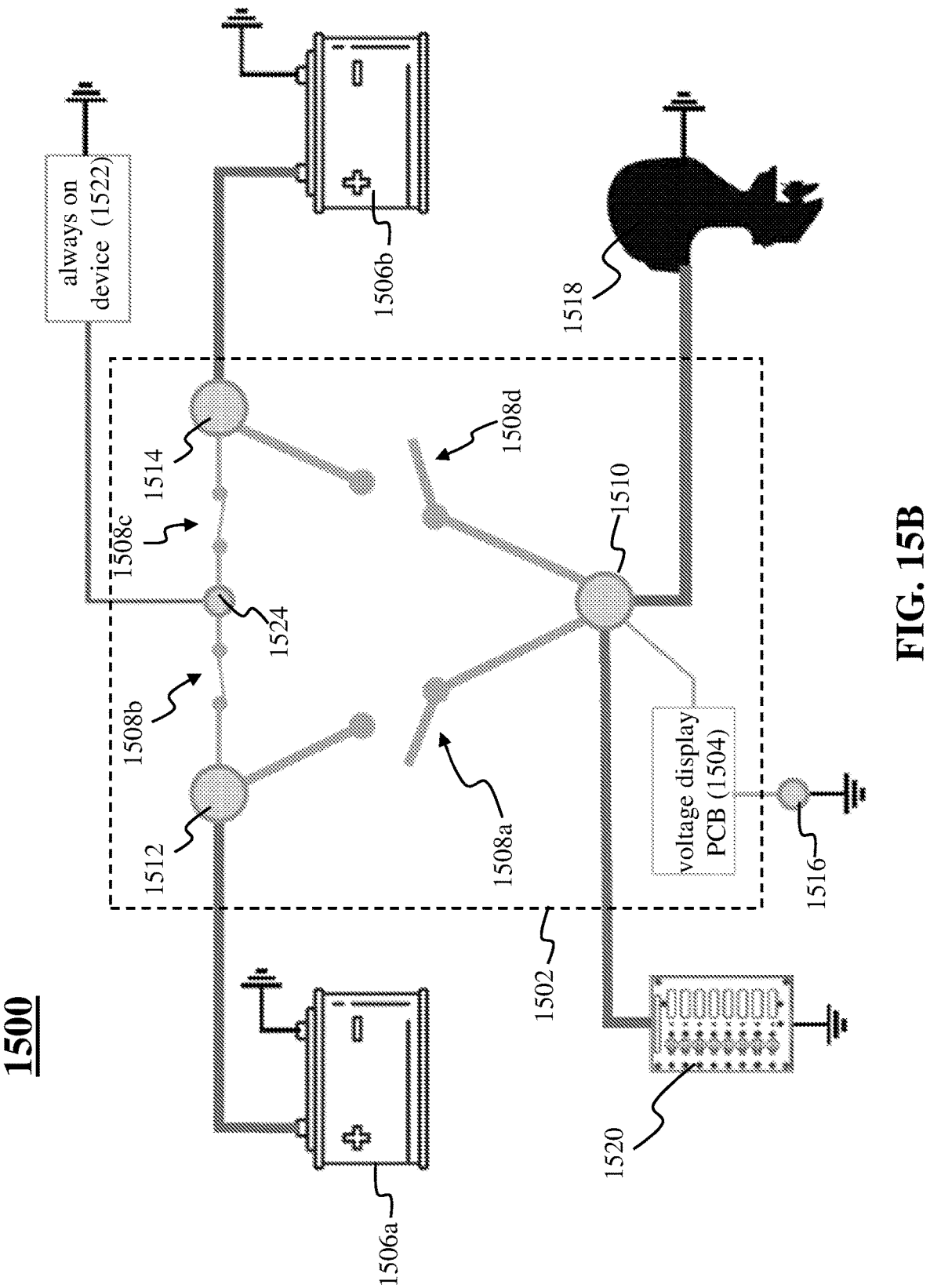
Figure 15C:
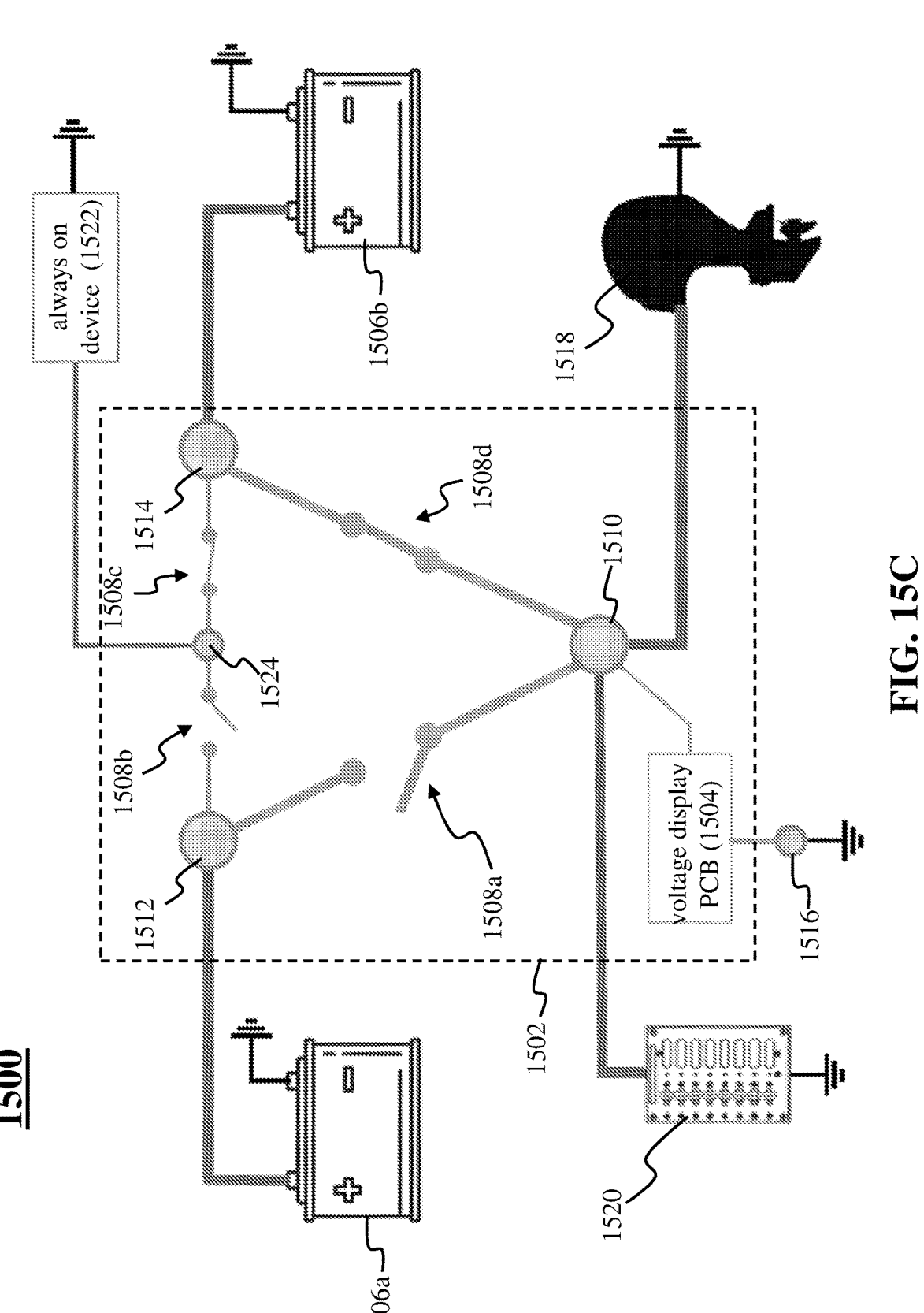
Figure 15D:
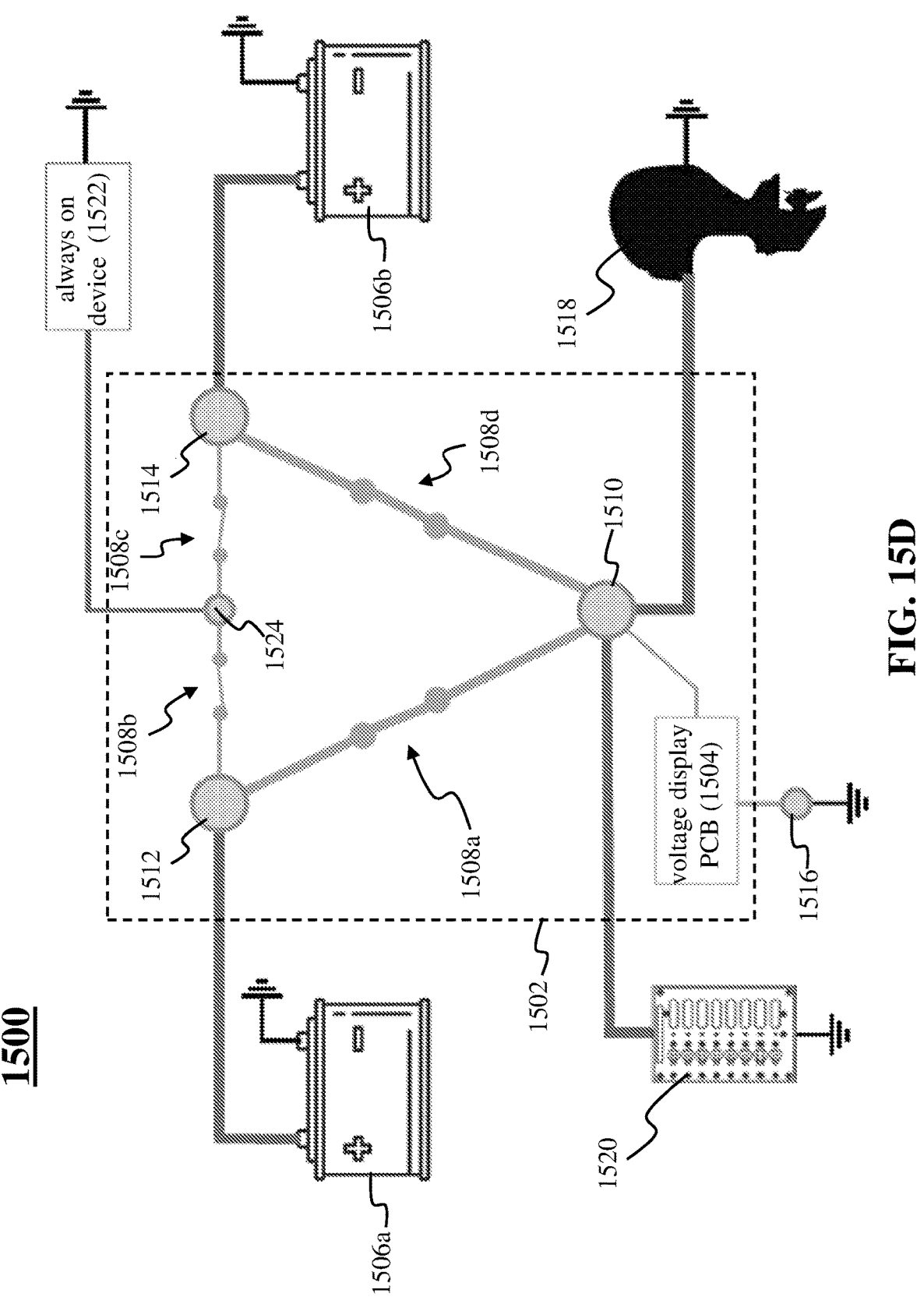

FIGS. 15A-15D are representative drawings of a battery system 1500 utilizing a battery master disconnect switch, according to exemplary embodiments. FIG. 15A shows the battery system 700 in a first switch state, FIG. 15B shows the battery system in a second switch state, FIG. 15C shows the battery system in a third switch state, and FIG. 15D shows the battery system in a fourth switch state. In exemplary embodiments, a battery master disconnect switch 1502 of the battery system 1500 supports an always on device 1522 and optionally includes a voltage display PCB 1504.

The battery system 1500 features the battery master disconnect switch 1502 (dashed rectangle) containing a small always on terminal stud 1510 and three larger terminal studs, a terminal stud 1510, a terminal stud 1512, and a terminal stud 1514, with multiple switches connecting the studs, as well as an optional voltage display PCB 1504. A switch 1508a is disposed between terminal studs 1512 and 1510, a switch 1508b is disposed between terminal stud 1512 and terminal stud 1524, a switch 1508c is disposed between terminal stud 1524 and terminal stud 1514, and a switch 1508d is disposed between terminal studs 1514 and 1510 (collectively, "switches 1508").

Outside the battery master disconnect switch 1502 is a ground terminal stud 1516 connected to ground. The battery system 1500 also features an always on device 1522, two batteries 1506a and 1506b (collectively, "batteries 1506"), an engine 1518, such as for a boat, and a panel of house circuits 1520. The battery 1506a may be considered the primary battery and the battery 1506b may be considered the secondary battery. The engine 1518 and the house circuits 1520 are connected to the terminal stud 1510, which connects to the voltage display PCB 1504. The voltage display PCB 1504 connects to the ground terminal stud 1516, which connects to ground. Where no voltage display PCB is present in the battery master disconnect switch, the terminal stud 1510 may be directly connected to ground.

In FIG. 15A, switches 1508*a* and 1508*b* are closed and switches 1508*c* and 1508*d* are opened; in FIG. 15B, switches 1508*a* and 1508*d* are opened and switches 1508*b* and 1508*c* are closed; in FIG. 15C, switches 1508*a* and 1508*b* are opened and switches 1508*c* and 1508*d* are closed; in FIG. 15D, all switches 1508*a*, 1508*b*, 1508*c*, and 1508*d* are closed. The battery system 1500 is thus a four-state system. The always on device 1522 is connected to the always on terminal stud 1524, which is connected to the terminal stud 1512 when switch 1508*b* is closed, with the terminal stud 1512 being connected to the battery 1506*a* and is connected to the terminal stud 1514 when switch 1508*c* is closed, with the terminal stud 1514 being connected to the battery 1506*b*. Looking at the four states illustrated in FIGS. 15A-15D, either one or both switches 1508*b* and 1508*c* are closed, in exemplary embodiments. This ensures that, whatever the state of the battery system 1500, the always on device 1522 will receive power and will remain ON.

When the switches 1508 are in the first state (FIG. 15A), the battery 1506*a* (primary battery) can supply power to the engine 1518, the house circuits 1520 and the always on device 1522, and the voltage display PCB 1504 indicates the voltage of the primary battery 1506*a*. When the switches 1508 are in the second state (FIG. 15B), there is no battery power supplied by either battery 1506*a* or 1506*b* to the engine 1518 or the house circuits 1520. Thus, the engine 1518 and the house circuits 1520 are turned OFF and the voltage display PCB 1504 does not indicate a voltage for either battery 1506. Meanwhile, battery 1506*a* supplies power to the terminal stud 1512 and battery 1506*b* supplies power to the terminal stud 1514, and both terminal studs 1512 and 1514 are connected to the terminal stud 1524. Thus, the always on device 1522 is powered (ON).

When the switches 1508 are in the third state (FIG. 15C), the battery 1506*a* is isolated from the devices, due to the switches 1508*a* and 1508*b* being opened. However, battery 1506*b* supplies power (current) to the terminal stud 1514, which is connected to the always on terminal stud 1524 as well as terminal stud 1510. Thus, the always on device 1522, the engine 1518, and the house circuits 1520 are all powered by the battery 1506*b*. When the switches 1508 are in a fourth state (FIG. 7D), both batteries are connected to the devices, due to all four switches being closed. Thus, the always on device 1522, the engine 1518, and the house circuits 1520 are all powered by both batteries 1506*a* and 1506*b*. In exemplary embodiments, when the switches 1508 are in any of the four states, the always on device 1522 receives power from the battery 1506*a*, the battery 1506*b*, or both batteries. Further, the voltage display PCB 1504 provides voltage information for the battery 1506*a*, the battery 1506*b*, or both batteries.

FIGS. 16A-16F are representative drawings of a battery master disconnect switch 1600, according to exemplary embodiments. FIGS. 16A, 16B, 16D, and 16F show side views, FIG. 16C shows a top view, and FIG. 16E shows a bottom view of the battery master disconnect switch 1600. In exemplary embodiments, the battery master disconnect switch 1600 may be used in the battery systems 1100 (FIGS. 11A-11B), 1200 (FIGS. 12A-12B), 1300 (FIGS. 13A-13B), 1400 (FIGS. 14A-14C), or 1500 (FIGS. 15A-15D). On a first side of the battery master disconnect switch 1500 is the selector knob 1514, and on a second side opposite the first side is a stud assembly 1616. In exemplary embodiments, and as seen in FIG. 16E, the stud assembly 1616 consists of three larger terminal studs, terminal stud 1604, terminal stud 1606, and terminal stud 1608, and two smaller terminal studs, always on terminal stud 1602, and ground terminal stud 1610.

Figures 17A, 17B:
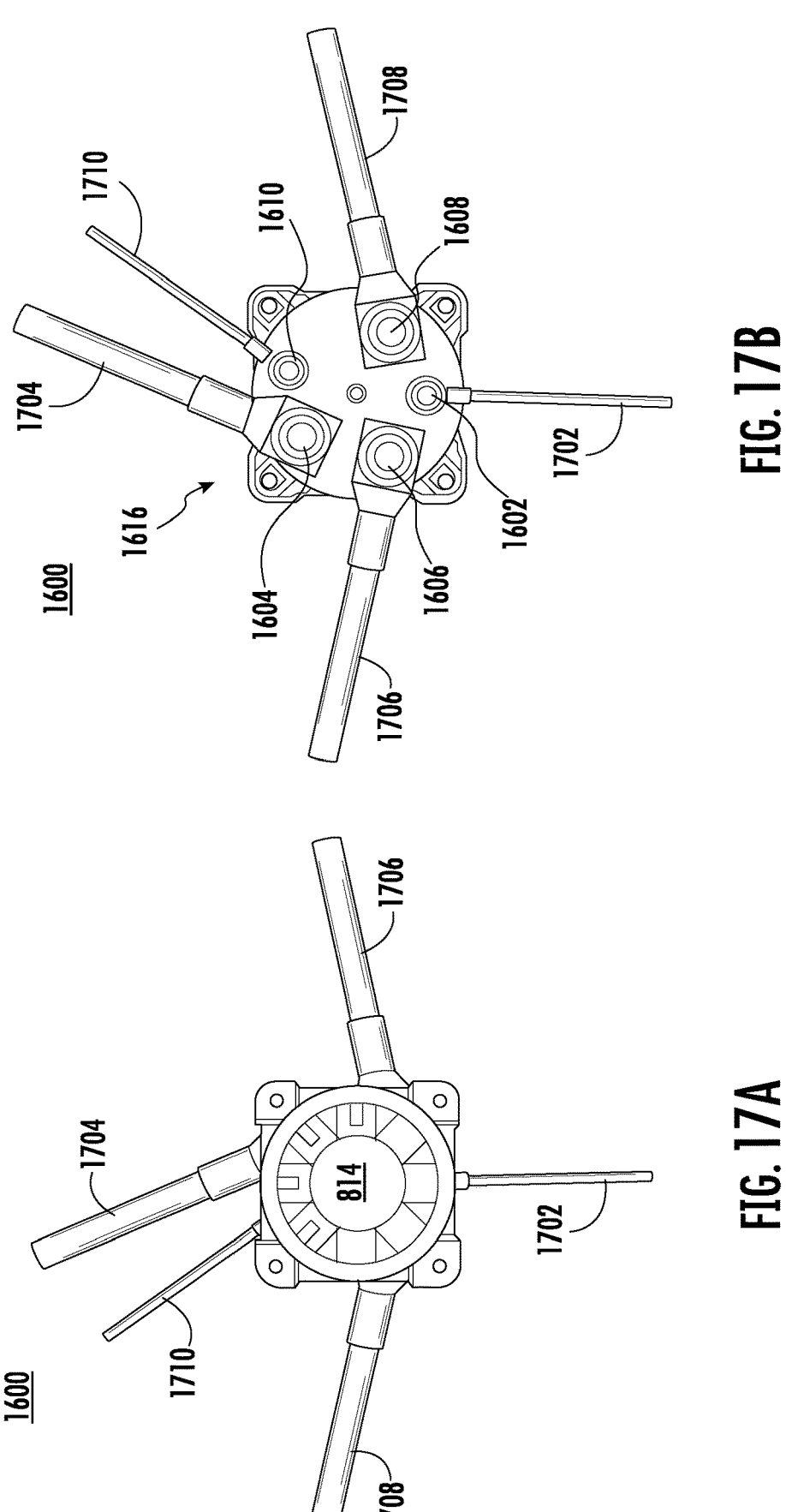
FIGS. 17A-17B are diagrams illustrating the battery master disconnect switch of FIGS. 16A-16F, in accordance with exemplary embodiments.

FIGS. 17A-17B are representative drawings of the battery master disconnect switch 1600 of FIGS. 16A-16F, according to exemplary embodiments. FIG. 17A is a top view and FIG. 17B is a bottom view of the battery master disconnect switch 1600. On the first side of the battery master disconnect switch 1600 (FIG. 17A) is the selector knob 1614 and on the second, opposite side (FIG. 17B) is the stud assembly 1616, which consist of the always on terminal stud 1602, three larger terminal studs, terminal stud 1604, terminal stud 1606, and terminal stud 1608, and a ground terminal stud 1610.

In exemplary embodiments, the stud assembly 1616 are connected to other components (such as shown in the battery systems 1100, 1200, 1300, 1400, and 1500, above) using cabling. In a non-limiting embodiment, the cabling is sized to fit with the respective studs, where the larger terminal studs 1604, 1606, and 1608 are connected to larger cables, relative to the remaining terminals. Terminal stud 1604 is connected to cable 1704, terminal stud 1606 is connected to cable 1706, and terminal 1608 is connected to cable 1708. Ground cable 1710 connected to ground terminal stud 1610, cable 1702 connects to the always on terminal stud 1602.

Figures 18A, 18B:
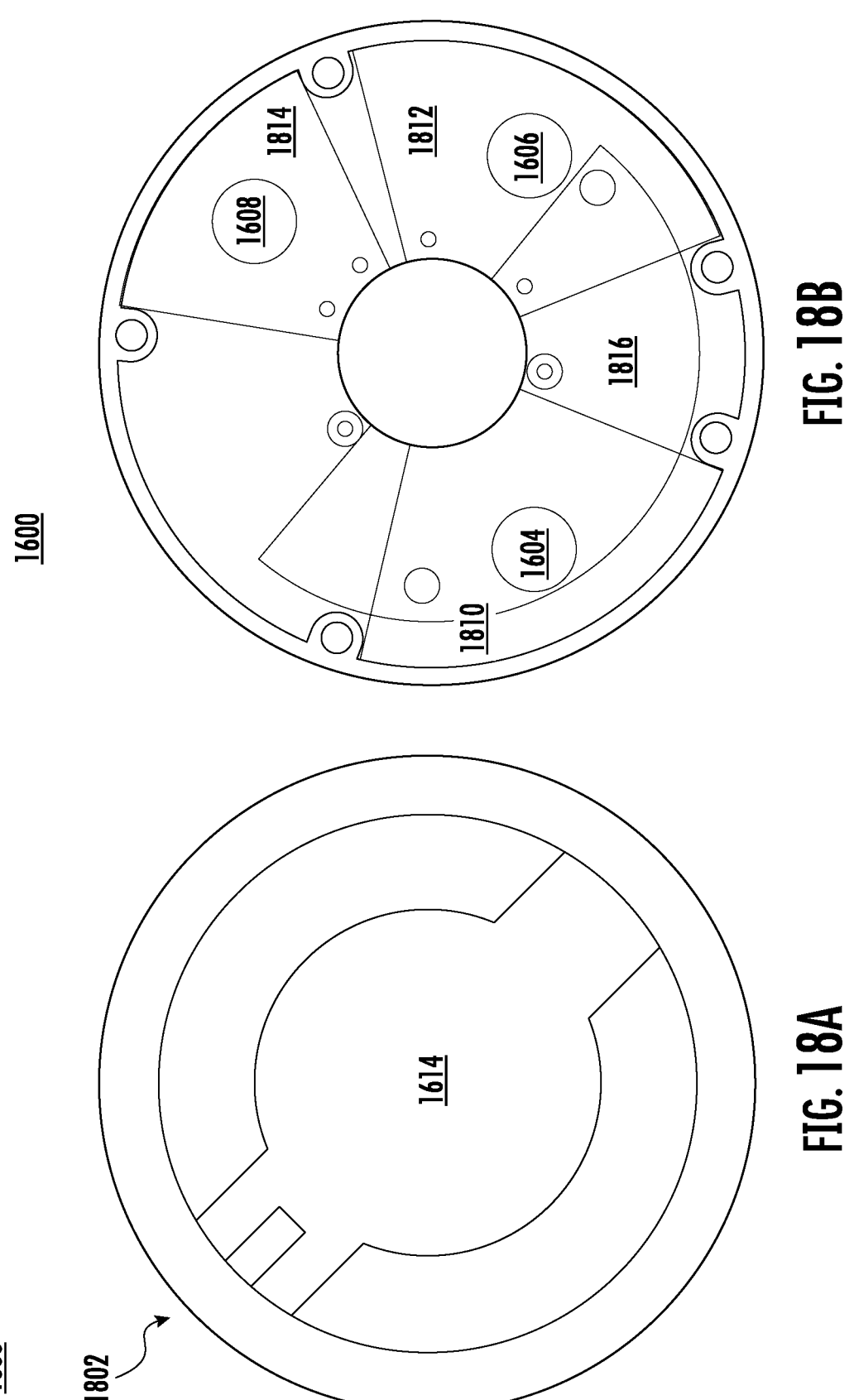
FIGS. 18A-18H are diagrams illustrating the battery master disconnect switch of FIGS. 16A-16F, in accordance with exemplary embodiments.
Figures 18C, 18D:
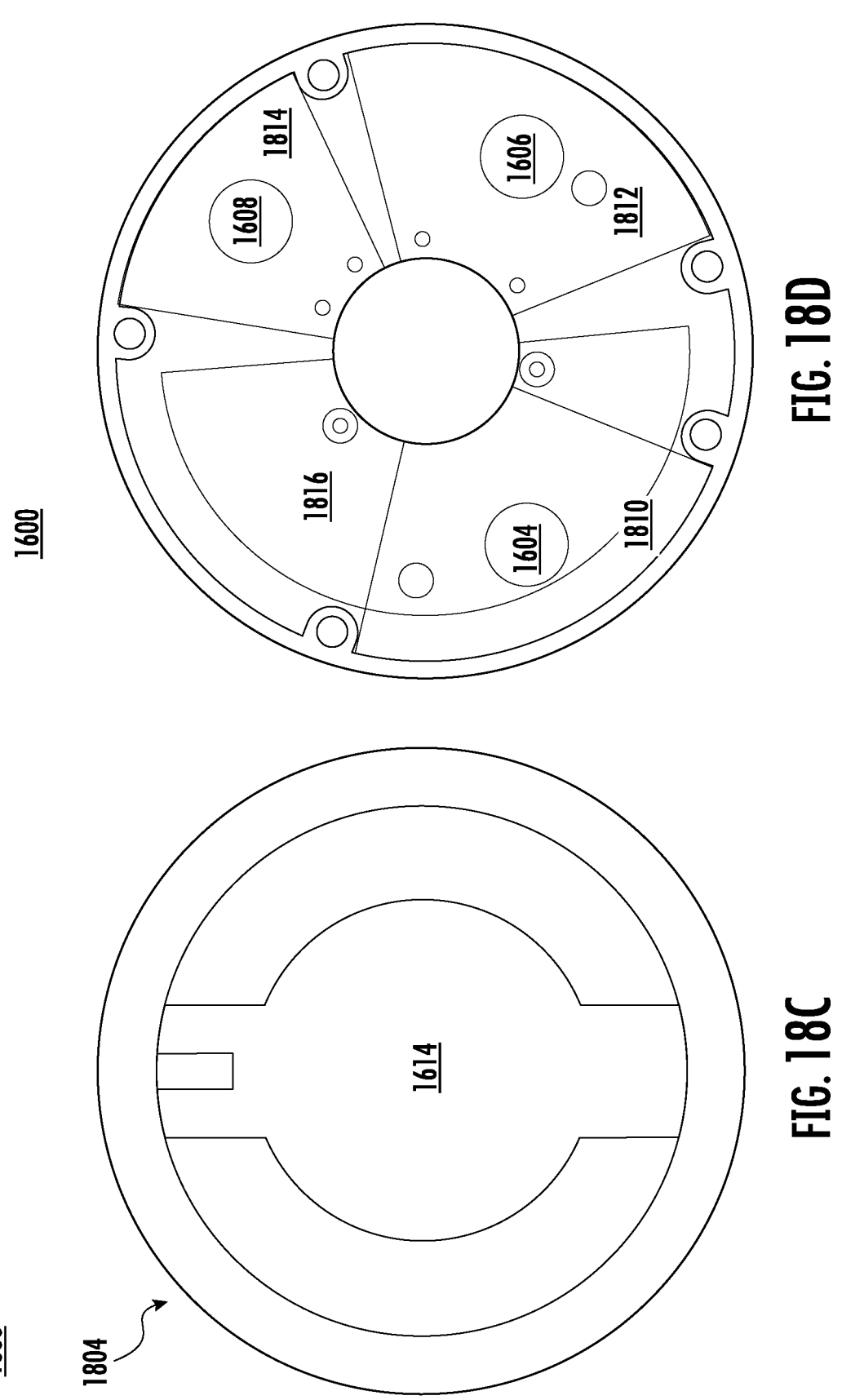
Figures 18E, 18F:
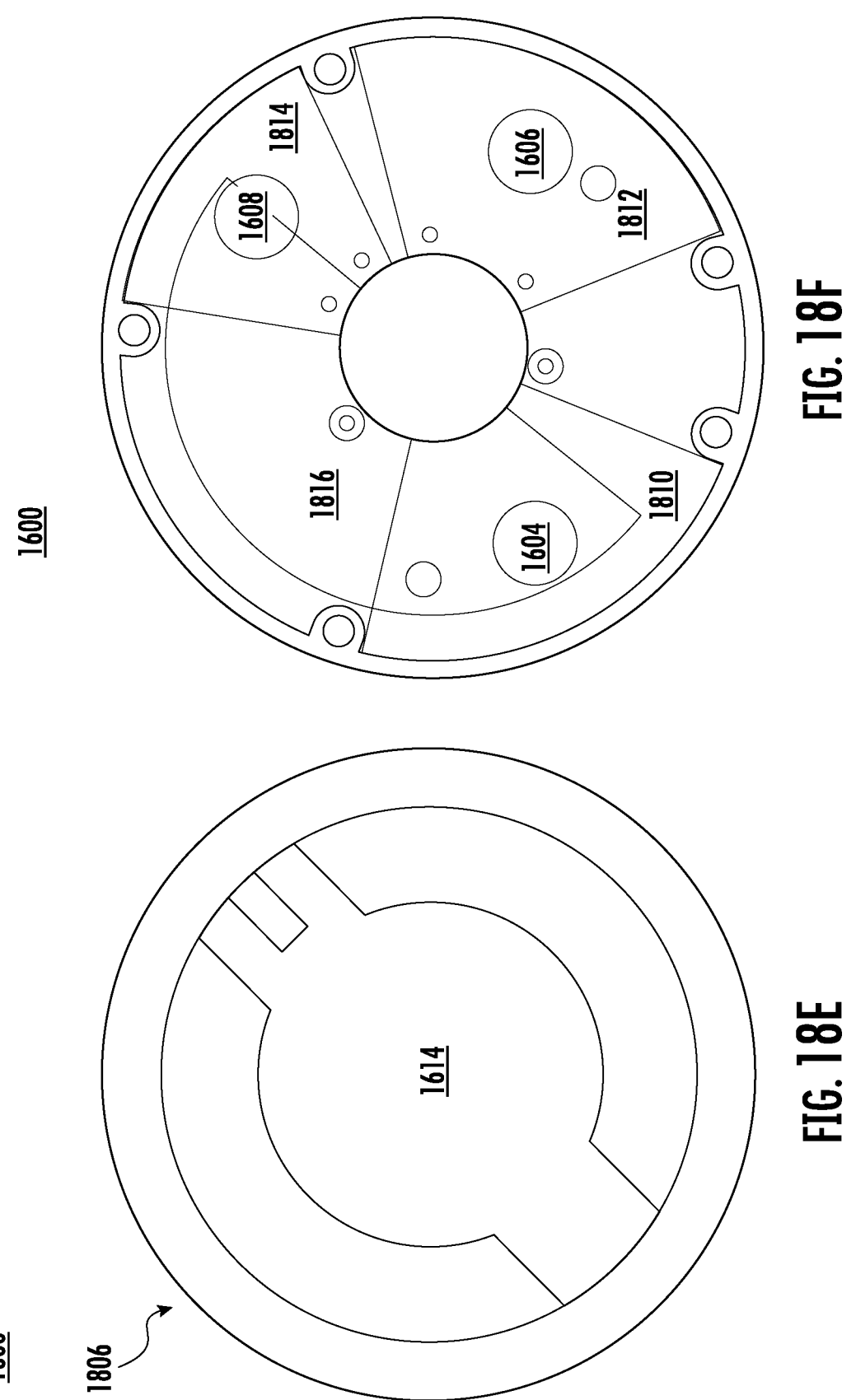
Figures 18G, 18H:
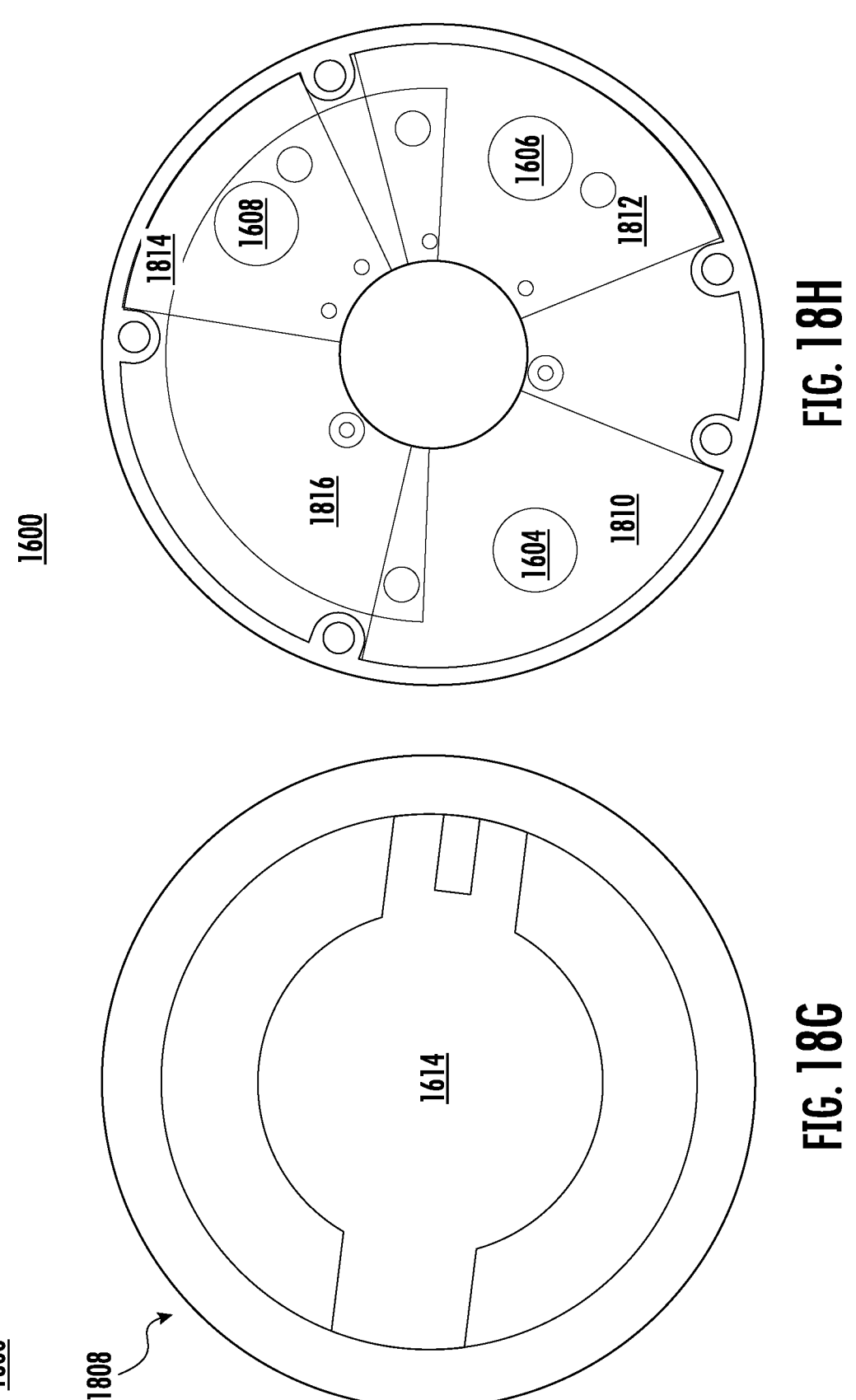

FIGS. 18A-18H are representative drawings of the battery master disconnect switch 1600 of FIGS. 6A-6F, according to exemplary embodiments. FIG. 18A shows a top and FIG. 18B shows a bottom of the battery master disconnect switch 1600 in a first position; FIG. 18C shows a top and FIG. 18D shows a bottom of the switch in a second position; FIG. 18E shows a top and FIG. 18F shows a bottom of the switch in a third position; and FIG. 18G shows a top and FIG. 18H shows a bottom of the switch in a fourth position.

As already shown in FIGS. 16A-16F and 17A-17B, the battery master disconnect switch 1600 has three large terminal studs 1604, 1606, and 1608. In FIGS. 16B, 16D, 16F, and 16H, each of these terminals is connected to a dedicated conductor plate. Thus, in exemplary embodiments, terminal 1604 is connected to a first conductor plate 1810, terminal stud 1606 is connected to a second conductor plate 1812, and terminal stud 1608 is connected to a third conductor plate 1814.

A conducting selector plate 1816 is also shown. In exemplary embodiments, the conducting selector plate 1816 connects two of the three terminals together. In exemplary embodiments, the conducting selector plate 1816, the conductor plate 1810, the conductor plate 1812, and the conductor plate 1814 are all made from an electrically conductive material, such as copper, which allows current to flow between connected elements of the battery master disconnect switch 1600.

In exemplary embodiments, the selector knob 1614, shown in FIGS. 18A, 18C, 18E, and 18G, is rotated to change which conductor plates the conducting selector plate 1816 will electrically join, with the selector knob being able to assume one of four different positions: a first position 1802 (FIG. 18A), a second position 1804 (FIG. 18C), a third position 1806 (FIG. 18E), and a fourth position 1808 (FIG. 18G).

Thus, in FIG. 18A, selector knob 1614 is rotated into the first position 1802, causing conductor plates 1810 and 1812 to be connected to one another by conducting selector plate 1816, as illustrated in FIG. 18B. This means that terminal studs 1604 and 1606 are electrically connected to one another, with terminal stud 1608 not being connected to either terminal stud 1604 or terminal stud 1606. The system 1500 in FIG. 15A is a configuration in which two terminal studs are connected, with one terminal stud not being connected to the others, for example.

In FIG. 18C, selector knob 1614 is rotated into the second position 1804, causing conductor plates 1810 and 1812 to be disconnected from one another by conducting selector plate 1816, as illustrated in FIG. 108. This means that none of the terminal studs 1604, 1606, or 1608 are electrically connected to one another. The system 1400 in FIG. 14A is a configuration in which none of the terminal studs are connected to one another.

In FIG. 18E, selector knob 1614 is rotated into the third position 1806, causing conductor plates 1810 and 1814 to be connected to one another by conducting selector plate 1816, as illustrated in FIG. 18F. This means that terminals 1604 and 1608 are electrically connected to one another, with terminal stud 1606 not being connected to either terminal stud 1604 or terminal stud 1608. The system 1500 in FIG. 15C is a configuration in which two terminal studs are connected, while one is not, but the connected terminal studs are different than is shown in FIG. 15A, for example.

In FIG. 18G, selector knob 1614 is rotated into the fourth position 1808, causing conductor plates 1810, 1812, and 1814 to be connected to one another by conducting selector plate 1816, as illustrated in FIG. 18H. This means that terminal studs 1604, 1606, and 1608 are electrically connected to one another. The system 1500 in FIG. 15D is a configuration in which all three terminals are connected, for example.

Recall that, for the systems 600, 700, 800, 900, 1000, 1100, 1200, 1300, 1400, and 1500, as well as the battery master disconnect switch 1600, one part of the switch (the large terminals) controls whether the engine or house circuits are turned on or not, and a separate part of the switch (the smaller always on terminal) ensures that the always on device, such as a bilge pump, is supplied with power at all times and is thus always on. FIGS. 19A-19D show how the always on terminal is controlled using the same battery master disconnect switch 1600.

Figures 19A, 19B, 19C, 19D:
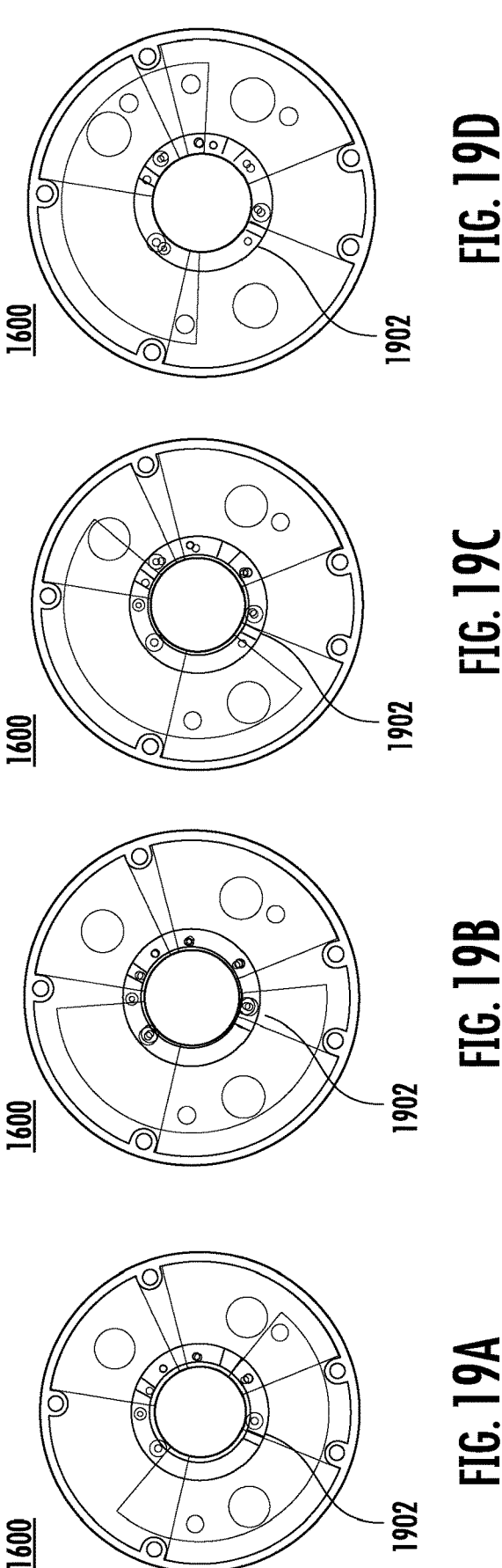
FIGS. 19A-19D are diagrams illustrating the battery master disconnect switch of FIGS. 16A-16F, in accordance with exemplary embodiments.

FIGS. 19A-19D are representative drawings of the battery master disconnect switch 1600, according to exemplary embodiments. FIG. 19A shows the battery master disconnect switch 1600 in the first position (FIG. 18B), FIG. 19B shows the switch in the second position (FIG. 18D), FIG. 19C shows the switch in the third position (FIG. 18F), and FIG. 19D shows the switch in the fourth position (FIG. 18H). In exemplary embodiments, the battery master disconnect switch 1600 has dedicated circuitry to ensure that the always on functionality is available, whether it be for a bilge pump or some other device needing to be powered continuously. A circuit portion 1902 is shown, in which the always on terminal is connected to the battery (e.g., the battery systems 1100, 1200, or 1300) or to one or both batteries (e.g., the battery systems 1400 or 1500). Further, in exemplary embodiments, the always on terminal is connected to one or both batteries no matter the position of the selector knob. The circuitry for the always on terminal is illustrated in more detail in FIGS. 20A-20C.

Figures 20A, 20B, 20C:
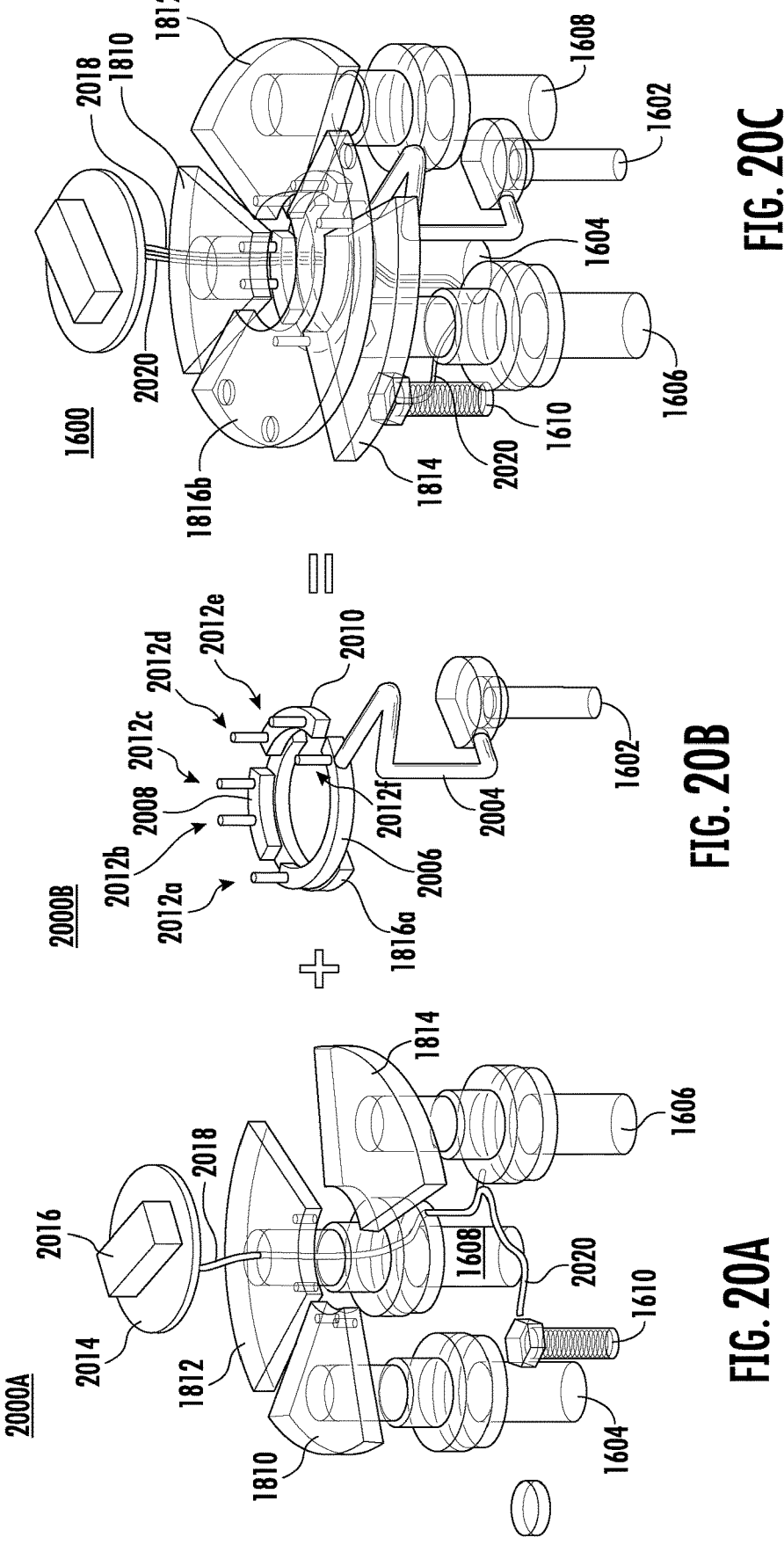
FIGS. 20A-20C are diagrams illustrating the battery master disconnect switch of FIGS. 16A-16F, in accordance with exemplary embodiments.

FIGS. 20A-20C are representative drawings of the battery master disconnect switch 1600, according to exemplary embodiments. FIG. 20A is an exploded view of a first section 2000A of the battery master disconnect switch 1600, FIG. 20B is an exploded view of a second section 2000B of the battery master disconnect switch, and FIG. 20C is an exploded view of the two sections 2000A and 2000B together to form the battery master disconnect switch 1600.

FIG. 20A shows the first section 2000A, which is the portion of the battery master disconnect switch 1600 that controls the large terminals. In other words, the first section 2000A controls whether power is available to the engine and the house circuits (see, e.g., systems 500, 1000, 1100, 1200, 1300, 1400, or 1500). Accordingly, the terminal studs 1604, 1606, and 1608 are shown, as well as the ground terminal stud 1610. The terminal studs are connected to the already introduced conductor plates 1810, 1812, and 1814, with terminal stud 1604 being connected to conductor plate 1810, terminal stud 1606 being connected to conductor plate 1814, and terminal stud 1608 being connected to conductor plate 1812.

A PCB 2014 upon which sits a voltage display 2016 is located at the top of the battery master disconnect switch 1600, with power connector 2018 and ground connector 2020 extending downward from beneath the PCB 2014. In exemplary embodiments, the power connector 2018 and ground connector 2020 are disposed between the conductor plates 1810, 1812, and 1814 so that they do not become wound during rotation of one or more elements of the battery master disconnect switch 1600.

FIG. 20B shows the second section 2000B, which is the always on switching circuit portion of the battery master disconnect switch 1600. In exemplary embodiments, the section 2000B features the always on terminal stud 1602, connected by a cable 2004, with the cable further being connected to one of three miniature conductor plates, or mini conductor plates 2006. A second mini conductor plate 2008 and a third mini conductor plate 2010 are also shown. In exemplary embodiments, the mini conductor plates 2006, 2008, and 2010 are arranged with respect to one another to form an incomplete circle.

In exemplary embodiments, the battery master disconnect switch 1600 features the already introduced conducting selector plate 1816, shown in FIGS. 18B, 18D, 18F, and 18H, which forms connections between the conductor plates, and thus forms connections between the terminal studs 1604, 1606, and 1608. In FIGS. 20B and 20C, the conducting selector plate 1816 has two parts, conducting selector plate 1816a (FIG. 20B) and conducting selector plate 1816b (FIG. 20C), which are to be joined together.

In exemplary embodiments, multiple electrically conductive nails are used to form electrically conductive connections between the conducting selector plate portions 1816a and 1816b, as well as between the regularly sized conductor plates 1810, 1812, and 1814 and the mini conductor plates 2006, 2008, and 2010. In a non-limiting embodiment, six nails 2012a-f are shown, with nails 2012a and 2012f extending upward from mini conductor plate 2006, nails 2012b and 2012c extending upward from mini conductor plate 2008, and nails 2012d and 2012e extending upward from mini conductor plate 2010 (collectively, "nails 2012"). The electrically conductive nails 2012, in essence, form a connection between one plane (the conductor plates 1810, 1812, and 1814) and a second plane (the mini-conductor plates 2006, 2008, and 2010). In exemplary embodiments, the nails 2012 cause electrically conductive connections to be formed between the mini conductor plates 2006, 2008, and 2010 and the conductor plates 1810, 1812, and 1814.

FIG. 20C shows the first section 2000A and the second section 2000B joined to form the battery master disconnect switch 1600. The second section 2000B ensures that, no matter what rotations of the conductor plates 1810, 1812, and 1814 take place, there will be a connection between the always on terminal stud 1602 and one of the three terminal studs 1604, 1606, and 1608, which further ensures that the terminal stud 1602 is connected to the battery or batteries making up the system in which the battery master disconnect switch 1600 resides.

Figure 21:
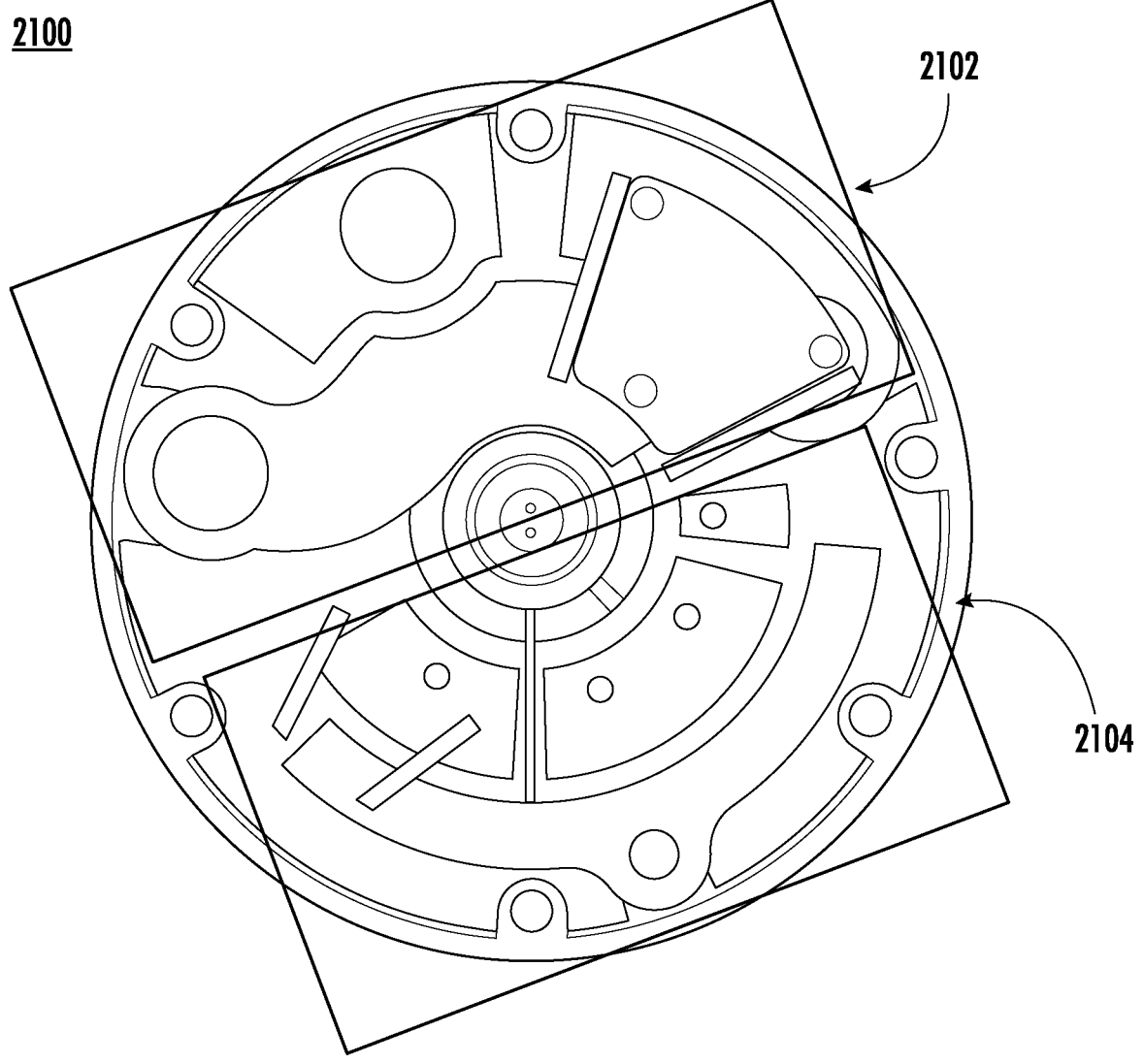
FIG. 21 is a diagram illustrating a battery master disconnect switch back panel, in accordance with exemplary embodiments.

FIG. 21 is a representative drawing of a battery master disconnect switch 2100, according to exemplary embodiments. In exemplary embodiments, the battery master disconnect switch 2100 is an alternative embodiment in which one section (rectangle 2102) provides load switching contacts for a main battery, and a second section (rectangle 2104) provides always on switching contacts.

Figures 22A, 22B:
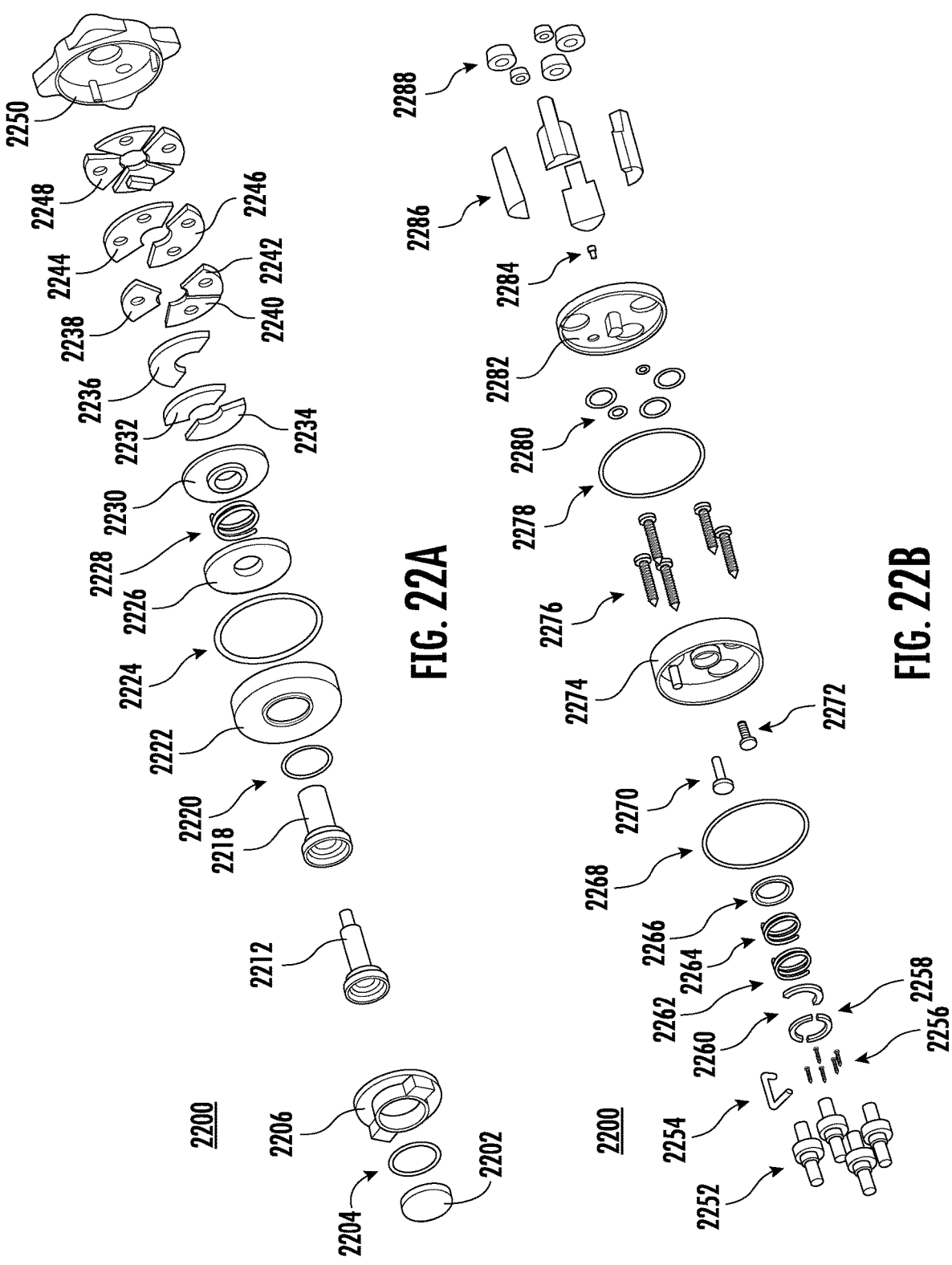
FIGS. 22A-22B are diagrams illustrating a battery master disconnect switch, in accordance with exemplary embodiments.

FIGS. 22A-22B are representative drawings of a battery master disconnect switch 2200, according to exemplary embodiments. FIG. 22A is an exploded view of a first portion and FIG. 22B is an exploded view of a second portion of the battery master disconnect switch 2200. Although the components making up the battery master disconnect switch 2200 are presented in a certain order, they may be arranged differently than is shown. The battery master disconnect switch 2200 features, as illustrated in FIG. 22A, a knob lens 2202, a o-ring 2204, a knob 2206, a PCB 2208, a voltage display 2210, a PCB sub-housing 2212, a power wire 2214, a ground wire 2216, a sub-knob 2218, a knob to top bracket o-ring 2220, a top bracket 2222, a mid-body o-ring 2224, a moving detent 2226, a detent spring 2228, a contact driver 2230, moving contacts 2232, 2234, and 2236, a stationary contacts 2238, 2240, 2242, 2244, 2246, and 2248, and a middle bracket 2250.

The battery master disconnect switch 2200 further features, as illustrated in FIG. 22B, multiple terminal studs 2252, a wire 2254 (for the always-on circuit), a PEM stud 2256, a stationary contact 2258 (for the always-on circuit), a moving contact 2260 (for the always-on circuit), a contact driver 2262 (for the always-on circuit), a detent spring 2264 (for the always-on circuit), a spring bushing 2266, a main body o-ring 2268, a terminal 2270 (for the always-on circuit), a main body screw 2272, a bottom bracket 2274, bottom bracket screws 2276, a main body to bottom bracket o-ring 2278, a terminal stud o-ring 2280, a wire cap housing 2282, a housing screw 2284, standoffs 2286, and hex nuts 2288.

Figure 23A:
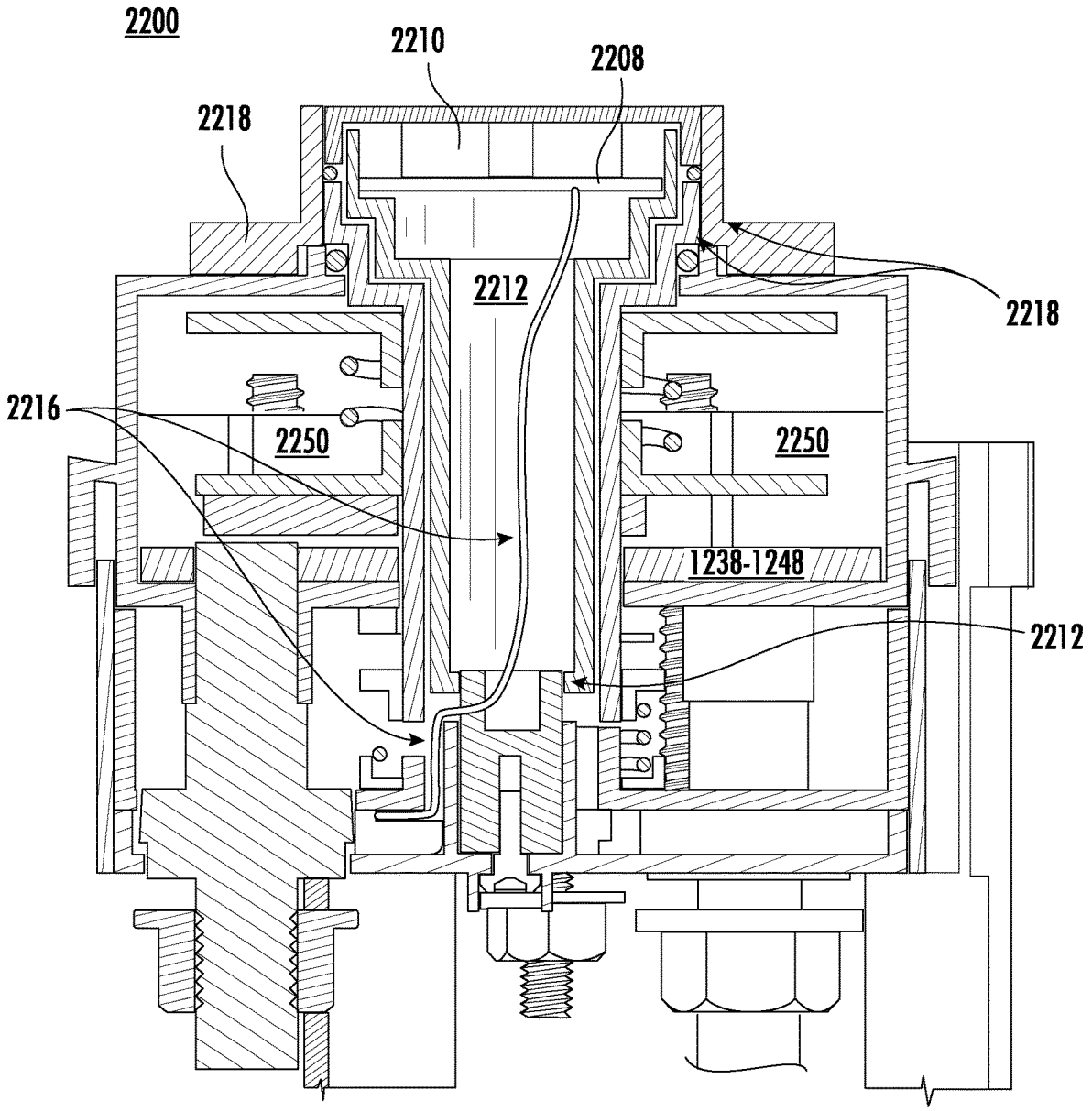
FIGS. 23A-23D are diagrams illustrating the battery master disconnect switch of FIGS. 22A-22B, in accordance with exemplary embodiments.
Figure 23B:
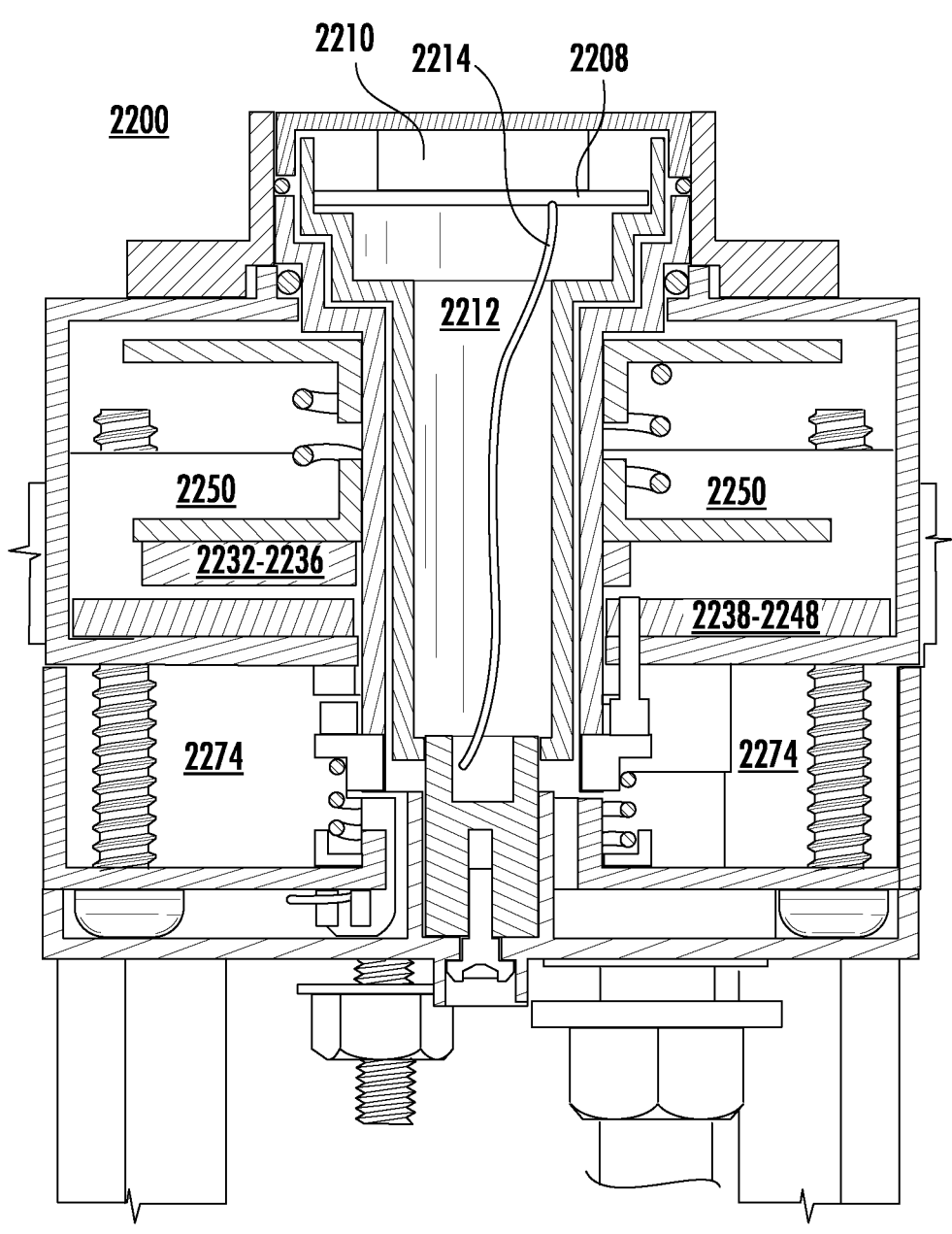
Figure 23C:
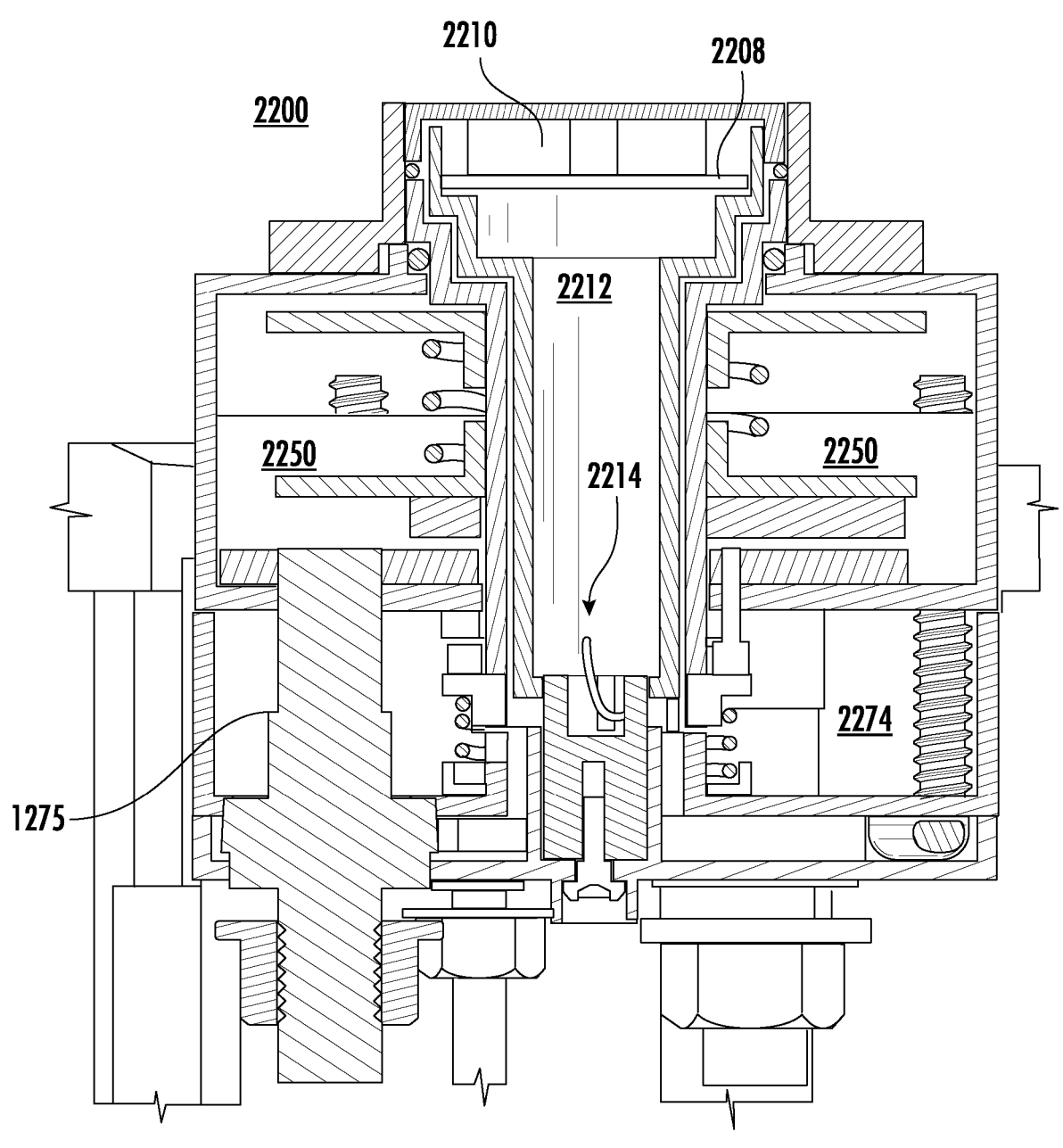
Figure 23D:
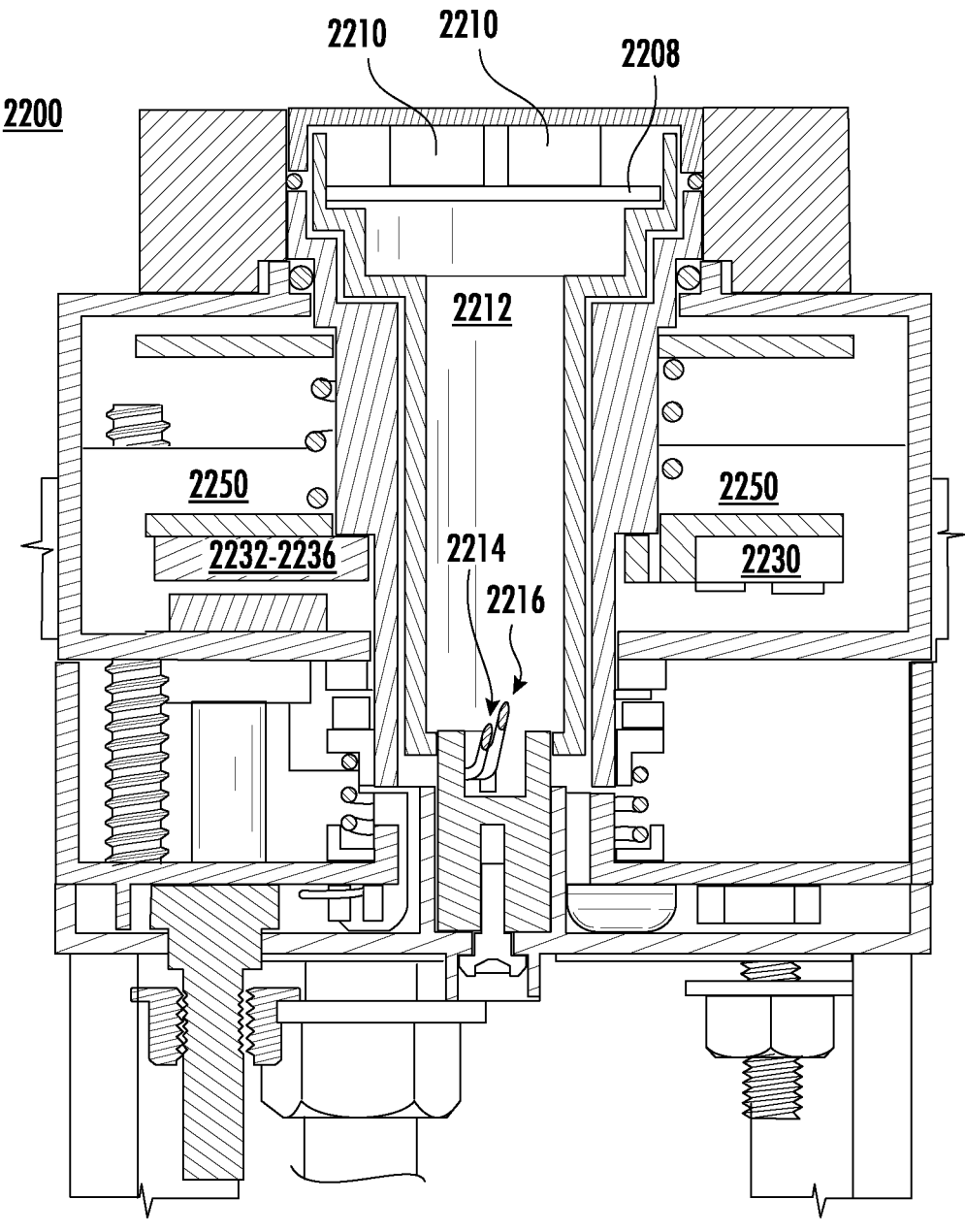

FIGS. 23A-23D are representative drawings of the battery master disconnect switch 2200 of FIGS. 22A-22B, according to exemplary embodiments. The drawings show cut-out views of the battery master disconnect switch 2200 from various angles. Several of the components introduced in FIGS. 22A-22B are indicated. The power wire 2214 and ground wire 2216 are to power the PCB 2208 with the voltage display 2210. In some embodiments, there are two voltage displays, as shown in FIG. 23D. In exemplary embodiments, the power wire 2214 and ground wire 2216 run down the stationary tube of the PCB sub housing 2212, with the ground wire 2216 attaching to a chassis and the power wire 2214 attaching to one of the terminal studs. The PCB sub housing 2212 does not rotate while the knob 2206 does rotate. This arrangement keeps the ground wire 2216 and power wire 2214 from getting tangled within the battery master disconnect switch 2200.

The always on function of the exemplary battery master disconnect switches described herein may be used for a bilge pump of a motor craft. Alternatively, the battery master disconnect switches described herein may be used for other applications besides boats, such as a recreational vehicle, a motor home, and the like. The applications of the battery master disconnect switches, including the always on function, are not limited to the examples provided herein.

The voltage display feature of the exemplary battery master disconnect switches described herein may employ two displays as in the battery master disconnect switch 600 (FIGS. 6A-6D), alternatively visible displays as in the battery master disconnect switch 700 (FIGS. 7A-7D), a single display available for one or two batteries, as in the battery master disconnect switch 800 (FIGS. 8A-8B), provide LED light indication in lieu of numerical numbers, as in the battery master disconnect switch 900 (FIG. 9), or may provide audible indication in lieu of visual presentation.

The battery master disconnect switches 400, 600, 700, 800, 900, 1600, 2100, and 2200 of the battery systems 500, 1000, 1100, 1200, 1300, 1400, and 1500 thus feature alternative ways to provide battery voltage information to the owner of the vehicle. Further, one or more of these battery master disconnect switches enable an always on device to stay on whether the battery or batteries of the vehicle are turned on or off. Because the battery master disconnect switch is accessed by the owner before using the vehicle, the availability of voltage information about the batteries is conveniently presented.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. A battery master disconnect switch comprising:
a back panel comprising:
  a primary terminal adapted to connect to a primary battery; and
  a secondary terminal adapted to connect to a secondary battery;
a front panel including:
  a selector knob selecting between a plurality of positions, including:
    a first position for activating the primary battery; and
    a second position for activating the secondary battery;
a battery voltage indicator which visually displays a voltage based on a voltage measurement of the primary battery;
a second battery voltage indicator, wherein the battery voltage indicator visually displays the voltage based on the voltage measurement of the primary battery and the second battery voltage indicator displays a second voltage based on a second voltage measurement of the secondary battery;
wherein the selector knob is further selectable in a third position for connecting the battery voltage indicator to the primary battery and to the secondary battery;
wherein the battery voltage indicator visually displays the voltage, and the second battery voltage indicator visually displays the second voltage, in response to the selector knob being in the third position.

2. The battery master disconnect switch of claim 1, wherein the battery voltage indicator visually displays a second voltage based on a second voltage measurement of the secondary battery.

3. The battery master disconnect switch of claim 1, further comprising an auxiliary terminal to enable a device, wherein the device receives power for any of the plurality of positions of the selector knob.

4. The battery master disconnect switch of claim 1, wherein the battery voltage indicator comprises a light emitting diode (LED) which visually displays the voltage numerically.

5. The battery master disconnect switch of claim 1, wherein the battery voltage indicator comprises a plurality of light emitting diodes (LEDs) which visually displays the voltage based on a number of the plurality of LEDs being lit.

6. The battery master disconnect switch of claim 1, wherein the battery voltage indicator:

visually displays the voltage in a predetermined time based on the voltage measurement of the primary battery; and visually displays a second voltage once the predetermined time has expired based on a second voltage measurement of the secondary battery.

7. A battery master disconnect switch comprising:

a front panel including a selector knob to select between a plurality of positions;

a back panel including:

a primary terminal to connect, by way of a first cable, to a primary battery;

a secondary terminal to connect, by way of a second cable, to a secondary battery; and an auxiliary terminal to enable a device, wherein the device receives power for any of the plurality of positions of the selector knob;

a primary battery conductor plate;

a first conductor plate; and a conducting selector plate;

wherein the primary battery is enabled in response to the conducting selector plate being coupled between the primary battery conductor plate and the first conductor plate.

8. The battery master disconnect switch of claim 7, further comprising a battery voltage indicator which provides a voltage based on a voltage measurement of the primary battery.

9. The battery master disconnect switch of claim 7, the back panel further comprising a third terminal to connect, by way of a third cable, to a charging device.

10. The battery master disconnect switch of claim 7, further comprising a plurality of auxiliary conductor plates, wherein the first conductor plate is in contact with one or more of the plurality of auxiliary conductor plates in the plurality of positions of the selector knob.

11. The battery master disconnect switch of claim 10, further comprising a secondary battery conductor plate, wherein the secondary battery is enabled in response to the conducting selector plate being coupled between the secondary battery conductor plate and the first conductor plate.

12. The battery master disconnect switch of claim 9, wherein, in response to the selector knob being in a first position of the plurality of positions:

a first electrical connection is made between the primary terminal and the third terminal;

the primary battery is turned on; and the device is operable.

13. The battery master disconnect switch of claim 12, wherein, in response to the selector knob being in a second position of the plurality of positions: a second electrical connection is made between the secondary terminal and the third terminal; the secondary battery is turned on; and the device is operable.

14. The battery master disconnect switch of claim 13, wherein, in response to the selector knob being in a third position of the plurality of positions:

the first electrical connection is made;

the second electrical connection is made;

the primary battery is turned on;

the secondary battery is turned on; and the device is operable.

15. The battery master disconnect switch of claim 13, wherein, in response to the selector knob being in a fourth position of the plurality of positions:

the primary battery is disabled; and the device is operable.

16. The battery master disconnect switch of claim 7, wherein the device is a bilge pump.

* * * * *